(12) United States Patent
Kotani

(10) Patent No.: US 9,565,380 B2
(45) Date of Patent: Feb. 7, 2017

(54) DATA PROCESSOR AND DATA PROCESSING METHOD INCLUDING A DECISION CIRCUIT THAT COMPARES INPUT PIXEL DATA TO DEFECTIVE PIXEL DATA

(71) Applicant: MegaChips Corporation, Osaka-shi (JP)

(72) Inventor: Manabu Kotani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 37 days.

(21) Appl. No.: 14/659,795

(22) Filed: Mar. 17, 2015

(65) Prior Publication Data

US 2015/0281508 A1 Oct. 1, 2015

(30) Foreign Application Priority Data

Mar. 25, 2014 (JP) ................................. 2014-061618

(51) Int. Cl.
*H04N 5/367* (2011.01)
*H04N 1/32* (2006.01)

(52) U.S. Cl.
CPC .......... *H04N 5/367* (2013.01); *H04N 1/32561* (2013.01)

(58) Field of Classification Search
CPC .. H04N 5/2171; H04N 5/2176; H04N 5/2178; H04N 5/367; H04N 5/3675; H04N 1/32561; H04N 1/4097

USPC ........... 348/246, 247; 358/3.26; 250/559.41, 250/559.45, 559.46; 382/149
See application file for complete search history.

(56) References Cited

U.S. PATENT DOCUMENTS

| | | | | |
|---|---|---|---|---|
| 2001/0038416 | A1* | 11/2001 | Koren ................... | H04N 5/367 348/294 |
| 2006/0159361 | A1* | 7/2006 | Hasegawa ............... | G06T 5/002 382/261 |
| 2011/0032393 | A1* | 2/2011 | Yamaguchi ............ | H04N 5/367 348/247 |
| 2011/0242383 | A1* | 10/2011 | Yamazaki ............ | H04N 5/3742 348/302 |

FOREIGN PATENT DOCUMENTS

JP 2012-114721 6/2012

* cited by examiner

*Primary Examiner* — Dennis Hogue
(74) *Attorney, Agent, or Firm* — Oblon, McClelland, Maier & Neustadt, L.L.P.

(57) ABSTRACT

A plurality of pieces of first input data are input to a first decision circuit in an order based on a first rule. The memory has a plurality of first memory areas that respectively store a plurality of pieces of first data that match at least part of the plurality of pieces of first input data. The first decision circuit compares the first data read from the memory with the first input data to be input. When they do not match each other, The first decision circuit compares the first data with the first input data to be input next. When they match, The first decision circuit compares the first data read next from the memory on the basis of the first read pointer incremented with the first input data to be input next.

8 Claims, 20 Drawing Sheets

F I G . 1
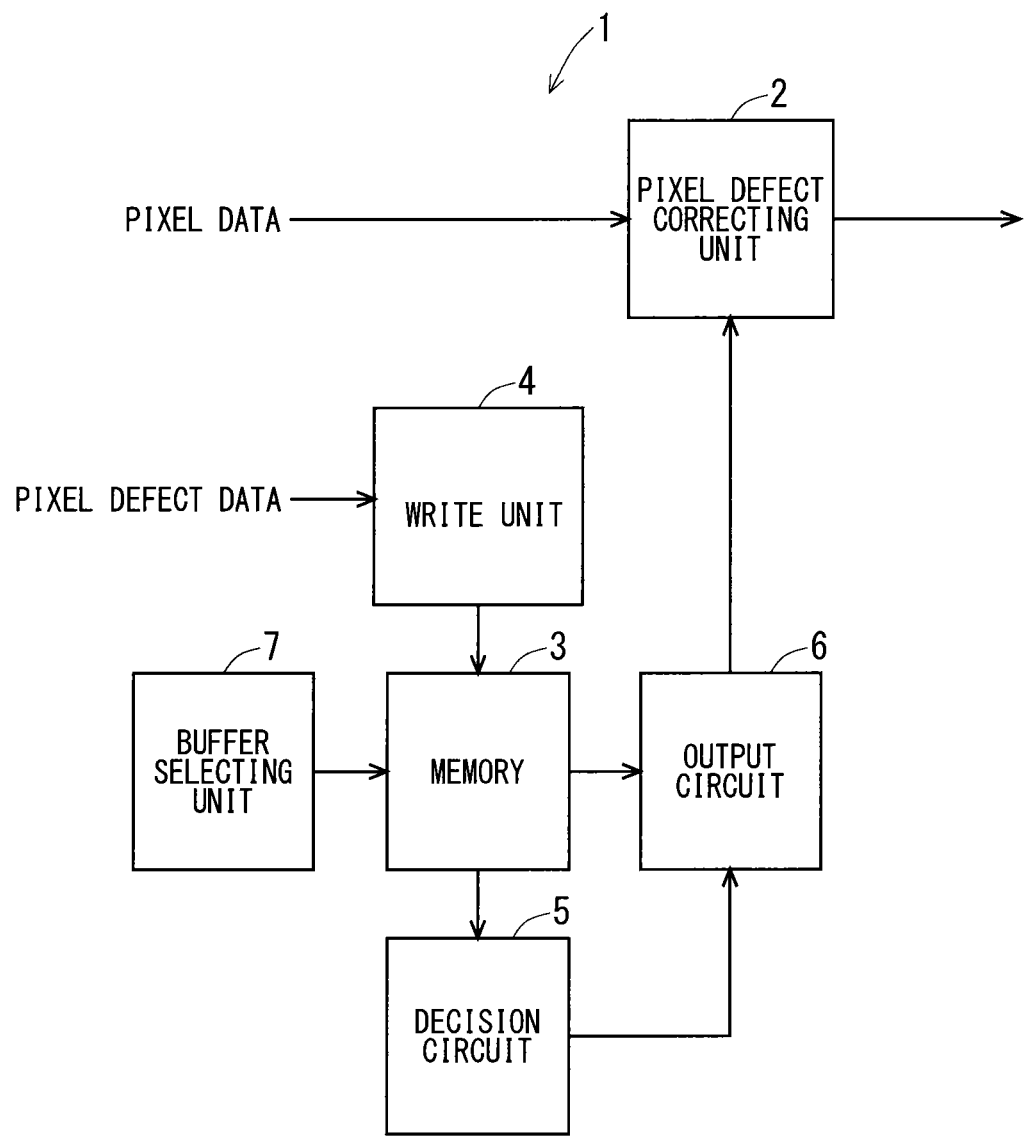

F I G. 4
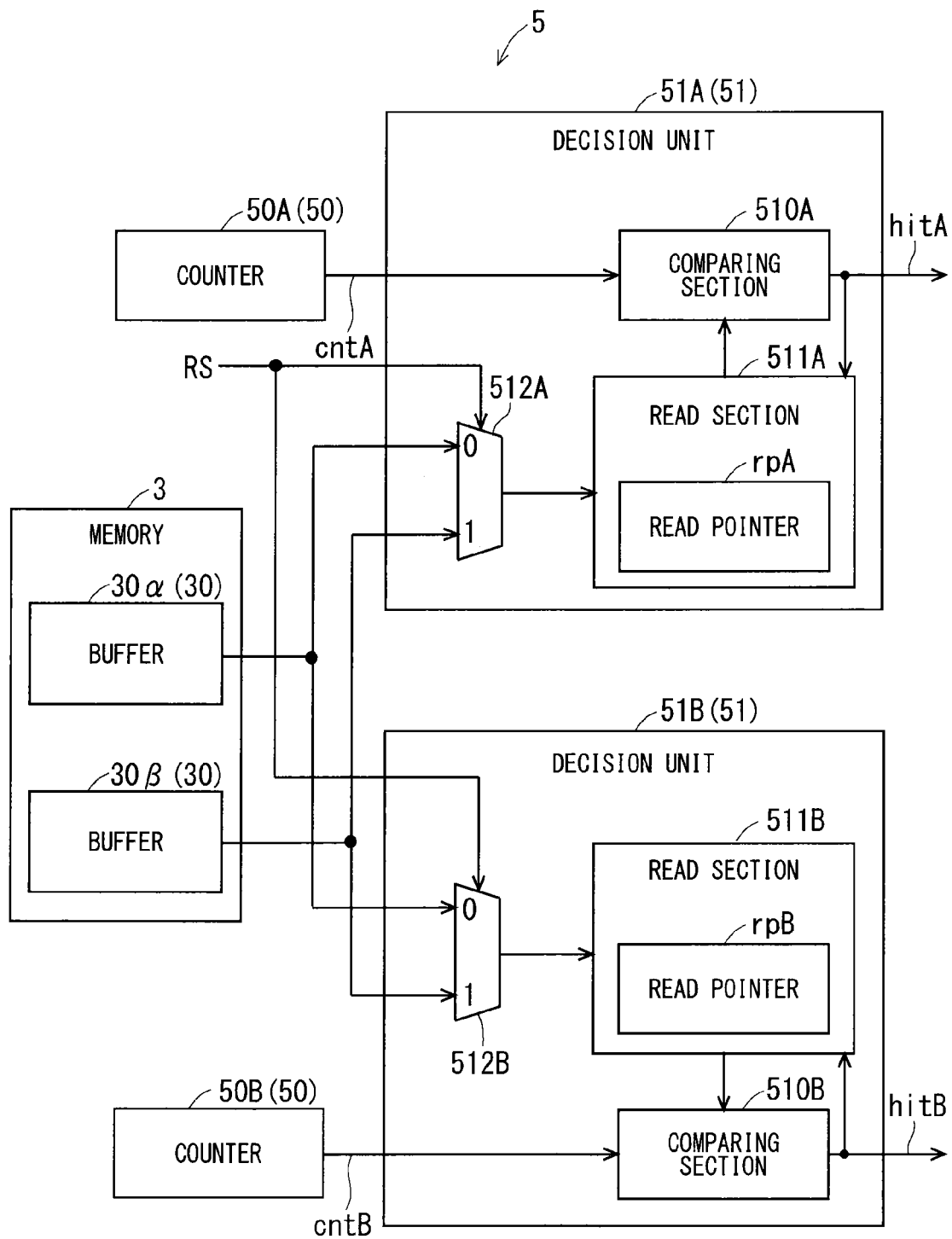

F I G. 6

| | | | | | | | | | | | | | | | |
|---|---|---|---|---|---|---|---|---|---|---|---|---|---|---|---|
| INPUT TIMING | [0] | [1] | [2] | [3] | | [p-1] | [p] | [p+1] | | [q-1] | [q] | [q+1] | | [z] | |
| WRITE TIMING | | [0] | [1] | [2] | | [p-2] | [p-1] | [p] | | [q-2] | [q-1] | [q] | | [z-1] | [z] |
| wpA | 0 | | | | | 0 | | | | 0 | | | | 0 | |
| wpB | 0 | 1 | 2 | 3 | | p-1 | p | | | p | | | | p | |

FIG. 14

| INPUT TIMING | [0] | [1] | [2] | [3] | ... | [p-1] | [p] | [p+1] | ... | [q-1] | [q] | [q+1] | ... | [z] |
|---|---|---|---|---|---|---|---|---|---|---|---|---|---|---|
| WRITE TIMING | | [0] | [1] | [2] | ... | [p-2] | [p-1] | [p] | ... | [q-2] | [q-1] | [q] | ... | [z-1] |
| wpA | 0 | | | | | 0 | | | | 0 | | | | 0 |
| wpB | 0 | 1 | 2 | 3 | ... | p-1 | p | p | ... | p | p | | | p |
| wpC | 0 | 1 | 2 | 3 | ... | p-1 | p+1 | | ... | q-1 | q | | | q |

FIG. 17
| LINE POSITION (CORRECTION-TARGET PIXEL DATA) | — | — | 0 | 1 | 2 | 3 |
|---|---|---|---|---|---|---|
| LINE POSITION (PIXEL DEFECT DATA) | 0 | 1 | 2 | 3 | 4 | 5 |
| WRITE BUFFER | α | β | γ | α | β | γ |
| READ BUFFER (CORRECTION LINE) | — | — | α | β | γ | α |
| READ BUFFER (SUCCEEDING LINE) | — | — | β | γ | α | β |
FIG. 18
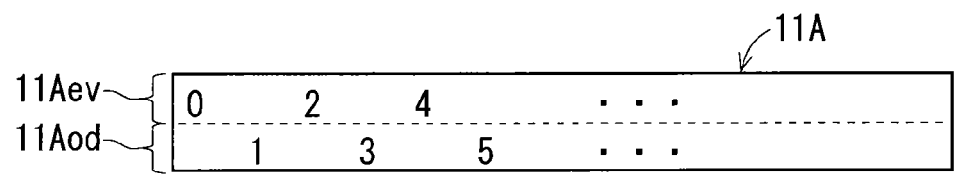
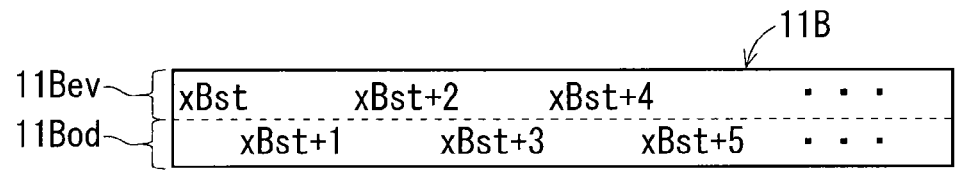

F I G . 2 1
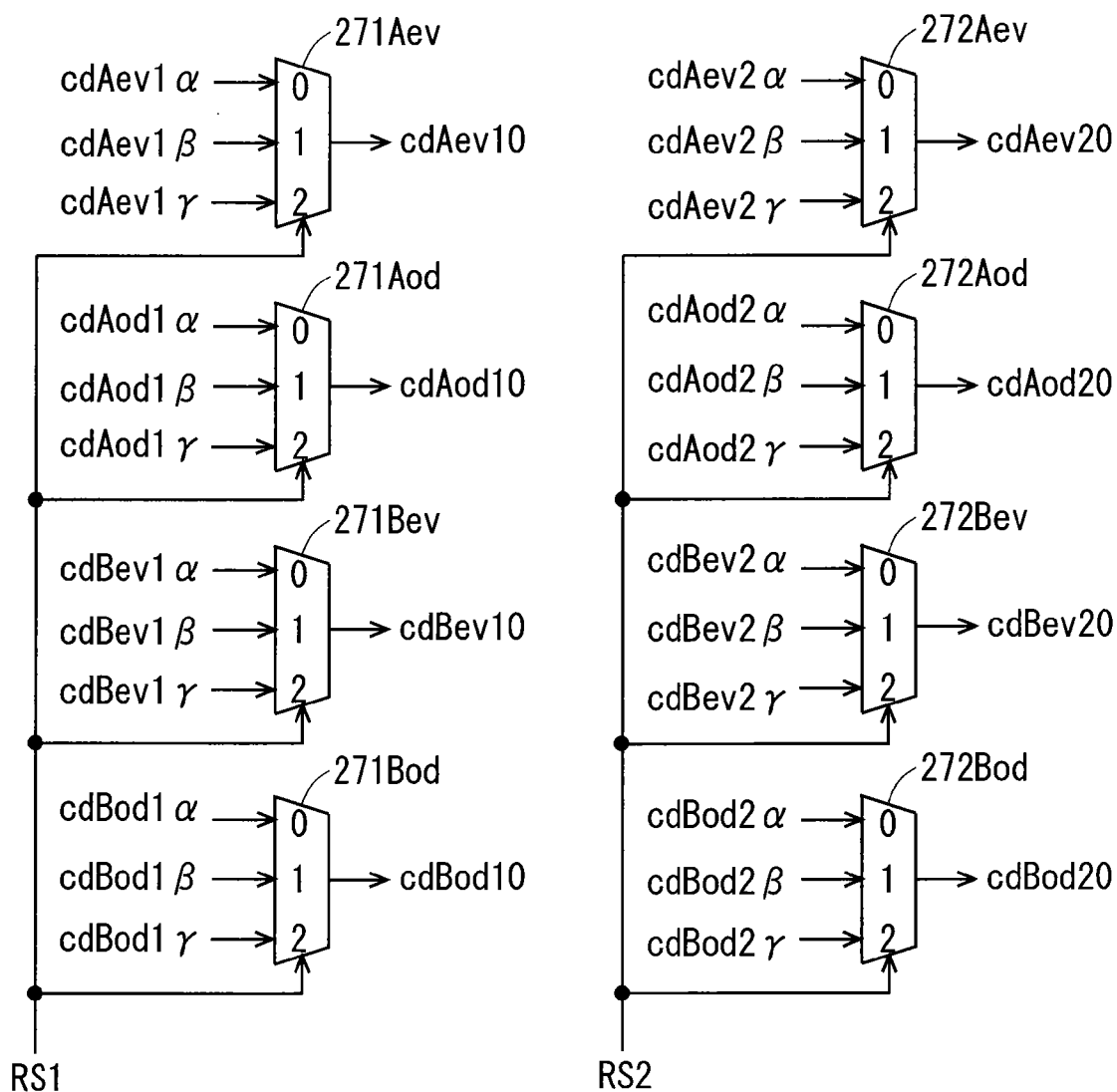

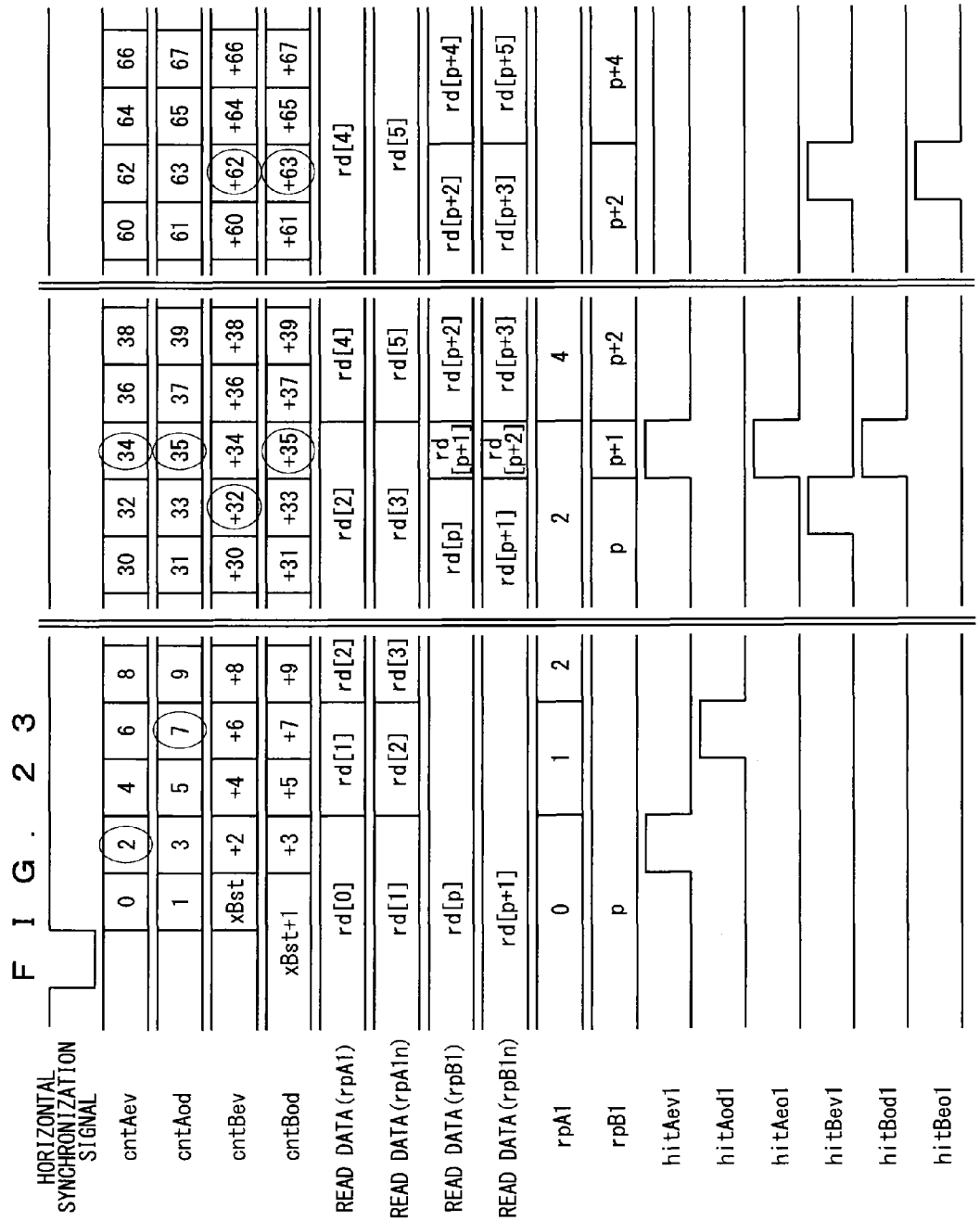

DATA PROCESSOR AND DATA PROCESSING METHOD INCLUDING A DECISION CIRCUIT THAT COMPARES INPUT PIXEL DATA TO DEFECTIVE PIXEL DATA

BACKGROUND OF THE INVENTION

Field of the Invention

The present invention relates to data processing.

Description of the Background Art

Various data processing techniques have traditionally been proposed. For example, Japanese Patent Application Laid-Open No. 2012-114721 describes the technique of processing pixel data.

SUMMARY OF THE INVENTION

An aspect of a data processor includes a memory that stores data, and a first decision circuit that decides whether data to be input matches data in the memory. A plurality of pieces of first input data on pixels are input to the first decision circuit in an order based on a first rule. The memory has a plurality of first memory areas that respectively store a plurality of pieces of first data that match at least part of the plurality of pieces of first input data. The first decision circuit reads the plurality of pieces of first data from the memory in an order based on a second rule identical to the first rule. When addresses of the plurality of first memory areas are viewed in ascending order, the plurality of pieces of first data respectively stored in the plurality of first memory areas are arranged in an order to be read by the first decision circuit. The data processor further includes a first read pointer that indicates an address of a first memory area being a read target among the plurality of first memory areas. The first decision circuit compares one of the pieces of first data read from the memory on the basis of the first read pointer with one of the pieces of first input data to be input. When the one piece of first data does not match the one piece of first input data, the first decision circuit compares the one piece of first data with another of the pieces of first input data to be input next. When the one piece of first data matches the one piece of first input data, the first decision circuit increments the first read pointer to a succeeding value and compares another of the pieces of first data read next from the memory on the basis of the first read pointer incremented with another of the pieces of first input data to be input next.

These and other objects, features, aspects and advantages of the present invention will become more apparent from the succeeding detailed description of the present invention when taken in conjunction with the accompanying drawings.

BRIEF DESCRIPTION OF THE DRAWINGS

FIG. 1 shows the configuration of a data processor;

FIG. 4 shows the configurations of a decision circuit and a memory;

FIG. 6 is a timing chart showing the operation of a write unit;

FIG. 14 is a timing chart showing the operation of a write unit according to the modification;

FIG. 17 shows the order in which a plurality of buffers serve as write buffers;

FIG. 18 shows the state in which a partial area of a line is divided into an even-numbered group and an odd-numbered group;

FIG. 21 shows another partial configuration of the output circuit according to the other modification;

FIG. 23 is a timing chart showing the operation of a decision circuit according to the other modification.

DESCRIPTION OF EMBODIMENT

Figure 2:
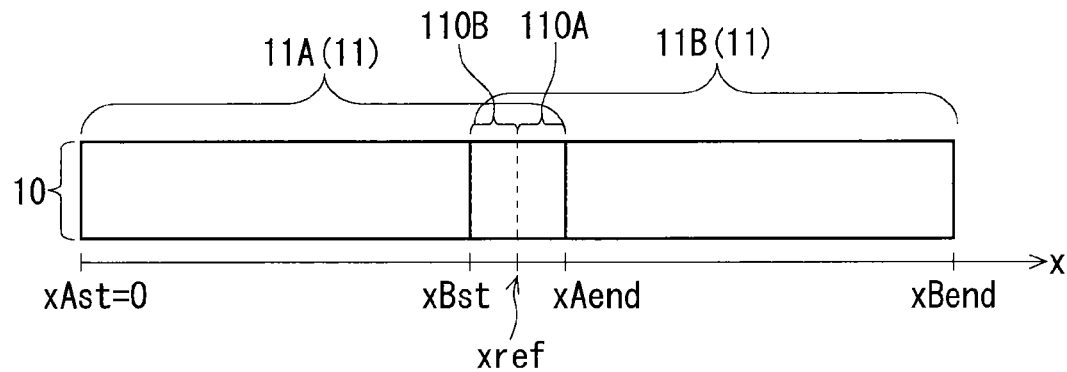
FIG. 2 shows the state in which a line is divided into two partial areas.

FIG. 1 shows the configuration of a data processor 1 according to an embodiment. The data processor 1 is, for example, an image processor that processes image data. The data processor 1 according to this embodiment performs, for example, pixel defect correction of correcting the pixel data obtained from a defective pixel included in an imaging device such as a CMOS (complementary metal oxide semiconductor) image sensor or a CCD (charge coupled device) sensor.

As shown in FIG. 1, the data processor 1 includes a pixel defect correcting unit 2, a memory 3, a write unit 4, a decision circuit 5, an output circuit 6, and a buffer selecting unit 7. The components constituting the data processor 1 operate in synchronization with an operation clock signal (not shown). The data processor 1 receives a plurality of pieces of pixel data (image data) respectively obtained from a plurality of pixels of the imaging device.

When the pixel data input from the outside of the data processor 1 is the pixel data obtained from the defective pixel, the pixel defect correcting unit 2 corrects this pixel data and generates and outputs appropriate pixel data. The pixel defect correcting unit 2 replaces the pixel data obtained from the defective pixel with pixel data generated using pixel data on at least one pixel that is located near the defective pixel and has no defect, thereby correcting the pixel data on the defective pixel. Contrastingly, when the pixel data input to the data processor 1 is the pixel data obtained from a defect-free pixel, the pixel defect correcting unit 2 does not correct this pixel data and outputs it.

Hereinafter, the pixel data obtained from a defective pixel may be referred to as "defective pixel data." The defective pixel data after the correction may be referred to as "corrected pixel data." The pixel data obtained from a defect-free pixel may be referred to as "normal pixel data."

In this embodiment, the pixel defect correcting unit 2 can correct defective pixel data by a plurality of types of correction methods. The number of pieces of pixel data used in the generation of corrected pixel data, the position of a pixel corresponding to the pixel data, the expression for computing corrected pixel data using the pixel data, or the like differs among the plurality of types of correction methods. Upon receipt of defective pixel data on a defective pixel, the pixel defect correcting unit 2 corrects the defective pixel data by the correction method corresponding to the defective pixel. The information for identifying a type of the correction method to be used in correcting defective pixel data is input from the output circuit 6 to the pixel defect correcting unit 2, as described below.

The memory 3 stores pixel defect data (pixel defect information) input from the outside of the data processor 1. The pixel defect data includes address data indicating the position of a defective pixel and correction method identifying data for identifying a correction method to be used in correcting the pixel data on the defective pixel. In this embodiment, the position of each pixel of the imaging device is represented by the x-y coordinate system in which the horizontal direction (line direction) and the vertical direction (column direction) are an x-axis direction and a y-axis direction, respectively, and the position of a pixel at one corner is an origin (x-coordinate value=0, y-coordinate value=0). The pixel defect data includes the x-coordinate value of a defective pixel as address data. Hereinafter, the address data (x-coordinate value) included in the pixel defect data may be referred to as "x-coordinate data." The pixel defect data may be referred to as "defective data."

The data processor 1 receives defective data on each defective pixel included in the imaging device. Various methods are conceivable as the method of inputting defective data to the data processor 1. For example, if defective data is stored in a memory device such as a DRAM (dynamic random access memory), the defective data is input from the memory device to the data processor 1 by DMA (direct memory access) transfer. The method of inputting detective data to the data processor 1 is not limited to this method.

The write unit 4 writes the defective data input from the outside of the data processor 1 into the memory 3. The buffer selecting unit 7 determines a target buffer for data writing or determines a target buffer for data reading from a plurality of buffers of the memory 3 described below.

The decision circuit 5 reads address data (x-coordinate data) included in the defective data from the memory 3, and performs a predetermined decision process using the address data. The output circuit 6 outputs correction method identifying data in the memory 3 to the pixel defect correcting unit 2, on the basis of the result of the decision process by the decision circuit 5. Through the actions of the decision circuit 5 and the output circuit 6, the correction method identifying data indicating the correction method for the defective pixel data is input to the pixel defect correcting unit 2 depending on the timing at which defective pixel data is input to the pixel defect correcting unit 2. The pixel defect correcting unit 2 can thus correct the input correct defective pixel data by a corresponding correction method.

<Way to Input Pixel Data>

In this embodiment, pixel data is input to the data processor 1 line by line. Further, each line of the imaging device is divided into a plurality of partial areas, and pieces of pixel data on the plurality of partial areas are input to the data processor 1 in parallel. In this embodiment, each line is divided into two partial areas 11A and 11B. FIG. 2 shows the state of division.

As shown in FIG. 2, one line 10 is divided into the partial area 11A including the leading pixel and the partial area 11B including the final pixel. The partial area 11A and the partial area 11B partially overlap. Letting the leading and final x-coordinate values of the partial area 11A be xAst and xAend, respectively, and the leading and final x-coordinate values of the partial area 11B be xBst and xBend, respectively, Expressions (1) to (3) below hold, where xAst=0.

$$xAst < xBst \quad (1)$$

$$xAend > xBst \quad (2)$$

$$xAend < xBend \quad (3)$$

Here, letting the x-coordinate value of the reference point of one line 10 be xref (xBst<xref<xAend), xBst−xref=xref−xAend=L (L is an integer equal to or larger than one). That is, the final x-coordinate value of the partial area 11A is located rearward of the x-coordinate value of the reference point of the line 10 by L, and the leading x-coordinate value of the partial area 11B is located forward of the x-coordinate value of the reference point of the line 10 by L. Hereinafter, the portion of the partial area 11A, extending from xref to xAend, is referred to as an "extension portion 110A." The portion of the partial area 11B, extending from xBst to xref, is referred to as an "extension portion 110B."

In this embodiment, the partial area 11A has the extension portion 110A as described above, and thus, the pixel data on a defective pixel located slightly forward of the reference point in the partial area 11A can be corrected using the pixel data on the pixel rearward of the reference point (the pixel data on a pixel of the extension portion 110A). Additionally, the pixel data on a defective pixel located slightly rearward of the reference point in the partial area 11B can be corrected using the pixel data on a pixel located forward of the reference point (the pixel data on a pixel of the extension portion 110B).

L indicating the lengths of the extension portions 110A and 110B is determined depending on a distance between a pixel, pixel data on which is to be used, and the defective pixel in the x-axis direction when the pixel defect correcting unit 2 performs pixel defect correction. For example, in the case where the pixel defect correcting unit 2 uses the pixel data on a pixel three pixels away from the defective pixel in the x direction, L is set to three.

The data processor 1 receives pieces of pixel data on a plurality of pixels constituting the partial area 11A one by one in ascending order of x-coordinate value, in synchronization with an operation clock signal. Additionally, the data processor 1 receives pieces of pixel data on a plurality of pixels constituting the partial area 11B one by one in ascending order of x-coordinate value, in synchronization with an operation clock signal. The data processor 1 receives pixel data on one pixel belonging to the partial area 11A and pixel data on one pixel belonging to the partial area 11B in parallel.

Specifically, the data processor 1 receives pixel data on a pixel in the partial area 11A and pixel data on a pixel in the partial area 11B in parallel at a rising edge of an operation clock signal, receives pixel data on a succeeding pixel in the partial area 11A and pixel data on a succeeding pixel in the partial area 11B in parallel at a succeeding rising edge of the operation clock signal, and receives pixel data on a further succeeding pixel in the partial area 11A and pixel data on a further succeeding pixel in the partial area 11B in parallel at a further succeeding rising edge of the operation clock signal. Likewise, the data processor 1 will receive pixel data on one pixel belonging to the partial area 11A and pixel data on one pixel belonging to the partial area 11B in parallel.

As described above, in this embodiment, the data processor 1 receives pixel data obtained from the partial area 11A and pixel data obtained from the partial area 11B in parallel. The pixel defect correcting unit 2 corrects the defective pixel data obtained from the partial area 11A and corrects the defective pixel data obtained from the partial area 11B in parallel. This reduces processing time. Hereinafter, the partial areas 11A and 11B are each referred to as a "partial area 11" if they do not need to be particularly distinguished from each other.

<Configuration of Pixel Defect Correcting Unit>

Figure 3:
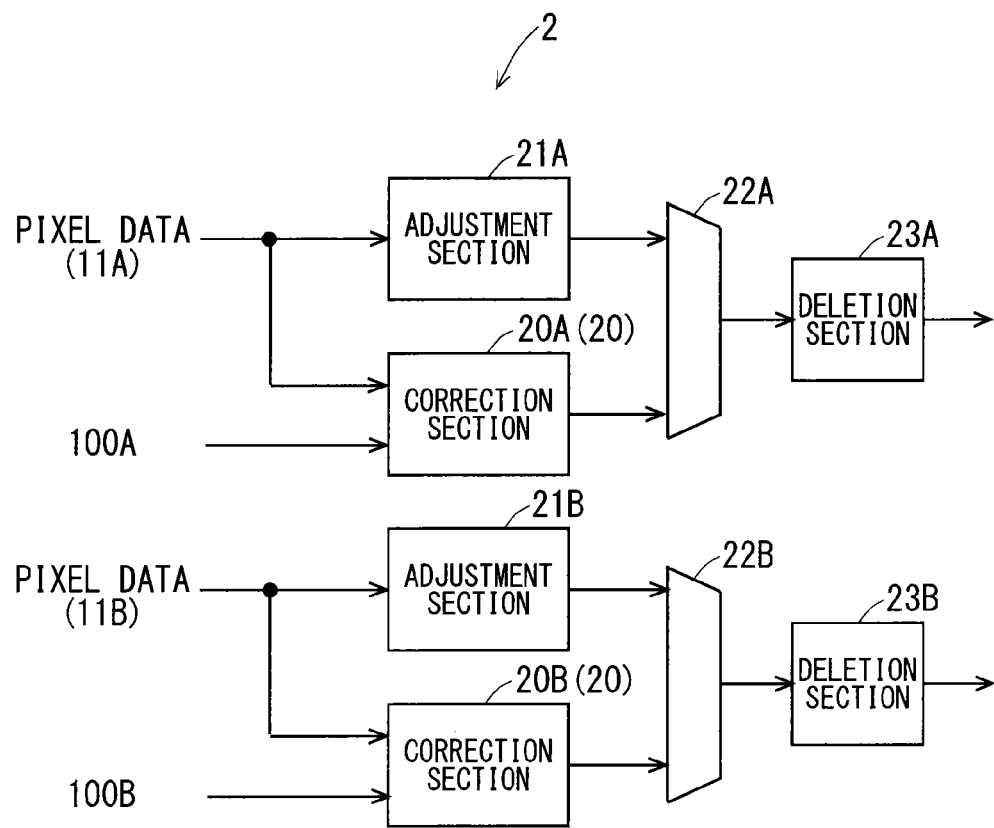
FIG. 3 shows the configuration of a pixel defect correcting unit.

FIG. 3 shows the configuration of the pixel defect correcting unit 2. The pixel defect correcting unit 2 includes correction sections 20A and 20B, adjustment sections 21A and 21B, selection circuits 22A and 22B, and deletion sections 23A and 23B. The correction section 20A, adjustment section 21A, selection circuit 22A, and deletion section 23A form a circuit that processes the pixel data obtained from the partial area 11A. The correction section 20B, adjustment section 21B, selection circuit 22B, and deletion section 23B form a circuit that processes the pixel data obtained from the partial area 11B.

The correction section 20A corrects the defective pixel data obtained from the partial area 11A by the correction method indicated by correction method identifying data 100A described below, which is output from the output circuit 6. The correction section 20B corrects the defective pixel data obtained from the partial area 11B by the correction method indicated by correction method identifying data 100B described below, which is output from the output circuit 6. The adjustment section 21A delays the pixel data obtained from the partial area 11A by a predetermined time period and then outputs the delayed pixel data. The adjustment section 21B delays the pixel data obtained from the partial area 11B by a predetermined time period and then outputs the delayed pixel data.

The selection circuit 22A selects any one of the data output from the adjustment section 21A and the data output from the correction section 20A and then outputs the selected one. Specifically, when the defective pixel data obtained from the partial area 11A is input to the data processor 1, the selection circuit 22A outputs this defective pixel data after the correction, which is output from the correction section 20A. Contrastingly, when the normal pixel data obtained from the partial area 11A is input to the data processor 1, the selection circuit 22A outputs this normal pixel data output from the adjustment section 21A.

Similarly, when the defective pixel data obtained from the partial area 11B is input to the data processor 1, the selection circuit 22B outputs this defective pixel data after the correction, which is output from the correction section 20B. Contrastingly, when the normal pixel data obtained from the partial area 11B is input to the data processor 1, the selection circuit 22B outputs this normal pixel data output from the adjustment section 21B.

The deletion section 23A deletes pieces of pixel data on a plurality of pixels included in the extension portion 110A among a plurality of pieces of pixel data (also including the defective pixel data after the correction) respectively corresponding to a plurality of pixels constituting the partial area 11A, which are output from the selection circuit 22A, and outputs the other plurality of pieces of pixel data. As a result, the pixel defect correcting unit 2 outputs pieces of pixel data in the first half portion of one line.

The deletion section 23B deletes pieces of pixel data on a plurality of pixels included in the extension portion 110B among a plurality of pieces of pixel data (also including the defective pixel data after the correction) respectively corresponding to a plurality of pixels constituting the partial area 11B, which are output from the selection circuit 22B, and outputs the other plurality of pieces of pixel data. As a result, the pixel defect correcting unit 2 outputs pieces of pixel data in the second half portion of one line.

When the deletion section 23A outputs pieces of pixel data in the first half portion of a line, the deletion section 23B outputs pieces of pixel data in the second half portion of the line. As a result, the data processor 1 outputs pieces of pixel data for one line.

The pixel defect correcting unit 2 may be devoid of the deletion sections 23A and 23B. In this case, pieces of pixel data on a plurality of pixels included in the extension portion 110A and pieces of pixel data on a plurality of pixels included in the extension portion 110B are deleted downstream of the pixel defect correcting unit 2. Hereinafter, the correction sections 20A and 20B are each referred to as a "correction section 20" if they do not need to be particularly distinguished from each other.

<Configurations of Memory and Decision Circuit>

<Memory>

FIG. 4 shows the configurations of the memory 3 and the decision circuit 5.

As shown in FIG. 4, the memory 3 includes a plurality of buffers $30\alpha$ and $30\beta$. The buffers $30\alpha$ and $30\beta$ each is composed of a plurality of flip-flops. The buffers $30\alpha$ and $30\beta$ may be composed of components other than flip-flops. The write unit 4 writes the defective data input to the data processor 1 into each of the buffers $30\alpha$ and $30\beta$. The decision circuit 5 reads the pieces of defective data in the buffers $30\alpha$ and $30\beta$. When the defective data is written into the buffer $30\alpha$, the defective data is read from the buffer $30\beta$. When the defective data is written into the buffer $30\beta$, the defective data is read from the buffer $30\alpha$. Hereinafter, the buffers $30\alpha$ and $30\beta$ are each referred to as a "buffer 30" if they do not need to be particularly distinguished from each other.

Each buffer 30 has, for example, N (N is a positive integer) memory areas. For example, N=128. The N memory areas of the buffer 30 are respectively provided with addresses from 0 to (N−1). In each buffer 30, defective data corresponding to one defective pixel is stored in one memory area. Pieces of defective data for one line are written into each buffer 30. Hereinafter, the address of each memory area of the buffer 30 is referred to as a "buffer address." A mere "memory area" refers to the memory area of the buffer 30.

<Decision Circuit>

The decision circuit 5 includes a plurality of counters 50A and 50B and a plurality of decision units 51A and 51B. The counter 50A and the decision unit 51A form the circuit corresponding to the partial area 11A, and the counter 50B and the decision unit 51B form the circuit corresponding to the partial area 11B.

Each of the counters 50A and 50B is an up counter. Each of the counters 50A and 50B counts up one by one from an initial value in synchronization with an operation clock signal, and then outputs the count value (count data).

The counter 50A corresponding to the partial area 11A counts up one by one from the leading x-coordinate value xAst (=0) of the partial area 11A to the final x-coordinate value xAend of the partial area 11A. When the counter 50A counts up to the final x-coordinate value xAend of the partial area 11A, the count value cntA is reset. Then, the counter 50A again counts up one by one from the leading x-coordinate value xAst to the final x-coordinate value xAend of the partial area 11A.

Similarly, the counter 50B corresponding to the partial area 11B counts up one by one from the leading x-coordinate value xBst of the partial area 11B to the final x-coordinate value xBend of the partial area 11B. When the counter 50B counts up to the final x-coordinate value xBend of the partial area 11B, the count value cntB is reset. Then, the counter 50B again counts up one by one from the leading x-coordinate value xBst to the final x-coordinate value xBend of the partial area 11B.

As described above, the counter 50A outputs the x-coordinate values of a plurality of pixels constituting the partial area 11A one by one from the leading one. It can therefore be said that the count value cntA of the counter 50A indicates the x-coordinate value of the pixel belonging to the partial area 11A. The counter 50A outputs, depending on the timing at which the pixel data on a pixel belonging to the partial area 11A is input to the data processor 1 (pixel defect correcting unit 2), the x-coordinate value of this pixel.

Similarly, the counter 50B outputs the x-coordinate values of a plurality of pixels constituting the partial area 11B one by one from the leading one. It can therefore be said that the count value cntB of the counter 50B indicates the x-coordinate value of the pixel belonging to the partial area 11B. The counter 50B outputs, depending on the timing at which the pixel data on a pixel belonging to the partial area 11B is input to the data processor 1, the x-coordinate value of this pixel.

Although this embodiment describes, as an example, the case in which the counter 50B counts the leading x-coordinate value xBst of the partial area 11B when the counter 50A counts the leading x-coordinate value xAst of the partial area 11A, the counter 50B may count a value other than the x-coordinate value xBst when the counter 50A counts the x-coordinate value xAst. Hereinafter, the counters 50A and 50B are each referred to as a "counter 50" if they do not need to be particularly distinguished from each other.

The decision unit 51A decides whether the buffer 30 has the x-coordinate data that matches the count value cntA output from the counter 50A. In other words, the decision unit 51A decides whether the current count value cntA matches the x-coordinate data on the defective pixel in the buffer 30. The decision unit 51A outputs a hit signal hitA when the count value cntA matches the x-coordinate data on the defective pixel in the buffer 30. The count value cntA indicates the x-coordinate value of a pixel for the pixel data in the partial area 11A, which is input to the data processor 1. It can therefore be said that the decision unit 51A outputs a hit signal hitA in the case where the pixel data in the partial area 11A, which is input to the data processor 1, is defective pixel data.

Similarly, the decision unit 51B decides whether the current count value cntB matches the x-coordinate data on the defective pixel in the buffer 30. The decision unit 51B outputs a hit signal hitB in the case where the count value cntB matches the x-coordinate data on the defective pixel in the buffer 30. In other words, the decision unit 51B outputs a hit signal hitB in the case where the pixel data in the partial area 11B, which is input to the data processor 1, is defective pixel data.

The decision unit 51A includes a comparison section 510A, a read section 511A, and a selection circuit 512A. The selection circuit 512A selects any one of the buffers $30\alpha$ and $30\beta$ on the basis of a read selection signal RS output from the buffer selecting unit 7. The read selection signal RS is a signal indicating which of the buffers $30\alpha$ and $30\beta$ is currently a read target. The selection circuit 512A selects, from the buffers $30\alpha$ and $30\beta$, the buffer 30 indicated by the read selection signal RS, that is, the buffer 30 being a read target (hereinafter, referred to as a "read buffer 30"). The read selection signal RS indicates, for example, "0" or "1." The read selection signal RS indicating "0" means that the read buffer 30 is the buffer $30\alpha$, while the read selection signal RS indicating "1" means that the read buffer 30 is the buffer $30\beta$.

The read section 511A includes a read pointer rpA indicating a buffer address. The read section 511A reads, from a memory area having a buffer address indicated by the read pointer rpA, the x-coordinate data included in the defective data stored in this memory area in the read buffer 30 selected by the selection circuit 512A. The comparison section 510A compares the count value output from the counter 50A with the x-coordinate data read from the read section 511A and, when they match, outputs a hit signal hitA. The hit signal hitA is, for example, a binary signal that enters High level for only a predetermined time period. The hit signal hitA indicates that the current count value cntA matches the x-coordinate data in the read buffer 30.

Similarly, the decision unit 51B includes a comparison section 510B, a read section 511B, and a selection circuit 512B. The selection circuit 512B selects, from the buffers $30\alpha$ and $30\beta$, the buffer 30 indicated by the read selection signal, that is, the read buffer 30. The read section 511B includes a read pointer rpB indicating a buffer address. The read section 511B reads, from a memory area having a buffer address indicated by the read pointer rpB, the x-coordinate data included in the defective data stored in this memory area in the read buffer 30 selected by the selection circuit 512B. The comparison section 510B compares the count value output from the counter 50B with the x-coordinate data read from the read section 511B and, when they match, outputs a hit signal hitB. The hit signal hitB is, for example, a binary signal that enters High level for only a predetermined time period. The hit signal hitB indicates that the current count value cntB matches the x-coordinate data in the read buffer 30.

Hereinafter, the decision units 51A and 51B are each referred to as a "decision section 51" if they do not need to be particularly distinguished from each other. The operation of the decision circuit 5 will be described below in detail.

<Configuration of Output Circuit>

Figure 5:
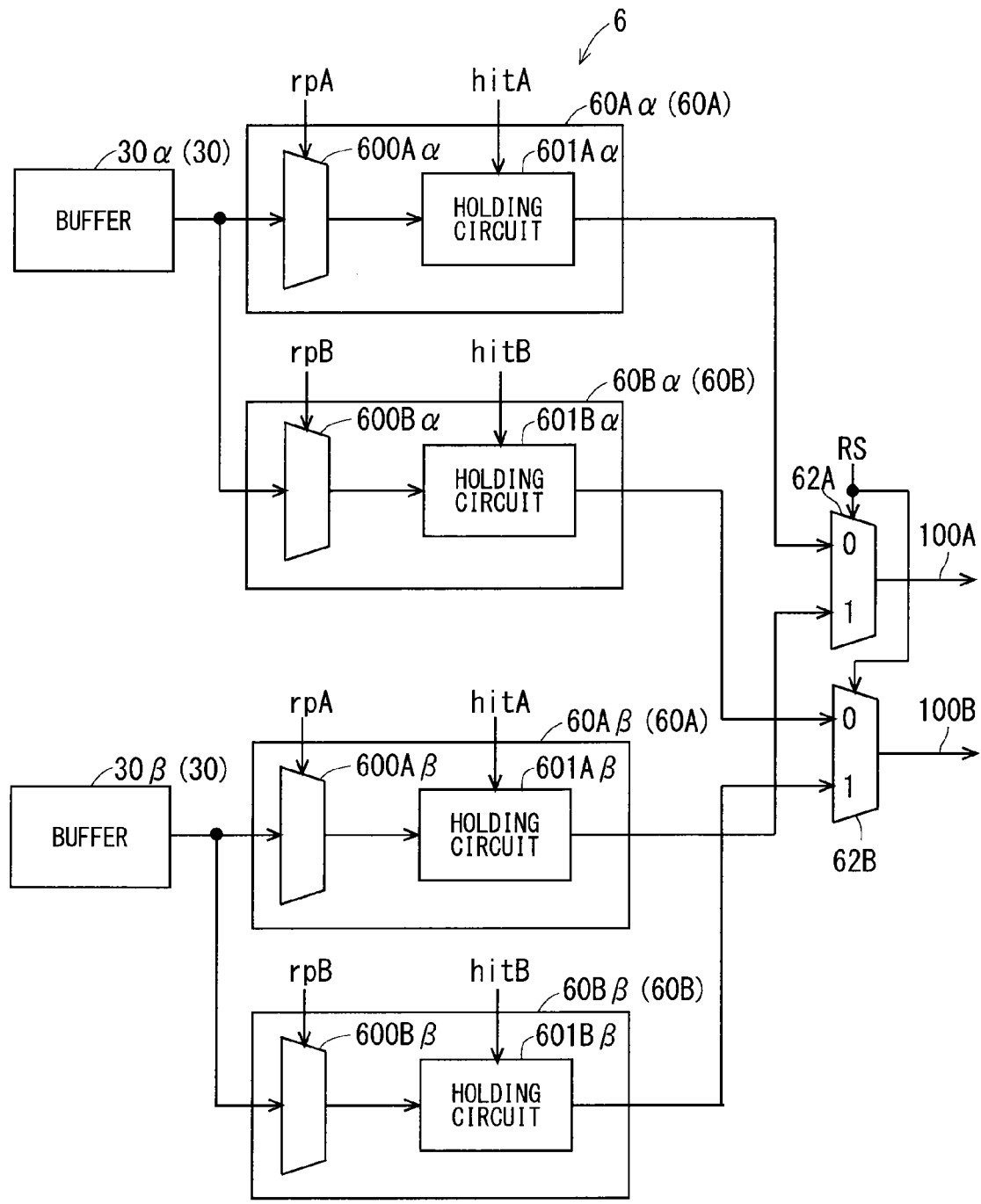
FIG. 5 shows the configuration of an output circuit.

FIG. 5 shows the configuration of the output circuit 6. As shown in FIG. 5, the output circuit 6 includes a plurality of output units $60A\alpha$, $60B\alpha$, $60A\beta$, and $60B\beta$, and a plurality of selection circuits 62A and 62B. The output units $60A\alpha$ and $60B\alpha$ correspond to the buffer $30\alpha$, and the output units $60A\beta$ and $60B\beta$ correspond to the buffer $30\beta$. The output units $60A\alpha$ and $60A\beta$ and the selection circuit 62A correspond to the partial area 11A, and the output units $60B\alpha$ and $60B\beta$ and the selection circuit 62B correspond to the partial area 11B.

The output unit $60A\alpha$ includes a selection circuit $600A\alpha$ and a holding circuit $601A\alpha$. The selection circuit $600A\alpha$ selects, from a plurality of memory areas included in the buffer $30\alpha$, a memory area having a buffer address indicated by the read pointer rpA in the decision unit 51A. Then, the selection circuit $600A\alpha$ outputs correction method identifying data included in the defective data stored in the selected memory area (the defective data on the defective pixel of the partial area 11A). Upon receipt of a hit signal hitA, the holding circuit 601Aα holds and outputs the correction method identifying data output from the selection circuit 600Aα.

The output unit 60Bα includes a selection circuit 600Bα and a holding circuit 601Bα. The selection circuit 600Bα selects, from a plurality of memory areas included in the buffer 30α, a memory area having a buffer address indicated by the read pointer rpB in the decision unit 51B. Then, the selection circuit 600Bα outputs the correction method identifying data included in the defective data stored in the selected memory area (the defective data on the defective pixel of the partial area 11B). Upon receipt of a hit signal hitB, the holding circuit 601Bα holds and outputs the correction method identifying data output from the selection circuit 600Bα.

The output unit 60Aβ includes a selection circuit 600Aβ and a holding circuit 601Aβ. The selection circuit 600Aβ selects, from a plurality of memory areas included in the buffer 30β, a memory area having a buffer address indicated by the read pointer rpA. Then, the selection circuit 600Aβ outputs the correction method identifying data included in the defective data stored in the selected memory area. Upon receipt of a hit signal hitA, the holding circuit 601Aβ holds and outputs the correction method identifying data output from the selection circuit 600Aβ.

The output unit 60Bβ includes a selection circuit 600Bβ and a holding circuit 601Bβ. The selection circuit 600Bβ selects, from a plurality of memory areas included in the buffer 30β, a memory area having a buffer address indicated by the read pointer rpB. Then, the selection circuit 600Bβ outputs the correction method identifying data included in the defective data stored in the selected memory area. Upon receipt of a hit signal hitB, the holding circuit 601Bβ holds and outputs the correction method identifying data output from the selection circuit 600Bβ.

Hereinafter, the output units 60Aα and 60Aβ are each referred to as an "output unit 60A" if they do not need to be particularly distinguished from each other. The output units 60Bα and 60Bβ are each referred to as an "output unit 60B" if they do not need to be particularly distinguished from each other.

The selection circuit 62A selects, from the output units 60Aα and 60Aβ corresponding to the partial area 11A, the output unit 60A corresponding to the read buffer 30 indicated by the read selection signal RS, and then outputs correction method identifying data output from the output unit 60A. In other words, the selection circuit 62A outputs the correction method identifying data from the output unit 60Aα corresponding to the buffer 30α when the read selection signal RS indicates "0" or outputs the correction method identifying data from the output unit 60Aβ corresponding to the buffer 30β when the read selection signal RS indicates "1." The selection circuit 62A corresponding to the partial area 11A outputs the correction method identifying data indicating the method of correcting the defective pixel data obtained from the partial area 11A. The correction method identifying data output from the selection circuit 62A is referred to as "correction method identifying data 100A."

The selection circuit 62B selects, from the output units 60Bα and 60Bβ corresponding to the partial area 11B, the output unit 60B corresponding to the read buffer 30 indicated by the read selection signal RS, and then outputs the correction method identifying data output from the output unit 60B. In other words, the selection circuit 62B outputs the correction method identifying data from the output unit 60Bαcorresponding to the buffer 30α when the read selection signal RS indicates "0" or outputs the correction method identifying data from the output unit 60Bβ corresponding to the buffer 30β when the read selection signal RS indicates "1." The selection circuit 62B corresponding to the partial area 11B outputs the correction method identifying data indicating the method of correcting the defective pixel data obtained from the partial area 11B. The correction method identifying data output from the selection circuit 62B is referred to as "correction method identifying data 100B."

In the example above, the decision circuit 5 obtains x-coordinate data from the memory area having a buffer address indicated by the read pointer rpA and the output circuit 6 obtains correction method identifying data from the memory area. Alternatively, defective data may be obtained from the memory area, and x-coordinate data and correction method identifying data included in the defective data may be used in each of the decision circuit 5 and the output circuit 6.

<Operation of Write Unit>

FIG. 6 is a timing chart showing the operation of the write unit 4. FIG. 6 shows the operation of the write unit 4 when the write unit 4 writes defective data into the buffer 30 currently being a write target (hereinafter, referred to as a "write buffer 30") of the buffers 30α and 30β of the memory 3.

In this embodiment, defective data is input to the write unit 4 per line. The write unit 4 receives pieces of defective data per line, in ascending order of y-coordinate value of the corresponding line. Further, the write unit 4 receives pieces of defective data on a plurality of defective pixels included in a line (a plurality of pieces of defective data corresponding to the line) in ascending order of x-coordinate data in the corresponding line (x-coordinate value of the defective pixel), in synchronization with an operation clock signal.

For example, when a plurality of pieces of defective data on a line are input to the write unit 4 in ascending order of x-coordinate data included therein, a plurality of pieces of defective data on the line of a y-coordinate value one larger than the y-coordinate value of this line are input to the write unit 4 in ascending order of defective data included therein. Hereinafter, the line to be described will be referred to as a "target line."

FIG. 6 shows the operation of the write unit 4 when the defective data on a target line is written into the write buffer 30. The "input timing" shown in FIG. 6 indicates the timing at which the defective data on a target line is written into the write unit 4. The "write timing" shown in FIG. 6 indicates the timing at which the write unit 4 writes the input defective data into the write buffer 30.

In this embodiment, in the order from a memory area having a smaller buffer address (in the order from the memory area having a buffer address 0), a plurality of pieces of defective data on a target line are written into the write buffer 30 in synchronization with an operation clock signal in the order in which they are input to the write unit 4. Thus, among the pieces of defective data on a target line, the defective data to be input K-th (K is an integer equal to or larger than zero) to the write unit 4 is written into the memory area having a buffer address K of the write buffer 30. [K] shown in FIG. 6 represents the defective data to be written into the memory area of the buffer address K of the write buffer 30.

As shown in FIG. 6, upon receipt of the K-th defective data, the write unit 4 writes the K-th defective data into the memory area having the buffer address K of the write buffer 30 at the timing at which succeeding (K+1)th defective data is input thereto (at a succeeding rising edge of an operation clock signal).

The write unit 4 includes a write pointer wpA corresponding to the partial area 11A and a write pointer wpB corresponding to the partial area 11B. The write unit 4 initializes the values of the write pointers wpA and wpB to "0" at the timing at which the first defective data on the target line is input.

Upon receipt of defective data on a target line, the write unit 4 compares the x-coordinate data included in the defective data with the leading x-coordinate value xBst (see FIG. 2) of the partial area 11B and, if the x-coordinate data is smaller than the x-coordinate value xBst, increments the value of the write pointer wpB by one at the timing of writing the defective data into the write buffer 30, that is, the timing at which the succeeding defective data is input. Contrastingly, the write unit 4 keeps the current value of the write pointer wpB if the x-coordinate data is equal to or larger than the x-coordinate value xBst. In this embodiment, a plurality of pieces of defective data on a target line are input to the write unit 4 in ascending order of x-coordinate data included therein. Thus, when the x-coordinate data of the defective data is equal or larger than the x-coordinate value xBst, the x-coordinate data of the defective data to be input thereafter is inevitably equal to or larger than the x-coordinate value xBst. In the example of FIG. 6, the x-coordinate data included in the p-th defective data is equal to or larger than the x-coordinate value xBst, and the value of the write pointer wpB is always kept at "p." The value of the write pointer wpA is always kept at "0."

When the write unit 4 writes the final defective data on the target line into the write buffer 30 and writing of all the pieces of defective data on the target line into the write buffer 30 is complete, the decision circuit 5 obtains the values of the write pointers wpA and wpB at that time as the initial values of the read pointers rpA and rpB, respectively. In the example of FIG. 6, the z-th defective data indicated by [z] is the final defective data on the target line, and the initial values of the read pointers rpA and rpB are "0" and "p," respectively.

After writing each piece of defective data on a line (referred to as a "first line") into one of the buffers 30, the write unit 4 writes the defective data on a line following the first line (referred to as a "second line") into the other buffer 30. While the write unit 4 is writing the defective data on the second line into the other buffer 30, the decision circuit 5 reads the defective data on the first line from the one buffer 30. After writing each piece of defective data on the second line into the other buffer 30, the write unit 4 writes the defective data on a line following the second line (referred to as a "third line") into the one buffer 30. While the write unit 4 is writing the defective data on the third line into one buffer 30, the decision circuit 5 reads the defective data on the second line from the other buffer 30. Thereafter, the write unit 4 and the decision circuit 5 operate in a similar manner.

As described above, in this embodiment, the defective data on a line, which has been written into one buffer 30, is read from the one buffer 30 while the defective data on a succeeding line is being written into the other buffer 30. Each buffer 30 repeatedly serves as a read target and a write target in an alternate manner.

Through the above-mentioned operation of the write unit 4, the initial value of the read pointer rpA indicates the buffer address of the memory area into which the defective data on the defective pixel having the smallest x-coordinate value among the defective pixels included in the partial area 11A, that is, the leading defective pixel in the partial area 11A, is written. In this embodiment, pieces of defective data on a plurality of defective pixels included in a line are input to write unit 4 in ascending order of x-coordinate data included therein. Further, in the order from the memory area having a smaller buffer address, a plurality of pieces of defective data on a line are written into the write buffer 30 in the order in which they are input to the write unit 4. In other words, in the order from the memory area having a smaller buffer address, a plurality of pieces of defective data on a line are written into the write buffer 30 in ascending order of x-coordinate data included therein. Thus, the defective data on the leading defective pixel in the partial area 11A is written into the memory area having a buffer address 0. In the example of FIG. 6, the initial value of the read pointer rpA is "0," indicating the buffer address of a memory area into which the defective data on the leading defective pixel of the partial area 11A is written.

Through the above-mentioned operation of the write unit 4, the initial value of the read pointer rpB indicates the buffer address of the memory area into which the defective data on defective pixel having the smallest x-coordinate value among the defective pixels included in the partial area 11B, that is, the leading defective pixel in the partial area 11B, is written. In this embodiment, as described above, in the order from the storage area having a smaller buffer address, a plurality of pieces of defective data on a line are written into the write buffer 30 in ascending order of x-coordinate data included therein. Then, the write unit 4 increments the write pointer wpB by one every time defective data is input until the defective data including the x-coordinate data of the leading x-coordinate value xBst or more in the partial area 11B is input, that is, until the defective data on the leading defective pixel is input and, after the defective data on the leading defective pixel in the partial area 11B is input, keeps the value of the write pointer wpB. Consequently, the value of the write pointer wpB at the time when the writing of the defective data for one line into the buffer 30 is complete, that is, the initial value of the read pointer rpB indicates the buffer address of the memory area into which the defective data on the leading defective pixel of the partial area 11B is written. In the example of FIG. 6, the defective data on the leading defective pixel in the partial area 11B is the defective data to be input p-th, and is written into the memory area having a buffer address p. The initial value "p" of the read pointer rpB indicates the buffer address of a memory area into which the defective data on the leading defective pixel is written in the partial area 11B.

<Operations of Decision Circuit and Output Circuit>

Figure 7:
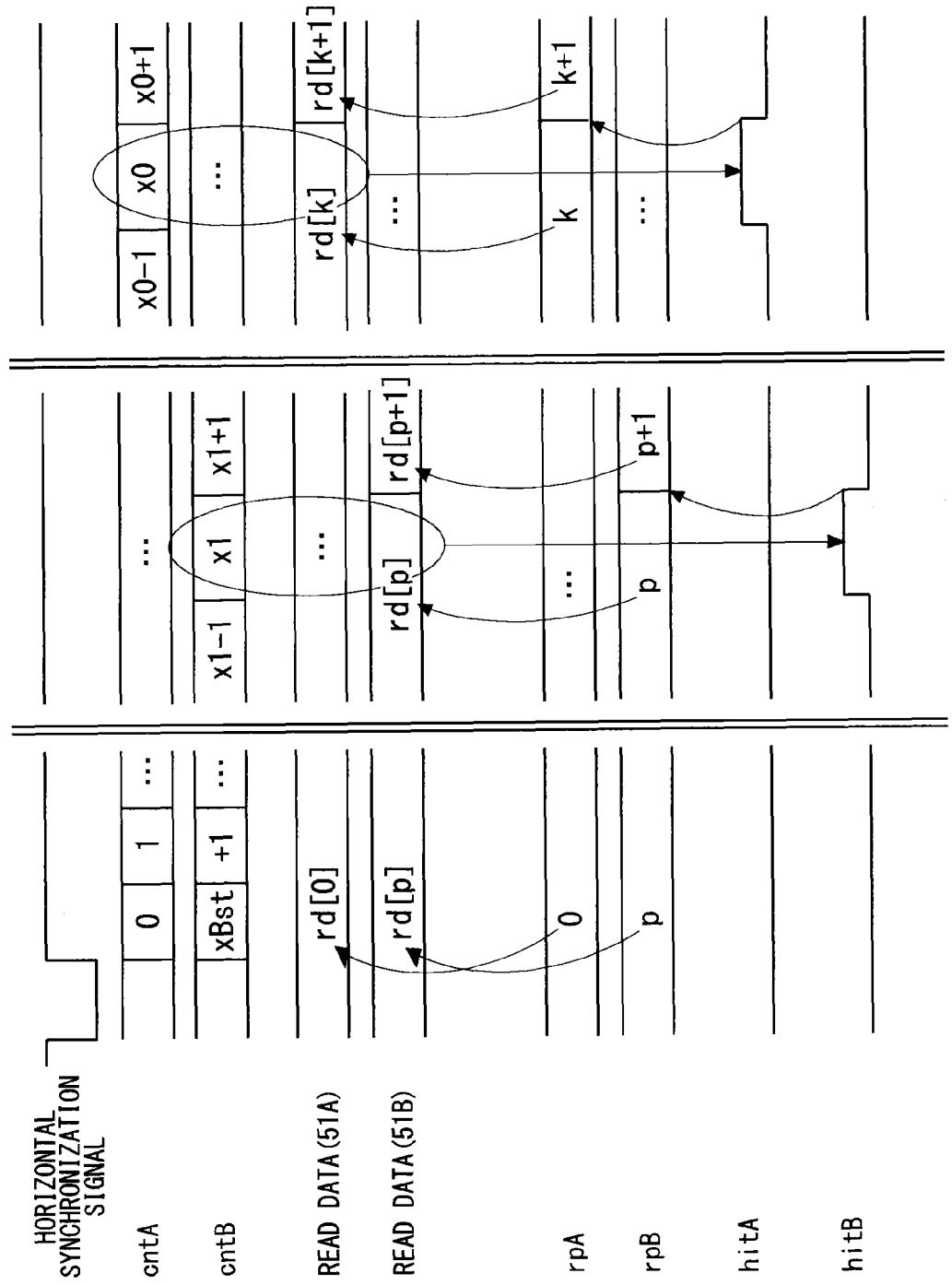
FIG. 7 is a timing chart showing the operation of the decision circuit.

FIG. 7 is a timing chart showing the operation of the decision circuit 5. FIG. 7 shows the operation of the decision circuit 5 when the buffer 30, into which the defective data on a target line has been written as in the example of FIG. 6 described above, serves as a read target and defective data is read from the buffer 30. In FIG. 7, "read data (51A)" shows the data read from the read buffer 30 by the read section 511A of the decision unit 51A. In FIG. 7, "read data (51B)" shows the data read from the read buffer 30 by the read section 511B of the decision unit 51B.

In this embodiment, a horizontal synchronization signal is input per line depending on the timing at which the pixel data on the leading pixel of a line is input to the data processor 1. The horizontal synchronization signal is a binary signal showing Low level for only a predetermined time period. For each of the lines, pieces of pixel data on a plurality of pixels constituting each line are input to the data processor 1, following the horizontal synchronization signal.

The decision circuit 5 reads the defective data from the read buffer 30 in synchronization with an input of pixel data to the data processor 1 (in synchronization with an operation clock signal).

As shown in FIG. 7, when a horizontal synchronization signal is input to the data processor 1, the count values of the counters 50A and 50B are initialized at the rising edge of the horizontal synchronization signal. Specifically, the count value cntA is initialized to "0," and the count value cntB is initialized to "xBst."

After initializing the count values cntA and cntB, the counters 50A and 50B count up the count values cntA and cntB by one at every predetermined timing (at every rising edge of an operation signal). In this case, the counter 50A counts up the count value cntA depending on the timing at which the pixel data on a pixel belonging to the partial area 11A is input to the data processor 1. Upon this, depending on the timing at which the pixel data on a pixel belonging to the partial area 11A is input to the data processor 1, the counter 50A outputs the x-coordinate value of the pixel. Contrastingly, the counter 50B counts up the count value cntB depending on the timing at which the pixel data on a pixel belonging to the partial area 11B is input to the data processor 1. Upon this, depending on the timing at which the pixel data on a pixel belonging to the partial area 11B is input to the data processor 1, the counter 50B outputs the x-coordinate value of the pixel.

When a horizontal synchronization signal is input to the data processor 1, in the decision unit 51A, the read section 511A reads, from a memory area of the read buffer 30, which has a buffer address (0) indicated by the initial value of the read pointer rpA, the x-coordinate data included in the defective data stored in the memory area. In other words, the read section 511A reads the x-coordinate value of the leading defective pixel in the partial area 11A from the memory area. In FIG. 7, rd[K] indicates the x-coordinate data read from the memory area having a buffer address K. The comparison section 510A compares the initial value "0" of the count value cntA of the counter 50A with the x-coordinate data read by the read section 511A. The comparison section 510A outputs a hit signal hitA when they match. When the comparison section 510A outputs the hit signal hitA, the read section 511A increments the value of the read pointer rpA by one at a falling edge of the hit signal hitA.

After that, when the count value cntA of the counter 50A is incremented by one, in the decision unit 51A, the read section 511A reads, from a memory area having a buffer address indicated by the current value of the read pointer rpA, the x-coordinate data included in the defective data stored in the memory area. The comparison section 510A compares the count value cntA with the x-coordinate data read by the read section 511A. The comparison section 510A outputs a hit signal hitA when they match. When the comparison section 510A outputs the hit signal hitA, the read section 511A increments the value of the read pointer rpA by one at the falling edge of the hit signal hitA. Thereafter, the decision unit 51A operates similarly every time the count value cntA is incremented by one.

In the example of FIG. 7, when the count value cntA is "x0," the x-coordinate data (rd[k]) read from the memory area having a buffer address k matches the count value cntA, and then a hit signal hitA is output. Then, at the rising edge of the hit signal hitA, the value of the read pointer rpA is incremented by one to "k+1." When the count value cntA becomes "x0+1," the decision unit 51A compares the x-coordinate data (rd[k+1]) read from the memory area having the buffer address (k+1) with "x0+1."

The decision unit 51B operates similarly to the decision unit 51A. When a horizontal synchronization signal is input to the data processor 1, in the decision unit 51B, the read section 511B reads x-coordinate data from a memory area having a buffer address indicated by an initial value (p) of the read pointer rpB. In other words, the read section 511B reads an x-coordinate value of the leading defective pixel in the partial area 11B from the memory area. The comparison section 510B compares the initial value "xBst" of the count value cntB with the x-coordinate data read by the read section 511B. The comparison section 510B outputs a hit signal hitB when they match. When the comparison section 510B outputs a hit signal hitB, the read section 511B increments the value of the read pointer rpB by one at the falling edge of the hit signal hitB.

After that, when the count value cntB of the counter 50B is incremented by one, in the decision unit 51B, the read section 511B reads x-coordinate data from a memory area having a buffer address indicated by the current value of the read pointer rpB. The comparison section 510B compares the count value cntB with the x-coordinate data read by the read section 511B. The comparison section 510A outputs a hit signal hitB when they match. When the comparison section 510B outputs the hit signal hitB, the read section 511B increments the value of the read pointer rpB by one at the falling edge of the hit signal hitB. Thereafter, the decision unit 51B operates similarly every time the count value cntB is incremented by one.

In the example of FIG. 7, when the count value cntB is "x1," the x-coordinate data (rd[p]) read from the memory area having a buffer address p matches the count value cntB, and then a hit signal hitB is output. At the rising edge of the hit signal hitB, the value of the read pointer rpB is incremented by one to "p+1." When the count value cntB becomes "x1+1," the decision unit 51B compares the x-coordinate data (rd[p+1]) read from the memory area having the buffer address (p+1) with "x1+1."

When the comparison section 510A outputs a hit signal hitA, in the output circuit 6, the output unit 60A connected with the read buffer 30 outputs correction method identifying data included in the defective data stored in the memory area having the buffer address indicated by the read pointer rpA. In other words, the output unit 60A outputs the correction method identifying data stored in the same memory area as that of the x-coordinate data, which has been judged to match the count value cntA, that is, correction method identifying data related to this x-coordinate data. The correction method identifying data is input from the selection circuit 62A to the correction section 20A as the correction method identifying data 100A.

Here, the hit signal hitA is output when the count value cntA matches the x-coordinate data in the memory area having a buffer address indicated by the read pointer rpA, that is, when the count value cntA indicates the x-coordinate value of the defective pixel of the partial area 11A. The count value cntA indicates, depending on the timing at which pixel data is input to the data processor 1, the x-coordinate value of a pixel corresponding the pixel data. Thus, the hit signal hitA is output depending on the timing at which the pixel data on the defective pixel of the partial area 11A is input to the data processor 1. When the hit signal hitA is output, the correction method identifying data in the memory area having a buffer address indicated by the read pointer rpA, that is, the correction method identifying data indicating the correction method for the pixel data on a defective pixel having an x-coordinate value matching the count value cntA is output. Thus, depending on the timing at which pixel data on the defective pixel of the partial area 11A is input to the correction section 20A, the correction method identifying data 100A indicating the correction method for the pixel data is input to the correction section 20A. As a result, the defective pixel data on the partial area 11A is input to the correction section 20A, and the correction method identifying data 100A indicating the correction method for the defective pixel data is input thereto. This allows the correction section 20A to appropriately correct the defective pixel data on the partial area 11A to be input, by the corresponding correction method.

Similarly, when the comparison section 510B outputs a hit signal hitB, in the output circuit 6, the output unit 60B connected with the read buffer 30 outputs the correction method identifying data included in the defective data stored in the memory area having a buffer address indicated by the read pointer rpB. The correction method identifying data is input from the selection circuit 62B to the pixel defect correcting unit 2. The output circuit 6 outputs, depending on the timing at which pixel data on the defective pixel of the partial area 11B is input to the data processor 1, the correction method identifying data indicating the correction method for the pixel data. Thus, the defective pixel data on the partial area 11B is input to the pixel defect correcting unit 2, and the correction method identifying data indicating the correction method for the defective pixel data is input thereto. This allows the pixel defect correcting unit 2 to appropriately correct the defective pixel data on the partial area 11B to be input, by the corresponding correction method. In the example of FIG. 7, a hit signal hitB is output when the count value cntB shows "x1," and thus, the pixel data on the defective pixel having an x-coordinate value "x1," which belongs to the partial area 11B, is input to the pixel defect correcting unit 2, and the correction method identifying data 100B indicating the correction method for the pixel data (the correction method identifying data in the memory area having the buffer address p indicated by the read pointer rpB) is input thereto.

As described above, in this embodiment, x-coordinate values (count values) for a plurality of pixels constituting the partial area 11 of a line are input in ascending order from the counter 50 to the decision section 51 that decides whether the data to be input matches the data in the buffer 30. In other words, a plurality of pieces of input data (x-coordinate values) on pixels are input to the decision section 51 in the order based on a predetermined rule (in ascending order). The buffer 30 stores, among x-coordinate values for a plurality of pixels constituting the partial area 11, an x-coordinate value (x-coordinate data) of at least one defective pixel included in the plurality of pixels. That is, the buffer 30 stores a plurality of pieces of data matching at least part of a plurality of pieces of input data input to the decision section 51. Then, the decision section 51 reads the x-coordinate values from the buffer 30 in ascending order. In other words, the decision section 51 reads data from the buffer 30 in the order based on the same rule as the rule when input data is input. The decision section 51 compares the x-coordinate data (x-coordinate value) read from the buffer 30 with the count value (x-coordinate value) to be input from the counter 50 and, if they do not match, compares this x-coordinate data with a count value (x-coordinate value) to be input next from the counter 50. Contrastingly, when they match, the decision section 51 compares the succeeding x-coordinate data read from the buffer 30 (in the example of FIG. 7, x-coordinate data in the memory area having a buffer address (k+1) or a buffer address (p+1)) with a count value to be input next from the counter 50 (in the example of FIG. 7, "x0+1" or "x1+1").

Here, unlike this embodiment, the decision section 51 compares a count value to be input from the counter 50 with all the pieces of x-coordinate data in the buffer 30, thereby deciding whether the count value matches the x-coordinate data in the buffer 30. In this case, however, the decision section 51 needs to compare a count value with all the pieces of x-coordinate data in the buffer 30 every time the count value is input from the counter 50 (every time the count value of the counter 50 changes), leading to an increased processing time or more complicated circuitry. Such a problem becomes conspicuous particularly in the case where one line has a large number of pixels.

Contrastingly, in this embodiment, x-coordinate data is read from the buffer 30 in the order based on the same rule as the rule when data is input in order (in the example above, in ascending order) from the counter 50 to the decision section 51. Thus, the decision section 51 is only required to compare a count value from the counter 50 with one piece of x-coordinate data read from the buffer 30 to decide whether the count value matches the x-coordinate data in the buffer 30, that is, the buffer 30 has the x-coordinate data matching the count value. In this embodiment, when a count value does not match one piece of x-coordinate data read from the buffer 30, the count value will not match the x-coordinate data in the buffer 30, or when a count value matches one piece of x-coordinate data read from the buffer 30, the count value will match the x-coordinate data in the buffer 30. In other words, the buffer 30 has no x-coordinate data matching a count value when the count value does not match one piece of x-coordinate data read from the buffer 30, or the buffer 30 has x-coordinate data matching a count value when the count value matches one piece of x-coordinate data read from the buffer 30. This allows the decision section 51 to readily decide whether a count value matches x-coordinate data in the buffer 30 without comparing the count value with all the pieces of x-coordinate data in the buffer 30. This leads to reduced processing time or more simplified circuitry.

In this embodiment, as described above, in the order of memory area having a smaller buffer address, a plurality of pieces of defective data on a line are written into the write buffer 30 in ascending order of x-coordinate data included therein. The decision unit 51A reads the pieces of x-coordinate data on a plurality of defective pixels included in the partial area 11A, which are stored in the buffer 30, in ascending order. Thus, when the buffer address of a plurality of memory areas that respectively store pieces of x-coordinate data on a plurality of defective pixels included in the partial area 11A in the buffer 30 are viewed in ascending order, the pieces of x-coordinate data on the plurality of defective pixels are arranged in the order to be read by the decision unit 51A.

Figure 8:
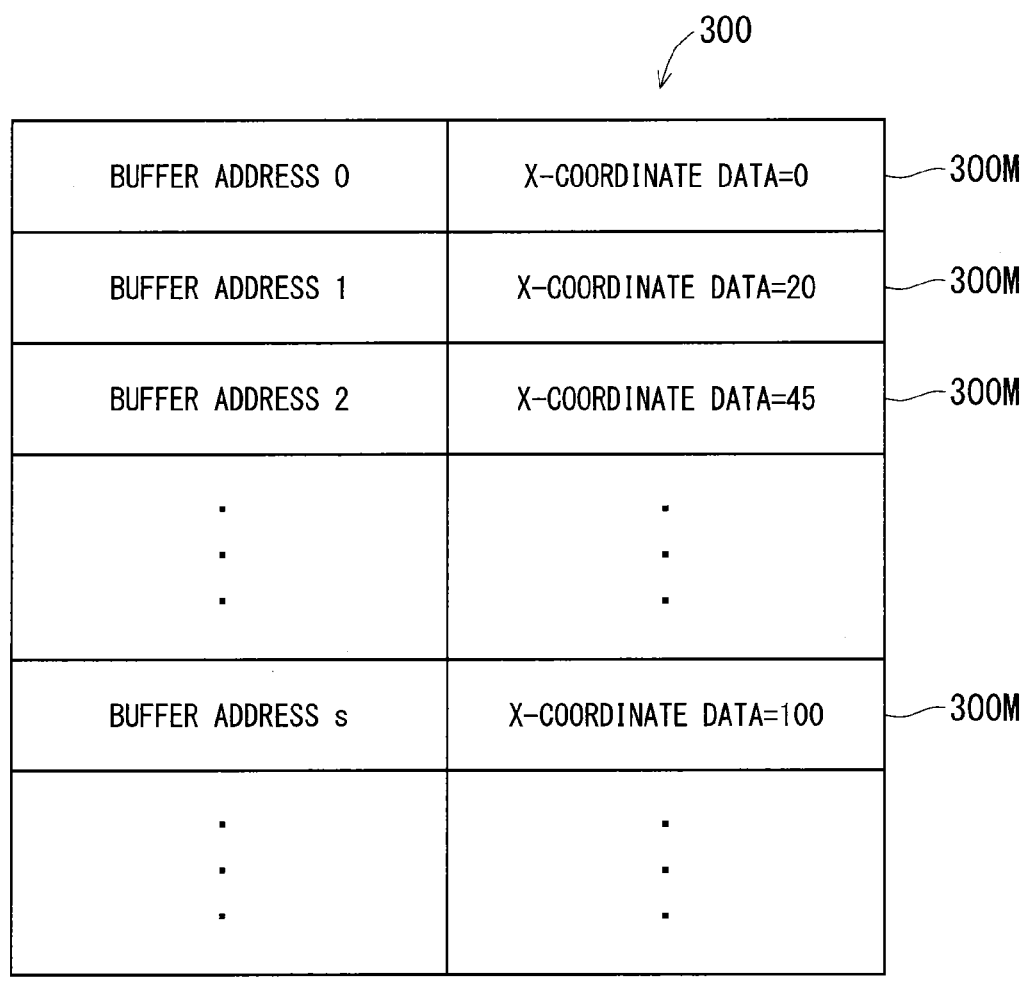
FIG. 8 shows an example x-coordinate data stored in a buffer.

FIG. 8 shows an example of pieces of x-coordinate data on a plurality of defective pixels included in the partial area 11A, which are stored in the buffer 30. In the example of FIG. 8, pieces of x-coordinate data on a plurality of defective pixels included in the partial area 11A are respectively stored in a plurality of memory areas 300M having a buffer address 0 to a buffer address s in the buffer 30. When the buffer addresses of the plurality of memory areas 300M are viewed in ascending order, the plurality of pieces of x-coordinate data respectively stored in the plurality of memory areas 300M are arranged in ascending order, that is, in the order to be read by the decision unit 51A.

As described above, in this embodiment, when the buffer addresses of a plurality of memory areas that respectively store pieces of x-coordinate data on a plurality of defective pixels included in the partial area 11A in the buffer 30 are viewed in ascending order, the pieces of x-coordinate data on the plurality of defective pixels are arranged in the order to be read by the decision unit 51A. Thus, the decision unit 51A can read the succeeding x-coordinate data from the buffer 30 by merely incrementing the read pointer rpA indicating the buffer address of a memory area being a read target to a succeeding value (in the example above, by merely incrementing by one). The read pointer rpA can be accordingly controlled without difficulty.

Similarly, when the buffer addresses of a plurality of memory areas that respectively store pieces of x-coordinate data on a plurality of defective pixels included in the partial area 11B in the buffer 30 are viewed in ascending order, the pieces of x-coordinate data on the plurality of defective pixels are arranged in the order to be read by the decision unit 51B. Thus, the decision unit 51B can read the succeeding x-coordinate data from the buffer 30 by merely incrementing the read pointer rpB to a succeeding value. The read pointer rpB can be accordingly controlled without difficulty.

In this embodiment, the count value cntA of the counter 50A and the count value cntB of the counter 50B are input in parallel to the decision unit 51A and the decision unit 51B, respectively, allowing the decision unit 51A and the decision unit 51B to operate in parallel. This leads to reduced processing time.

In this embodiment, the output unit 60A and the output unit 60B operate in parallel, reducing processing time.

In this embodiment, input data to be input to the decision section 51 is generated by the counter 50, and thus, the timing at which the output circuit 6 inputs correction method identifying data to the correction section 20 can be adjusted readily by adjusting an initial value of the counter 50 or by adjusting the timing at which the counter 50 starts counting.

Here, the correction section 20 may require, after a lapse of a few clocks since the input of defective pixel data, correction method identifying data indicating the method for the defective pixel data, depending on the correction method to be used therein. In such a case, if the output circuit 6 outputs, at the same timing as the timing at which defective pixel data is input to the correction section 20, the correction method identifying data indicating the correction method for the defective pixel data, the correction section 20 needs to be provided with a circuit that holds this correction method identifying data for a while.

In this embodiment, the timing at which the correction method identifying data is input from the output circuit 6 to the correction section 20 can be adjusted readily by adjusting the initial value of the counter 50 or by adjusting the timing at which the counter 50 starts counting. Thus, the circuitry of the correction section 20 can be more simplified than the case in which the correction section 20 is provided with a circuit that holds correction method identifying data for a while. In the example of FIG. 7 described above, when, for example, the initial value of the count value cntA of the counter 50A is set to "−2," the timing at which the correction method identifying data 100A is input to the correction section 20A can be delayed by a time period during which the counter 50A counts two (by two clocks). Resetting the counter 50A by a signal to be generated after the horizontal synchronization signal not by a horizontal synchronization signal allows the timing at which the correction method identifying data 100A is input to the correction section 20A to be delayed.

Although the count value of each counter 50 is initialized at the rising edge of a horizontal synchronization signal in the example above, the count value of each counter 50 may be initialized at other timing. The count values cntA and cntB of the counters 50A and 50B may be initialized at different timings.

In the case where data cannot be read from the memory area of the buffer 30 due to a large amount of latency of the buffer 30, it is desirable to read data from the memory areas having the buffer addresses currently indicated by the read pointers rpA and rpB as well as reading data in advance from at least one of the memory areas having the buffer addresses indicated later by the read pointers rpA and rpB. Thus, in the case where the x-coordinate data from the memory areas having buffer addresses currently indicated by the read pointers rpA and rpB match the count value of the counter 50, a succeeding count value can be immediately compared with the x-coordinate data from the memory areas having buffer addresses next indicated by the read pointers rpA and rpB.

<Modifications>
<First Modification>

As described above, when the x-coordinate data read from the buffer 30 matches the count value of the counter 50, the decision section 51 compares the succeeding x-coordinate data read from the buffer 30 with the succeeding count value from the counter 50. Referring to the succeeding x-coordinate data read from the buffer 30 allows the counter 50 to identify how many more counts are needed for the count value of the counter 50 to match the succeeding x-coordinate data.

For example, letting the succeeding x-coordinate data read from the buffer 30 be "200" when the x-coordinate data read from the buffer 30 and the count value cntA of the counter 50A are both "100" and they match. In this case, after the counter 50A counts more "100", the count value cntA of the counter 50A matches "200" being the succeeding x-coordinate data. That is, in this case, until the counter 50A counts more "100" after matching of the x-coordinate data read from the buffer 30 and the count value cntA of the counter 50A, new correction method identifying data to be used in correcting defective pixel data on the partial area 11A is not input to the correction section 20A, and the correction section 20A performs no pixel defect correction. When the correction section 20A performs no pixel defect correction, the operation of the correction section 20A can be stopped to reduce power consumption.

Figure 9:
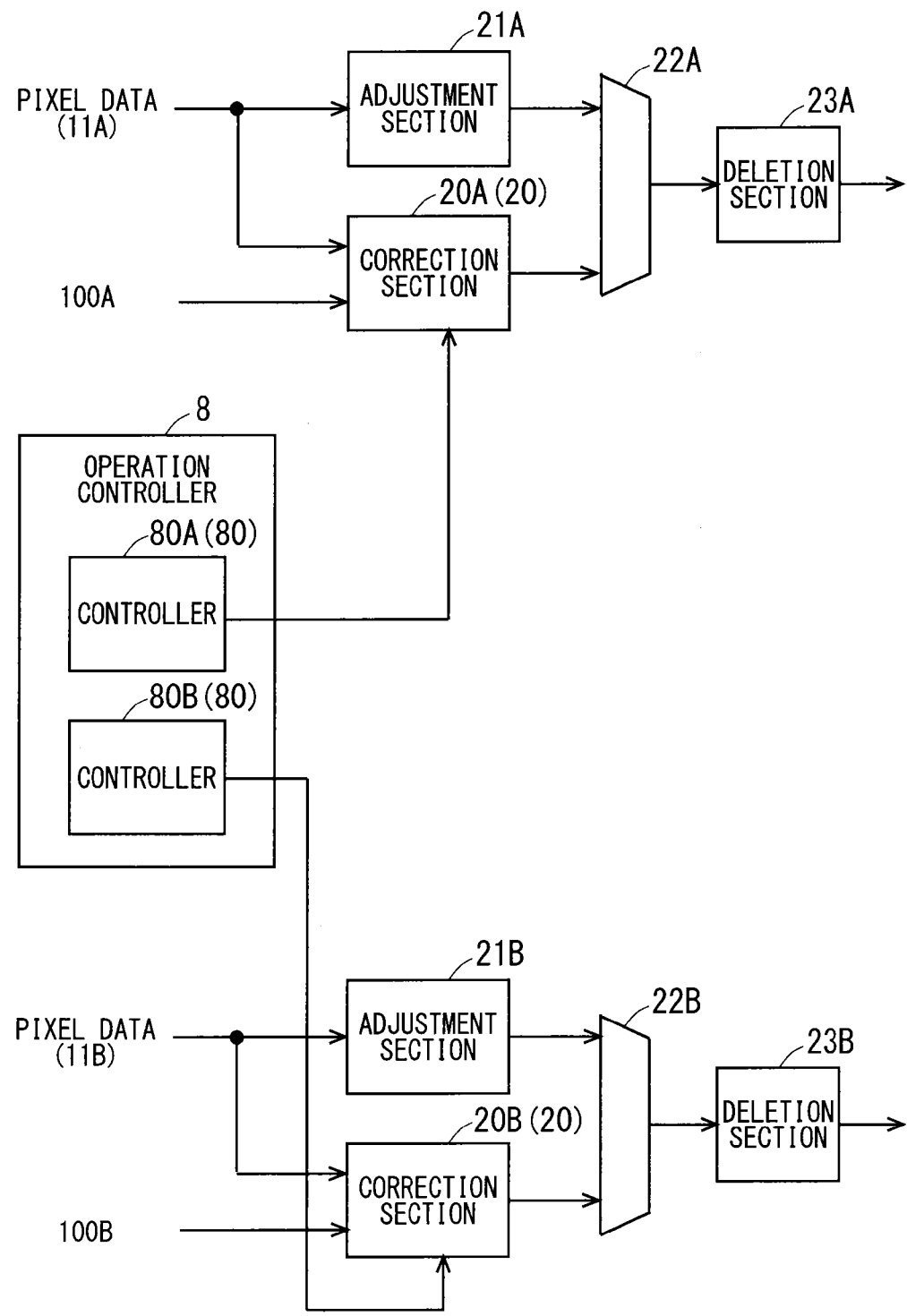
FIG. 9 shows a partial configuration of a data processor according to a modification.

In this modification, when the decision section 51 reads succeeding x-coordinate value data from the buffer 30 in the case where the x-coordinate value data read from the buffer 30 matches the count value of the counter 50, it is determined whether or not to stop the operation of correcting the defective pixel data on the partial area 11 by the correction section 20, which corresponds to the counter 50, on the basis of the next x-coordinate value data. FIG. 9 shows the partial configuration of a data processor 1 according to this modification. The data processor 1 according to this modification is obtained by further providing an operation controller 8 that controls the operation of the pixel defect correcting unit 2 to the data processor 1 according to the embodiment shown in FIGS. 1 and 3. The operation controller 8 includes controllers 80A and 80B that respectively control the operations of the correction sections 20A and 20B. The controllers 80A and 80B are each referred to as a "controller 80" if they do not need to be particularly distinguished from each other.

The controller 80A determines, when the decision unit 51A reads succeeding x-coordinate data from the read buffer 30 in the case where the x-coordinate data read from the read buffer 30 matches the count value cntA of the counter 50A, whether or not to stop the operation of the correction section 20A on the basis of that succeeding x-coordinate data.

Specifically, when the decision unit 51A reads succeeding x-coordinate data from the read buffer 30 in the case where the x-coordinate data read from the read buffer 30 matches the current count value cntA of the counter 50A, the controller 80A subtracts the current count value cntA from the succeeding x-coordinate data to obtain a difference value therebetween. If the obtained difference value is larger than a threshold, that is, if there is some time until the succeeding x-coordinate data matches the count value cntA, the controller 80A determines to stop the operation of the correction section 20A and then stops the operation of the correction section 20A. In this case, the controller 80A determines a restart timing at which the operation of the correction section 20A is restarted on the basis of the succeeding x-coordinate data. For example, the controller 80A sets, as the restart timing, the timing few clocks before the timing at which the count value cntA matches the succeeding x-coordinate data. The controller 80A restarts the operation of the correction section 20A when the restart timing arrives.

Contrastingly, if the obtained difference value is equal to or less than the threshold, that is, if there is not much time until the succeeding x-coordinate data matches the count value cntA, the controller 80A does not stop the operation of the correction section 20A.

Similarly, when the decision unit 51B reads the succeeding x-coordinate data from the read buffer 30 in the case where the x-coordinate data read from the read buffer 30 matches the count value cntB of the counter 50B, the controller 80B determines whether or not to stop the operation of the correction section 20B on the basis of the succeeding x-coordinate data.

The operation of the correction section 20 is stopped by, for example, stopping a supply of an operation clock signal to the correction section 20. The operation of the correction section 20 may be stopped by the method other than the method of stopping a supply of an operation clock signal to the correction section 20.

As described above, in this modification, when the decision section 51 reads the succeeding x-coordinate data from the buffer 30 in the case where the x-coordinate data read from the buffer 30 matches the count value of the counter 50, the controller 80 determines whether or not to stop the operation of correcting the defective pixel data on the partial area 11 by the correction section 20, which corresponds to the counter 50, on the basis of the succeeding x-coordinate data. This reduces power consumption without affecting the processing in the correction section 20.

<Second Modification>

Although each line 10 is divided into two partial areas 11A and 11B in the example above as shown in FIG. 2, each line 10 may be divided into three or more partial areas. In this case, the correction processes for the pieces of defective pixel data on the three or more partial areas are performed in parallel. The configuration and operation of a data processor 1 when each line 10 is divided into three partial areas will be described below as an example.

Figure 10:
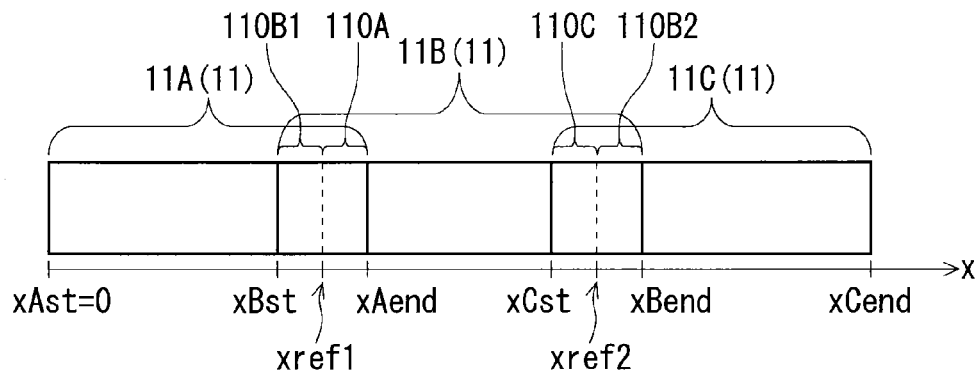
FIG. 10 shows the state in which a line is divided into three partial areas.

FIG. 10 shows the state in which each line 10 is divided into three partial areas 11A, 11B, and 11C. The partial areas 11A and 11B according to this modification differ in size from the partial areas 11A and 11B shown in FIG. 2.

As shown in FIG. 10, one line 10 is divided into the partial area 11A including the leading pixel, a partial area 11B including a pixel between the leading and final pixels, and the partial area 11C including the final pixel. The partial area 11A and the partial area 11B partially overlap. The partial area 11B and the partial area 11C partially overlap. Letting the leading and final x-coordinate values of the partial area 11A be xAst and xAend, respectively, the leading and final x-coordinate values of the partial area 11B be xBst and xBend, respectively, and the leading and final x-coordinate values of the partial area 11C be xCst and xCend, respectively, Expressions (4) to (9) below hold, where xAst=0.

$$xAst < xBst \tag{4}$$

$$xAend > xBst \tag{5}$$

$$xAend < xBend \tag{6}$$

$$xBst < xCst \tag{7}$$

$$xBend > xCst \tag{8}$$

$$xBend < xCend \tag{9}$$

Letting the x-coordinate value of a first reference point in one line 10 be xref1 (xBst<xref1<xAend) and the x-coordinate value of a second reference point in one line 10 be xref2 (xCst<xref2<xBend), xBst−xref1=xref1−xAend and xCst−xref2=xref2−xBend. Hereinafter, the portion from xref1 to xAend in the partial area 11A is referred to as an "extension portion 110A." The portion from xBst to xref1 in the partial area 11B is referred to as a "front extension portion 110B1." The portion from xref2 to xBend in the partial area 11B is referred to as a "rear extension portion 110B2." The portion from xCst to xref2 in the partial area 11C is referred to as an "extension portion 110C."

In this modification, the partial area 11A includes the extension portion 110A as described above, and thus, the pixel data on a defective pixel located slightly forward of the first reference point in the partial area 11A can be corrected using the pixel data on the pixel of the extension portion 110A. The pixel data on a defective pixel located slightly rearward of the first reference point in the partial area 11B can be corrected using the pixel data on the pixel of the front extension portion 110B1. The pixel data on the defective pixel located slightly forward of the second reference point in the partial area 11B can be corrected using the pixel data on the pixel of the rear extension portion 110B2. The pixel data on the defective pixel located slightly rearward of the second reference point in the partial area 11C can be corrected using the pixel data on the pixel of the extension portion 110C.

The data processor 1 according to this modification receives pieces of pixel data on a plurality of pixels constituting the partial area 11A in ascending order of x-coordinate value one by one. The data processor 1 receives pieces of pixel data on a plurality of pixels constituting the partial area 11B in ascending order of x-coordinate value one by one. The data processor 1 receives pieces of pixel data on a plurality of pixels constituting the partial area 11C in ascending order of x-coordinate value one by one. The data processor 1 receives the pixel data on one pixel belonging to the partial area 11A, the pixel data on one pixel belonging to the partial area 11B, and the pixel data on one pixel belonging to the partial area 11C in parallel.

Specifically, the data processor 1 receives the pixel data on a pixel in the partial area 11A, the pixel data on a pixel in the partial area 11B, and the pixel data on a pixel in the partial area 11C in parallel at the rising edge of an operation clock signal, and receives the pixel data on the succeeding pixel in the partial area 11A, the pixel data on the succeeding pixel in the partial area 11B, and the pixel data on the succeeding pixel in the partial area 11C in parallel at the succeeding rising edge of an operation clock signal. Thereafter, the data processor 1 similarly receives the pixel data on one pixel belonging to the partial area 11A, the pixel data on one pixel belonging to the partial area 11B, and the pixel data on one pixel belonging to the partial area 11C in parallel.

In this modification, as described above, the data processor 1 receives the pixel data obtained from the partial area 11A, the pixel data obtained from the partial area 11B, and the pixel data obtained from the partial area 11C in parallel. In this modification, the pixel defect correcting unit 2 corrects the defective pixel data obtained from the partial area 11A, corrects the defective pixel data obtained from the partial area 11B, and corrects the defective pixel data obtained from the partial area 11C in parallel. This further reduces processing time. Hereinafter, the partial areas 11A, 11B, and 11C are each referred to as a "partial area 11" if they do not need to be particularly distinguished from each other.

<Configuration of Pixel Defect Correcting Unit According to this Modification>

Figure 11:
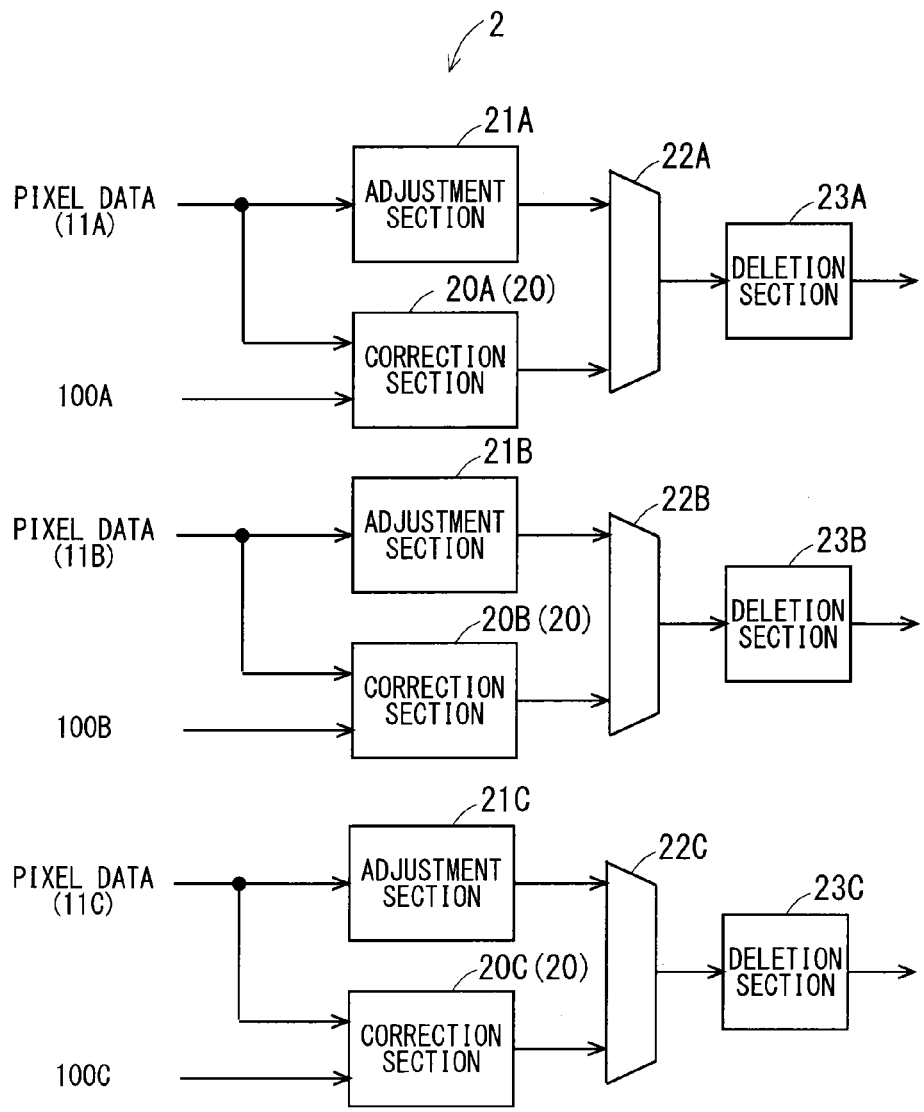
FIG. 11 shows the configuration of a pixel defect correcting unit according to the modification.

FIG. 11 shows the configuration of a pixel defect correcting unit 2 according to this modification. The pixel defect correcting unit 2 according to this modification is obtained by further providing the circuit that processes the pixel data on the partial area 11C to the pixel defect correcting unit 2 shown in FIG. 3. Specifically, the pixel defect correcting unit 2 further includes a correction section 20C, an adjustment section 21C, a selection circuit 22C, and a deletion section 23C.

The correction section 20C corrects the defective pixel data obtained from the partial area 11C by the correction method shown in correction method identifying data 100C output from the output circuit 6, which will be described below. The adjustment section 21C delays the pixel data obtained from the partial area 11C by a predetermined time period and then outputs the delayed pixel data. When the defective pixel data obtained from the partial area 11C is input to the data processor 1, the selection circuit 22C outputs the defective pixel data after the correction, which is output from the correction section 20C. Contrastingly, when the normal pixel data obtained from the partial area 11C is input to the data processor 1, the selection circuit 22C outputs the normal pixel data output from the adjustment section 21C.

The deletion section 23C deletes pieces of pixel data on a plurality of pixels included in the extension portion 110C among a plurality of pieces of pixel data (including the defective pixel data after the correction) respectively corresponding to a plurality of pixels constituting the partial area 11C, which are output from the selection circuit 22C, and outputs the other plurality of pieces of pixel data. This allows the deletion section 23C to output pieces of pixel data rearward of the second reference point xref2 of one line. The deletion section 23B according to this modification deletes pieces of pixel data on a plurality of pixels included in the front extension portion 110B1 and the rear extension portion 110B2 among a plurality of pieces of pixel data (including the defective pixel data after the correction) respectively corresponding to a plurality of pixels constituting the partial area 11B, which are output from the selection circuit 22B, and outputs the other plurality of pieces of pixel data, differently from the deletion section 23B. This allows the deletion section 23B to output pieces of pixel data from the first reference point xref1 to the second reference point xref2 of one line. The deletion section 23A outputs pieces of pixel data forward of the first reference point xref1 of one line.

When the deletion section 23A outputs pieces of pixel data forward of the first reference point xref1 of a line, the deletion section 23B outputs pieces of pixel data from the first reference point xref1 to the second reference point xref2 of the line, and the deletion section 23C outputs pieces of pixel data rearward of the second reference point xref2 of the line. This allows the data processor 1 to output pieces of pixel data for one line.

The pixel defect correcting unit 2 may be devoid of the deletion sections 23A, 23B, and 23C. In this case, pieces of pixel data on a plurality of pixels included in the extension portion 110A, pieces of pixel data on a plurality of pixels included in the front extension portion 110B1, pieces of pixel data on a plurality of pixels included in the rear extension portion 110B2, and pieces of pixel data on a plurality of pixels included in the extension portion 110C are deleted downstream of the pixel defect correcting unit 2. Hereinafter, the correction sections 20A and 20B, and 20C are each referred to as a "correction section 20" if they do not need to be particularly distinguished from each other.

<Configuration of Decision Circuit According to this Modification>

Figure 12:
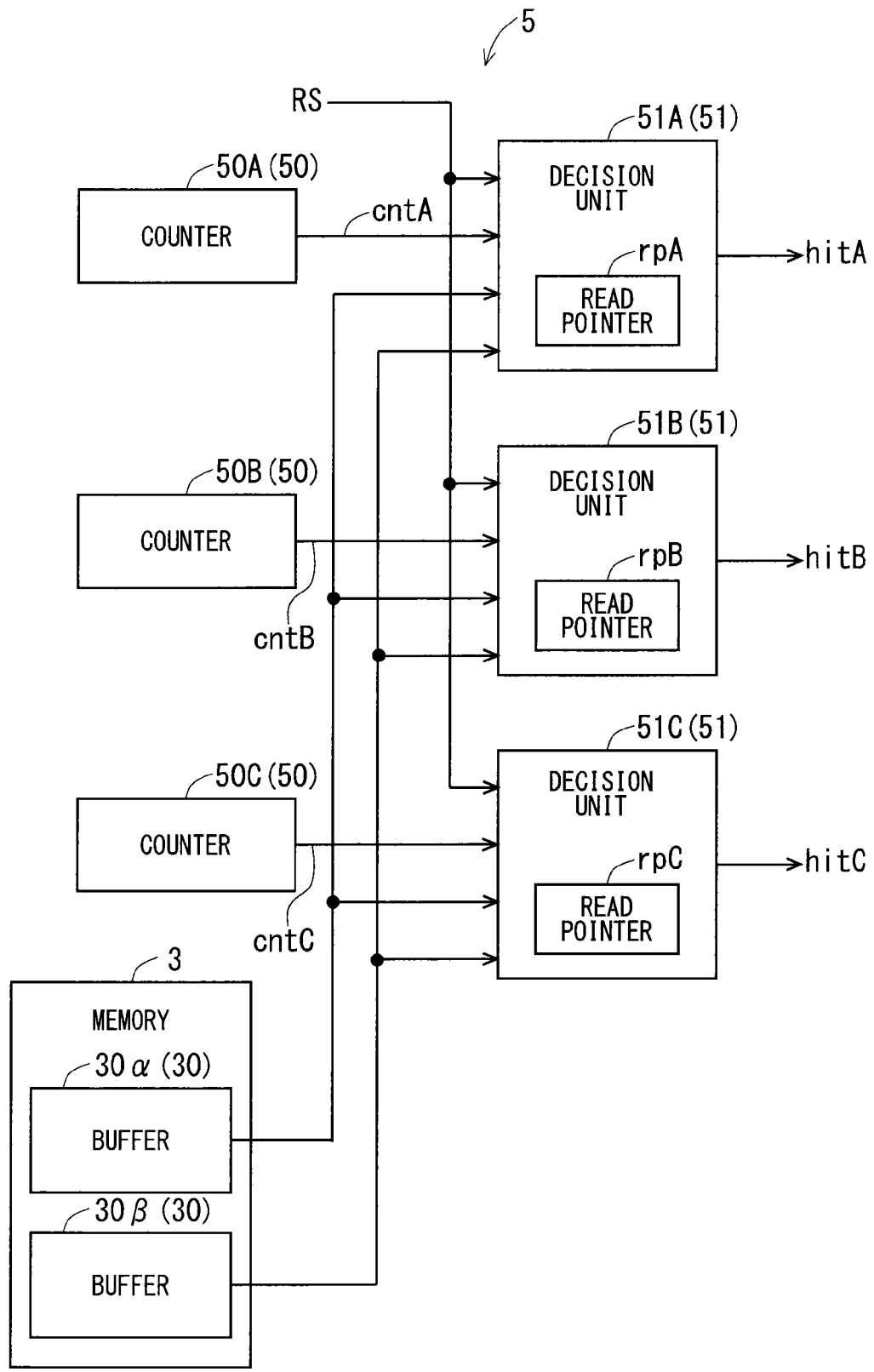
FIG. 12 shows the configuration of a decision circuit according to the modification.

FIG. 12 shows the configuration of a decision circuit 5 according to this modification. The decision circuit 5 according to this modification is obtained by further providing a counter 50C and a decision section 51C corresponding to the partial area 11C to the decision circuit 5 shown in FIG. 4.

The counter 50C is an up counter, which counts up from an initial value one by one in synchronization with an operation clock signal and outputs a count value cntC. The counter 50C counts up from the leading x-coordinate value xCst in the partial area 11C to the final x-coordinate value xCend in the partial area 11C one by one. Then, after counting up to the final x-coordinate value xCend in the partial area 11C, the count value cntC is reset. Subsequently, the counter 50C again counts up from the leading x-coordinate value xCst to the final x-coordinate value xCend in the partial area 11C one by one. The counter 50C outputs, depending on the timing at which the pixel data on a pixel belonging to the partial area 11C is input to the data processor 1, an x-coordinate value of this pixel. Hereinafter, the counters 50A, 50B, and 50C are each referred to as a "counter 50" if they do not need to be particularly distinguished from each other.

The decision unit 51A decides whether the current count value cntC matches the x-coordinate data in the buffer 30. If the count value cntC matches the x-coordinate data in the buffer 30, the decision section 51C outputs a hit signal hitC. Since the count value cntC indicates the x-coordinate value of a pixel for the pixel data in the partial area 11C, which is input to the data processor 1, it can be said that the decision section 51C outputs a hit signal hitC if the pixel data in the partial area 11C input to the data processor 1 is defective pixel data.

The decision section 51C has a configuration similar to those of the decision sections 51B and 51C described above. The decision section 51C selects a read buffer 30 from the buffers 30α and 30β on the basis of a read selection signal RS output from the buffer selecting unit 7.

The decision section 51C includes a read pointer rpC that indicates a buffer address. The decision section 51C reads, from a memory area having a buffer address indicated by the read pointer rpC in the selected read buffer 30, x-coordinate data included in the defective data stored in the memory area. Then, the decision section 51C compares a count value cntC output from the counter 50C with the x-coordinate data read from the read buffer 30 and, when they match, outputs a hit signal hitC. The hit signal hitC is, for example, a binary signal that enters High level for only a predetermined time period. The hit signal hitC indicates that the current count value cntC matches the x-coordinate data in the read buffer 30. Hereinafter, the decision sections 51A, 51B, and 51C are each referred to as a "decision section 51" if they do not need to be particularly distinguished from each other.

<Configuration of Output Circuit According to this Modification>

Figure 13:
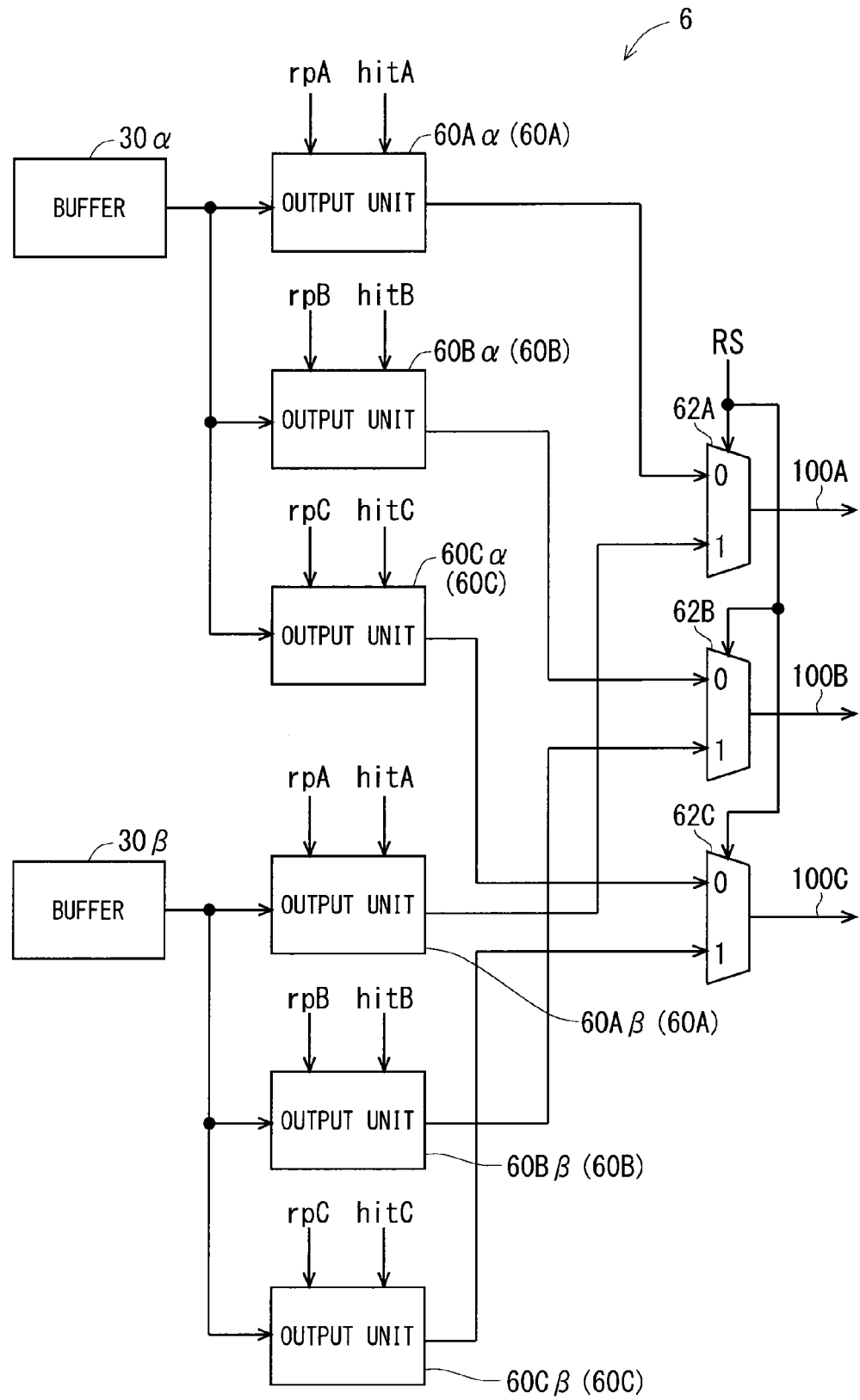
FIG. 13 shows the configuration of an output circuit according to the modification.

FIG. 13 shows the configuration of an output circuit 6 according to this modification. As shown in FIG. 13, the output circuit 6 according to this modification is obtained by further providing output units 60Cα and 60Cβ and a selection circuit 62C corresponding to the partial area 11C to the output circuit 6 shown in FIG. 5.

The output units 60Cα and 60Cβ have a configuration similar to that of, for example, the output unit 60Aα. The output unit 60Cα selects a memory area having a buffer address indicated by the read pointer rpC in the decision section 51C from a plurality of memory areas included in the buffer 30α. Then, upon receipt of a hit signal hitC, the output unit 60Cα outputs the correction method identifying data included in the defective data (the defective data on a defective pixel of the partial area 11C) stored in the selected memory area. The output unit 60Cβ selects a memory area having a buffer address indicated by the read pointer rpC from a plurality of memory areas included in the buffer 30β. Then, upon receipt of the hit signal hitC, the output unit 60Cβ outputs the correction method identifying data included in the defective data stored in the selected memory area. Hereinafter, the output units 60Cα and 60Cβ are each referred to as an "output unit 60C" if they do not need to be particularly distinguished from each other.

The selection circuit 62C selects an output unit 60C corresponding to the read buffer 30 indicated by the read selection signal RS from the output units 60Cα and 60Cβ corresponding to the partial area 11C, and then outputs the correction method identifying data output from the selected output unit 60C. In other words, the selection circuit 62C outputs the correction method identifying data from the output unit 60Cα, which corresponds to the buffer 30α, for the read selection signal RS indicating "0," or outputs the correction method identifying data from the output unit 60Cβ, which corresponds to the buffer 30β, for the read selection signal RS indicating "1." The selection circuit 62C corresponding to the partial area 11C outputs the correction method identifying data indicating the method of correcting the defective pixel data obtained from the partial area 11C. The correction method identifying data output from the selection circuit 62C is referred to as "correction method identifying data 100C."

<Operation of Write Unit According to this Modification>

FIG. 14 is a timing chart showing the operation of a write unit 4 according to this modification. FIG. 14 shows the operation of the write unit 4 when the defective data on a target line is written into the write buffer 30. Hereinafter, only a portion of the operation shown in FIG. 14, which differs from that of FIG. 6 described above, will be described.

The write unit 4 includes the write pointers wpA and wpB as well as a write pointer wpC corresponding to the partial area 11C. The write unit 4 initializes the value of the write pointer wpC to "0" at the timing at which the first defective data on a target line is input.

Upon receipt of the defective data on the target line, the write unit 4 compares the x-coordinate data included in the defective data with the leading x-coordinate value xCst of the partial area 11C and, if the x-coordinate data is smaller than the x-coordinate value xCst, increments the value of the write pointer wpC by one at the timing of writing the defective data into the write buffer 30. Contrastingly, if the x-coordinate data is equal to or larger than the x-coordinate value xCst, the write unit 4 keeps the current value of the write pointer wpC. A plurality of pieces of defective data on a target line are input to the write unit 4 in ascending order of x-coordinate data included therein, and thus, when the x-coordinate data of the defective data is equal to or larger than the x-coordinate value xCst, the x-coordinate data of the defective data to be input thereafter will be equal to or larger than the x-coordinate value xCst without fail. In the example of FIG. 14, the x-coordinate data included in q-th defective data is equal to or larger than the x-coordinate value xCst, with the value of the write pointer wpC being kept at "q."

When the write unit 4 writes the final defective data on a target line into the write buffer 30 and writing of all the pieces of defective data on the target line into the write buffer 30 is complete, the decision circuit 5 sets the value of the write pointer wpC at that time as the initial value of the read pointer rpC. In the example of FIG. 14, z-th defective data indicated by [z] is the final defective data on a target line, and the initial value of the read pointer rpC is "q." The initial value of the read pointer rpC indicates a defective pixel having the smallest x-coordinate value among the defective pixels included in the partial area 11C, that is, indicates the buffer address of the memory area into which the defective data on the leading defective pixel in the partial area 11C is written.

<Operations of Decision Circuit and Output Circuit According to this Modification>

Figure 15:
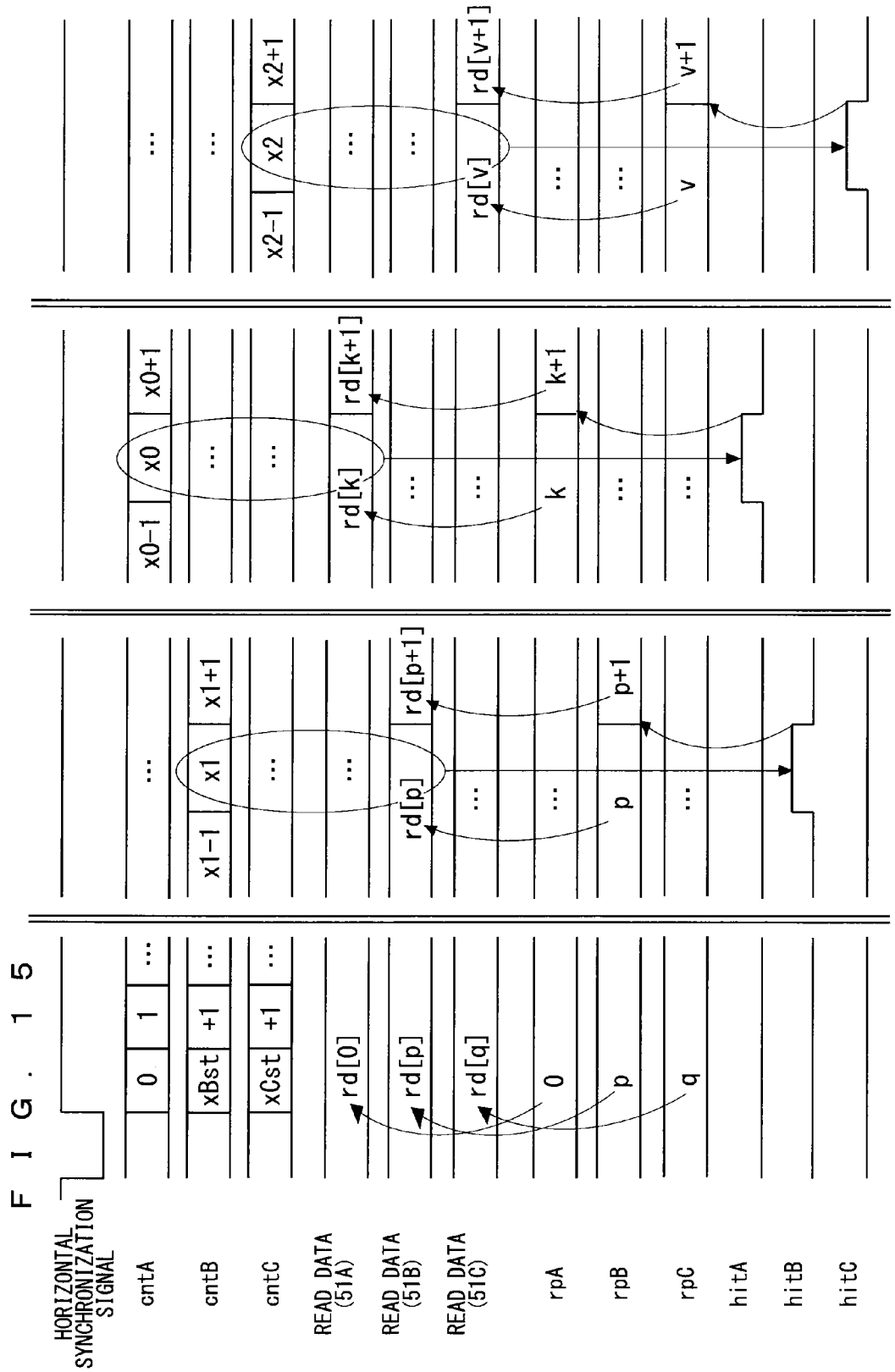
FIG. 15 is a timing chart showing the operation of the decision circuit according to the modification.

FIG. 15 is a timing chart showing the operation of the decision circuit 5 according to this modification. FIG. 15 shows the operation of the decision circuit 5 when the buffer 30, into which the defective data on a target line has been written, serves as a read target as in the example of FIG. 14 described above and the defective data is read from the buffer 30. In FIG. 15, "read data (51C)" shows data read from the read buffer 30 by the decision section 51C. Hereinafter, only a portion of the operation of FIG. 15, which differs from that of FIG. 7, will be described.

When a horizontal synchronization signal is input to the data processor 1, the counter 50C initializes the count value cntC to "xCst" at the rising edge of the horizontal synchronization signal. After initializing the count value cntC, the counter 50C counts up the count value cntC by one at every timing (at every rising edge of an operation clock signal). In this case, the counter 50C counts up the count value cntC depending on the timing at which the pixel data on a pixel belonging to the partial area 11C is input to the data processor 1. This allows the counter 50C to output, depending on the timing at which pixel data on a pixel belonging to the partial area 11C is input to the data processor 1, the x-coordinate value of the pixel.

When the horizontal synchronization signal is input to the data processor 1, the decision section 51C reads x-coordinate data from the memory area of the read buffer 30, which has a buffer address (q) indicated by the initial value of the read pointer rpC. In other words, the decision section 51C reads an x-coordinate value of the leading defective pixel in the partial area 11C from the memory area. Then, the decision section 51C compares an initial value "xCst" of the count value cntA of the counter 50C with the read x-coordinate data. The decision section 51C outputs a hit signal hitC when they match. After outputting the hit signal hitC, the decision section 51C increments a value of the read pointer rpC by one at the falling edge of the hit signal hitC.

After that, when the count value cntC of the counter 50C is incremented by one, the decision section 51C reads x-coordinate data from the memory area having the buffer address indicated by the current value of the read pointer rpC. Then, the decision section 51C compares the count value cntC of the counter 50C with the x-coordinate data read by the read section 511A. The decision section 51C outputs a hit signal hitC when they match. After outputting the hit signal hitC, the decision section 51C increments the value of the read pointer rpC by one at the falling edge of the hit signal hitC. Thereafter, the decision section 51C operates similarly every time the count value cntC of the counter 50C is incremented by one.

In the example of FIG. 15, when the count value cntC is "x2," the x-coordinate data (rd[v]) read from the memory area having a buffer address v matches the count value cntC, and then, a hit signal hitC is output. Subsequently, the value of the read pointer rpC is incremented by one to "v+1" at the falling edge of the hit signal hitC. When the count value cntC is "x2+1," the decision section 51C compares the x-coordinate data (rd[v+1]) read from the memory area having the buffer address (v+1) with "x2+1."

When the decision section 51C outputs a hit signal hitC, in the output circuit 6, the output unit 60C connected with the read buffer 30 outputs correction method identifying data included in the defective data stored in the memory area having a buffer address indicated by the read pointer rpC. In other words, the output unit 60C outputs the correction method identifying data stored in the same memory area as that of the x-coordinate data decided to match the count value cntC. The correction method identifying data is input from the selection circuit 62C to the correction section 20C as correction method identifying data 100C.

The correction section 20C receives defective pixel data on the partial area 11C as well as the correction method identifying data 100C indicating the correction method for the defective pixel data. This allows the correction section 20C to appropriately correct the defective pixel data on the partial area 11C, to be input thereto, by the corresponding correction method.

As described above, the data processor 1 according to this modification divides one line into three partial areas 11A to 11C and corrects the defective pixel data obtained from the partial area 11A, corrects the defective pixel data obtained from the partial area 11B, and corrects the defective pixel data obtained from the partial area 11C in parallel, reducing processing time more than the data processor 1 according to the embodiment.

Although a count value of each counter 50 is initialized at the rising edge of a horizontal synchronization signal in this modification as in the example of FIG. 7, a count value of each counter 50 may be initialized at other timing. The count values cntA, cntB, and cntC of the counters 50A, 50B, and 50C may be initialized at different timings.

<Third Modification>

Figure 16:
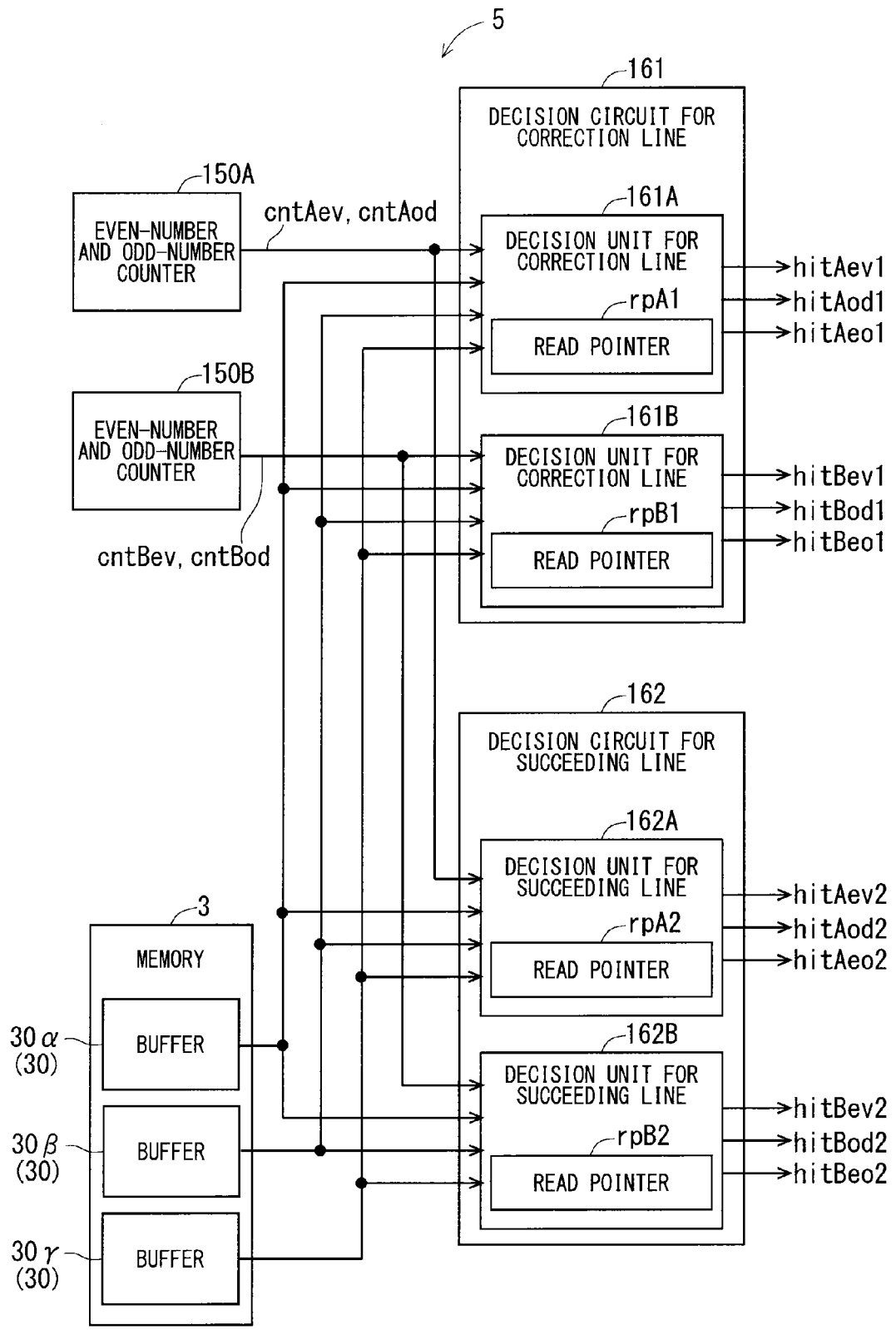
FIG. 16 shows the configuration of a decision circuit according to another modification.

FIG. 16 shows the partial configuration of a data processor 1 according to this modification. FIG. 16 shows a decision circuit 5 and a memory 3 included in the data processor 1 according to this modification. Only a portion of the data processor 1 according to this modification, which differs from the data processor 1 according to the embodiment above, will be mainly described below.

<Configuration of Memory According to this Modification>

As shown in FIG. 16, in this modification, the memory 3 includes buffers 30α and 30β as well as a buffer 30γ. Similarly to the buffers 30α and 30β, defective data is written into the buffer 30β by the write unit 4, and the defective data written into the buffer 30β is read by the decision circuit 5. The buffer 300 has, for example, N memory areas. The N memory areas are respectively provided with buffer addresses from 0 to (N−1). In the buffer 30γ, one memory area stores defective data corresponding to one defective pixel. Defective data for one line is written into the buffer 30γ. Hereinafter, the buffers 30α, 30β, and 30γ are each referred to as a "buffer 30" if they do not need to be particularly distinguished from each other.

In this modification, the buffer selecting unit 7 determines, among three buffers 30, one buffer 30 as a write buffer and the other two buffers 30 as read buffers. The buffer selecting unit 7 determines the buffers 30β and 30γ as read buffers when determining the buffer 30α as a write buffer, determines the buffers 30α and 30γ as read buffers when determining the buffer 30β as a write buffer, or determines the buffers 30α and 30β as read buffers when determining the buffer 30γ as a write buffer.

Of the two read buffers 30 included in the buffers 30α, 30β, and 30γ, one read buffer 30 stores the defective data on one line and the other read buffer 30 stores the defective data on the line following the one line.

FIG. 17 is a table for describing how the defective data on each line of the imaging device is written into each buffer 30. In FIG. 17, "α," "β," and "γ" represent the buffer 30α, the buffer 30β, and the buffer 30γ, respectively. In FIG. 17, the "line position (correction-target pixel data)" represents a y coordinate value of a line targeted for pixel defect correction, which is input to the data processor 1, and the "line position (defective data)" represents a y coordinate value of the line corresponding to the defective data input to the data processor 1.

In this modification, the defective data on the line having a y coordinate value "0," that is, the leading line is input to the data processor 1 at a timing two lines prior to the timing at which the pixel data on the leading line is input to the data processor 1. In other words, the defective data on the leading line is input to the data processor 1 after the horizontal synchronization signal two lines prior to the horizontal synchronization signal corresponding to this leading line.

As shown in FIG. 17, when the defective data on the line having a y-coordinate value "0" (leading line) is input to the data processor 1, the write unit 4 writes this defective data into the buffer α. Next, when the defective data on the line having a y-coordinate value "1" is input to the data processor 1, the write unit 4 writes this defective data into the buffer β. Next, when the defective data on the line having a y-coordinate value "2" is input to the data processor 1, the write unit 4 writes this defective data into the buffer γ. Thereafter, the write unit 4 similarly operates and changes the targets into which defective data is written in the order from the buffer 30α to the buffer 30β and to the buffer 30γ on a line basis.

Upon receipt of the defective data on the line having a y-coordinate value "2" to the data processor 1, the pixel data on the line having a y-coordinate value "0" (leading line) is input to the data processor 1, and the pixel data on the line having a y-coordinate value "0" is a target for pixel defect correction in the pixel defect correcting unit 2. At this time, the buffer 30α stores the defective data on the line of a y-coordinate value "0," that is, the line being a target for pixel defect correction (hereinafter, merely referred to as a "correction line" as well). While the write unit 4 is writing the defective data on the line having a y-coordinate value "2" into the buffer 30γ, the decision circuit 5 reads, from the buffer 30α, the defective data on the line having a y-coordinate value "0" being a correction line. Further, the decision circuit 5 reads, from the buffer 30β, the defective data on the line having a y-coordinate value "1" being a line following the correction line (hereinafter, merely referred to as "succeeding line" as well).

While the write unit 4 is writing the defective data on the line having a y-coordinate value "3" into the buffer 30α, the decision circuit 5 reads, from the buffer 30β, the defective data on the line having a y-coordinate value "1" being a correction line and reads, from the buffer 30γ, the defective data on the line having a y-coordinate value "2" being the succeeding line.

While the write unit 4 is writing the defective data on the line having a y-coordinate value "4" into the buffer 30β, the decision circuit 5 reads the defective data on the line having a y-coordinate value "2" being a correction line from the buffer 30γ and reads, from the buffer 30α, the defective data on the line having a y-coordinate value "3" being the succeeding line.

As described above, in the data processor 1 according to this modification, in the pixel defect correction for a target line, the defective data on a target line is read from one read buffer 30 of two read buffers 30, and the defective data on the line following the target line is read from the other read buffer 30.

<Way to Input Pixel Data in this Modification>

In this modification, as shown in FIG. 18, the partial area 11A is divided into two groups, namely, an even-numbered group 11Aev composed of a plurality of pixels having even x-coordinate values such as 0 and 2, and an odd-numbered group 11Aod composed of a plurality of pixels having odd x-coordinate values such as 1 and 3. Similarly, the partial area 11B is divided into two groups, namely, an even-numbered group 11Bev composed of a plurality of pixels having even x-coordinate values and an odd-numbered group 11Bod composed of a plurality of pixels having odd x-coordinate values such as 1 and 3. For description's sake, FIG. 18 shows, in a rectangle representing the partial area 11A, the x-coordinate values of pixels of the partial area 11A, and in a rectangle representing the partial area 11B, the X-coordinate values of pixels of the partial area 11B. Although the leading x-coordinate value xBst of the partial area 11B is an even number in the example of FIG. 18, it may be an odd number.

The data processor 1 receives pieces of pixel data on a plurality of pixels constituting the even-numbered group 11Aev in ascending order of x-coordinate value one by one in synchronization with an operation clock signal, and receives pieces of pixel data on a plurality of pixels constituting the odd-numbered group 11Aod in ascending order of x-coordinate value one by one in synchronization with an operation clock signal. The data processor 1 receives a pair of the pixel data on a pixel having an x-coordinate value in the even-numbered group 11Aev and the pixel data on a pixel having an x-coordinate value following the above-mentioned x-coordinate value in the odd-numbered group 11Aod.

The data processor 1 receives pieces of pixel data on a plurality of pixels constituting the even-numbered group 11Bev in ascending order of x-coordinate value one by one in synchronization with an operation clock signal, and receives pieces of pixel data on a plurality of pixels constituting the odd-numbered group 11Bod in ascending order of x-coordinate value one by one in synchronization with an operation clock signal. The data processor 1 receives a pair of the pixel data on a pixel having an x-coordinate value in the even-numbered group 11Bev and the pixel data on a pixel having an x-coordinate value following the above-mentioned x-coordinate value in the odd-numbered group 11Bod.

The data processor 1 receives the pixel data on a pixel belonging to the even-numbered group 11Aev, the pixel data on a pixel belonging to the odd-numbered group 11Aod, the pixel data on a pixel belonging to the even-numbered group 11Bev, and the pixel data on a pixel belonging to the odd-numbered group 11Bod in parallel.

Specifically, at a rising edge of an operation clock signal, the data processor 1 receives, in parallel, the pixel data on a pixel of the even-numbered group 11Aev, the pixel data that pairs with the above-mentioned pixel data and is obtained from the odd-numbered group 11Aod, the pixel data on a pixel of the even-numbered group 11Bev, and the pixel data that pairs with the above-mentioned pixel data and is obtained from the odd-numbered group 11Bod. At the succeeding rising edge of an operation clock signal, then, the data processor 1 receives, in parallel, the pixel data on the succeeding pixel of the even-numbered group 11Aev, the pixel data that pairs with the above-mentioned pixel data and is obtained from the odd-numbered group 11Aod, the pixel data on the succeeding pixel of the even-numbered group 11Bev, and the pixel data that pairs with the above-mentioned pixel data and is obtained from the odd-numbered group 11Bod.

As described above, in this modification, the pieces of pixel data obtained from the even-numbered group 11Aev and odd-numbered group 11Aod of the partial area 11A and the pieces of pixel data obtained from the even-numbered group 11Bev and odd-numbered group 11Bod of the partial area 11B are input to the data processor 1 in parallel. Then, the pixel defect correcting unit 2 corrects the defective pixel data obtained from the even-numbered group 11Aev, the defective pixel data obtained from the odd-numbered group 11Aod, the defective pixel data obtained from the even-numbered group 11Bev, and the defective pixel data obtained from the odd-numbered group 11Bod in parallel. This further reduces processing time.

In this modification, the pixel data on a correction line and the pixel data on a succeeding line are input to the data processor 1 in parallel. Thus, the data processor 1 receives, in parallel, the pieces of pixel data obtained from the even-numbered group 11Aev and odd-numbered group 11Aod of the partial area 11A of a correction line, the pieces of pixel data obtained from the even-numbered group 11Bev and odd-numbered group 11Bod of the partial area 11B of a correction line, the pieces of pixel data obtained from the even-numbered group 11Aev and odd-numbered group 11Aod of the partial area 11A of the succeeding line, and the pieces of pixel data obtained from the even-numbered group 11Bev and odd-numbered group 11Bod of the partial area 11B of the succeeding line.

<Configuration of Decision Circuit According to this Modification>

As shown in FIG. 16, the decision circuit 5 according to this modification includes even-number and odd-number counters 150A and 150B, a decision circuit for correction line 161, and a decision circuit for succeeding line 162. The decision circuit for correction line 161 includes decision sections for correction line 161A and 161B. The decision circuit for succeeding line 162 includes decision sections for succeeding line 162A and 162B. The even-number and odd-number counter 150A, decision section of correction line 161A, and decision section for succeeding line 162A form a circuit that processes the defective data on the partial area 11A. The even-number and odd-number counter 150B, decision section for correction line 161B, and decision section for succeeding line 162B form a circuit that processes the defective data in the partial area 11B.

The even-number and odd-number counter 150A outputs a count value cntAev (even-numbered count value cntAev) indicating an even number and a count value cntAod (odd-numbered count value cntAod) indicating an odd number in parallel. The decision section of correction line 161A reads x-coordinate data in the partial area 11A of the correction line from the buffer 30 that stores the defective data on the current correction line among the buffers 30α, 30β, and 30γ, and then compares the x-coordinate data with an even-numbered count value cntAev and an odd-numbered count value cntAod output from the even-number and odd-number counter 150A. The decision section for succeeding line 162A reads x-coordinate data in the partial area 11A of the succeeding line from the buffer 30 that stores the defective data on the succeeding line following the current correction line among the buffers 30α, 30β, and 30γ, and then compares the x-coordinate data with an even-numbered count value cntAev and an odd-numbered count value cntAod.

The even-number and odd-number counter 150B outputs an even-numbered count value cntBev and an odd-numbered count value cntBod in parallel, similarly to the even-number and odd-number counter 150A. The decision section for correction line 161B reads x-coordinate data on the partial area 11B of the correction line from the buffer 30 that stores the defective data in the partial area 11B of the current correction line among the buffers 30α, 30β, and 30γ, and then compares the x-coordinate data with an even-numbered count value cntBev and an odd-numbered count value cntBod output from the even-number and odd-number counter 150B. The decision section for succeeding line 162B reads x-coordinate data in the partial area 11B of the succeeding line from the buffer 30 that stores the defective data on the succeeding line following the current correction line among the buffers 30α, 30β, and 30γ, and then compares the x-coordinate data with an even-numbered count value cntBev and an odd-numbered count value cntBod.

Figure 19:
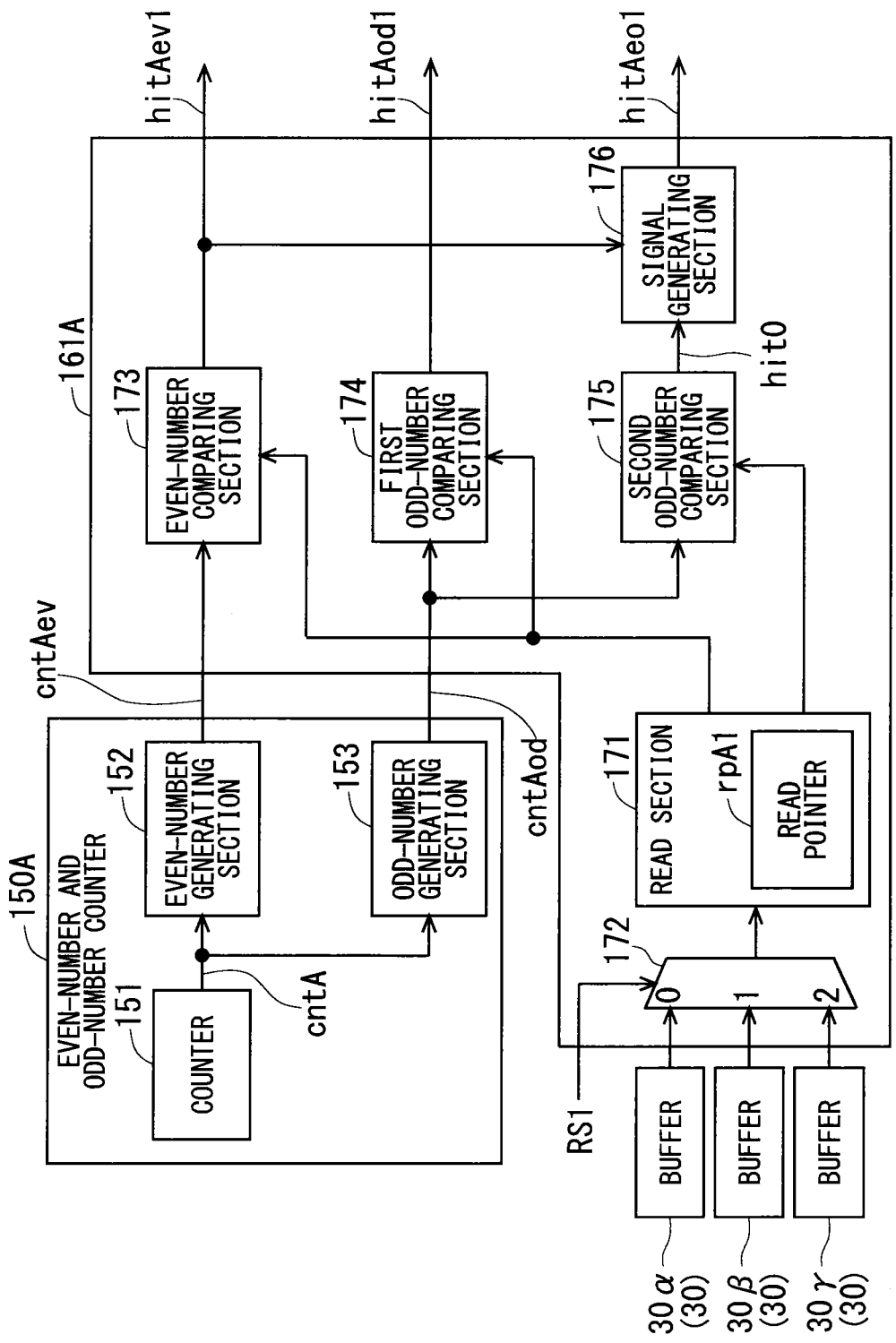
FIG. 19 shows the configurations of an even-number and odd-number counter and a decision section for correction line according to the other modification.

FIG. 19 shows the configurations of the even-number and odd-number counter 150A and the decision section of correction line 161A. The even-number and odd-number counters 150A and 150B have the same configuration, and thus, the configuration of the even-number and odd-number counter 150A will be specifically described as a typical example. The decision sections for correction line 161A and 161B and the decision sections for succeeding line 162A and 162B have the same configuration, and thus, the configuration of the decision section of correction line 161A will be specifically described as a typical example.

As shown in FIG. 19, the even-number and odd-number counter 150A includes a counter 151, an even-number generating section 152, and an odd-number generating section 153. The counter 151 and the even-number generating section 152 form an even-number counter that generates an even-numbered count value cntAev, and the counter 151 and the odd-number generating section 153 form an odd-number counter that generates an odd-numbered count value cntAod.

The counter 151 is an up counter similar to the counter 50 described above, and counts up from an initial value one by one in synchronization with an operation clock signal and outputs a count value cntA. The counter 151 corresponding to the partial area 11A counts up from "0" one by one.

The even-number generating section 152 doubles the count value cntA from the counter 151 and then outputs the doubled count value cntA as an even-numbered count value cntAev. The even-numbered count values cntAev output from the even-number generating section 152 indicate even values in order from "0". The odd-number generating section 153 adds "1" to the value obtained by doubling the count value cntA from the counter 151, and outputs the resultant value as an odd-numbered count value cntAod. The odd-numbered count values cntAod output from the odd-number generating section 153 indicate odd values in order from "1". When the even-number generating section 152 outputs an even-numbered count value cntAev "0," the odd-number generating section 153 outputs an odd-numbered count value cntAod "1." When the even-number generating section 152 outputs an even-numbered count value cntAev "2," the odd-number generating section 153 outputs an odd-numbered count value cntAod "3."

As can be seen from the description above, the even-number and odd-number counter 150A outputs x-coordinate values of a plurality of pixels constituting the even-numbered group 11Aev in the partial area 11A of the correction line or the succeeding line, one by one from the leading one. It can therefore be said that the even-numbered count value cntAev of the counter 150A indicates an x-coordinate value of a pixel belonging to the even-numbered group 11Aev in the partial area 11A of the correction line or the succeeding line. Likewise, it can be said that the odd-numbered count value cntAod of the counter 150A indicates an x-coordinate value of a pixel belonging to the odd-numbered group 11Aod in the partial area 11A of the correction line or the succeeding line.

The even-number and odd-number counter 150A outputs, depending on the timing at which pieces of pixel data on pixels belonging to the even-numbered group 11Aev in the partial areas 11A of the correction line and the succeeding line are input to the data processor 1 in parallel, x-coordinate values of these pixels. The even-number and odd-number counter 150A outputs, depending on the timing at which pieces of pixel data on pixels belonging to the odd-numbered group 11Aod in the partial areas 11A of the correction line and the succeeding line are input to the data processor 1 in parallel, x-coordinate values of these pixels.

The decision section of correction line 161A decides whether the even-numbered count value cntAev output from the even-number and odd-number counter 150A matches the x-coordinate data in the buffer 30 that stores the defective data on the correction line. The decision section of correction line 161A decides whether the odd-numbered count value cntAod output from the even-number and odd-number counter 150A matches the x-coordinate data in the buffer 30 that stores the defective data on the correction line.

When the even-numbered count value cntAev matches the x-coordinate data in the buffer 30, the decision section of correction line 161A outputs an even-numbered hit signal hitAev1. Contrastingly, when the odd-numbered count value cntAod matches the x-coordinate data in the buffer 30, the decision section of correction line 161A outputs an odd-numbered hit signal hitAod1. The even-numbered count value cntAev indicates an x-coordinate value of a pixel for the pixel data in the even-numbered group 11Aev of the partial area 11A of the correction line, which is input to the data processor 1. It can therefore be said that the decision section of correction line 161A outputs an even-numbered hit signal hitAev1 when the pixel data in the even-numbered group 11Aev of the partial area 11A of the correction line, which is input to the data processor 1, is defective pixel data. Likewise, the decision section of correction line 161A outputs an odd-numbered hit signal hitAod1 when the pixel data in the odd-numbered group 11Aod of the partial area 11A of the correction line, which is input to the data processor 1, is defective pixel data.

The decision section of correction line 161A outputs an even-number and odd-numbered hit signal hitAeo1 when the even-numbered count value cntAev and odd-numbered count value cntAod that are output from the even-number and odd-number counter 150A at the same timing respectively match two pieces of x-coordinate data in the buffer 30 that stores the defective data on the correction line. In other words, the decision section of correction line 161A outputs an even-number and odd-numbered hit signal hitAeo1 when the pieces of pixel data in the even-numbered group 11Aev and odd-numbered group 11Aod of the partial area 11A of the correction line, which are input to the data processor 1 at the same timing, are both defective pixel data.

As shown in FIG. 19, the decision section of correction line 161A includes a read section 171, a selection circuit 172, an even-number comparing section 173, a first odd-number comparing section 174, a second odd-number comparing section 175, and a signal generating section 176.

The selection circuit 172 selects any one of the buffers 30α, 30β, and 30γ on the basis of a read selection signal for correction line RS1 output from the buffer selecting unit 7. The read selection signal for correction line RS1 is a signal indicating which buffer 30 among the buffers 30α, 30β, and 30γ stores the defective data on a correction line. The selection circuit 172 selects a buffer 30 indicated by the read selection signal for correction line RS1, that is, a buffer 30 that stores defective data on the correction line (hereinafter, referred to as a "read buffer for correction line 30") from the buffers 30α, 30β, and 30γ. The read selection signal for correction line RS1 indicates, for example, any one of "0," "1," and "2." The read selection signal for correction line RS1 indicating "0" means that the read buffer for correction line 30 is the buffer 30α; "1" means the buffer 303, and "2" means the buffer 30γ.

The read section 171 includes a read pointer rpA1 indicating a buffer address. The read section 171 reads, from a memory area having a buffer address indicated by the read pointer rpA1 in the read buffer for correction line 30 selected by the selection circuit 172, x-coordinate data included in the defective data on a correction line stored in the memory area. Further, the read section 171 reads, from a memory area having a buffer address one larger than the buffer address indicated by the read pointer rpA1, x-coordinate data included in the defective data on the correction line stored in the memory area. Hereinafter, the read pointer rpA1 may be referred to as a "read pointer for correction line rpA1."

The even-number comparing section 173 compares the even-numbered count value cntAev output from the even-number and odd-number counter 150A with the x-coordinate data read from a memory area having a buffer address indicated by the read pointer rpA1 and, when they match, outputs an even-numbered hit signal hitAev1. The even-numbered hit signal Aev1 indicates that the current even-numbered count value cntAev matches the x-coordinate data in the read buffer for correction line 30.

The first odd-number comparing section 174 compares the odd-numbered count value cntAod output from the even-number and odd-number counter 150A with the x-coordinate data read by the read section 171 from the memory area having a buffer address indicated by the read pointer rpA1 and, when they match, outputs an odd-numbered hit signal hitAod1. The odd-numbered hit signal Aod1 indicates that the current odd-numbered count value cntAod matches the x-coordinate data in the read buffer for correction line 30.

The second odd-number comparing section 175 compares the odd-numbered count value cntAod output from the even-number and odd-number counter 150A with the x-coordinate data read by the read section 171 from a memory area having a buffer address one larger than the buffer address indicated by the read pointer rpA1 and, when they match, outputs an odd-numbered hit signal hit0. When the even-number comparing section 173 outputs an even-numbered hit signal hitAev1 and the second odd-number comparing section 175 outputs an odd-numbered hit signal hit0, the signal generating section 176 outputs an even-number and odd-numbered hit signal hitAeo1. The even-number and odd-numbered hit signal hitAeo1 indicates that both of the current even-numbered count value cntAev and odd-numbered count value cntAod match the x-coordinate data in the read buffer for correction line 30.

Each of the even-numbered hit signal hitAev1, odd-numbered hit signal hitAod1, odd-numbered hit signal hit0, and even-number and odd-numbered hit signal hitAeo1 is, for example, a binary signal that enters High level for only a predetermined time period.

When an even-number and odd-numbered hit signal hitAeo1 is generated, an even-numbered hit signal hitAev1 is generated but no odd-numbered hit signal hitAod1 is generated. In other words, when both of the current even-numbered count value cntAev and odd-numbered count value cntAod match the x-coordinate data in the read buffer for correction line 30, an even-numbered hit signal hitAev1 and an even-number and odd-numbered hit signal hitAeo1 are generated but no odd-numbered hit signal hitAod1 is generated.

As described above, the decision section of correction line 161A reads pieces of x-coordinate data from a memory area having a buffer address indicated by the read pointer rpA1 in the buffer 30 that stores defective data on the partial area 11A of the correction line. In other words, the decision section of correction line 161A reads, from the memory area having a buffer address indicated by the read pointer for correction line rpA1, x-coordinate data (x-coordinate value) on the defective pixel in the partial area 11A of the correction line. Further, the decision section of correction line 161A reads x-coordinate data from the memory area having a buffer address one larger than a value indicated by the read pointer rpA1 in the buffer 30 that stores the defective data on the partial area 11A of the correction line. Then, when the x-coordinate data read from the memory area having the buffer address indicated by the read pointer rpA1 matches the even-numbered count value cntAev indicating the x-coordinate value of the even-numbered group 11Aev in the partial area 11A of the correction line, the decision section of correction line 161A outputs an even-numbered hit signal hitAev1. When the x-coordinate data read from the memory area having the buffer address indicated by the read pointer rpA1 matches the odd-numbered count value cntAod indicating the x-coordinate value of the odd-numbered group 11Aod in the partial area 11A of the correction line, the decision section of correction line 161A outputs an odd-numbered hit signal hitAod1. When the x-coordinate data read from the memory area having the buffer address indicated by the read pointer rpA1 matches an even-numbered count value cntAev and when the x-coordinate data read from the memory area having the buffer address one larger than the value indicated by the read pointer rpA1 matches an odd-numbered count value cntAod, the decision section of correction line 161A outputs an even-number and odd-numbered hit signal hitAeo1.

The even-number and odd-number counter 150B corresponding to the partial area 11B has a configuration similar to that of the even-number and odd-number counter 150A. The even-numbered count value cntBev output from the even-number and odd-number counter 150B indicates an x-coordinate value of a pixel belonging to the even-numbered group 11Bev in the partial area 11B of the correction line or the succeeding line. The even-numbered count value cntBev is counted up in twos from the x-coordinate value of the leading pixel of the even-numbered group 11Bev, allowing the even-number and odd-number counter 150B to output x-coordinate values of a plurality of pixels constituting the even-numbered group 11Bev from the beginning one by one.

The odd-numbered count value cntBod output from the even-number and odd-number counter 150B indicates an x-coordinate value of a pixel belonging to the odd-numbered group 11Bod of the partial area 11B of the correction line or the succeeding line. The odd-numbered count value cntBod is counted up in twos from the x-coordinate value of the leading pixel of the odd-numbered group 11Bod, allowing the even-number and odd-number counter 150B to output x-coordinate values of a plurality of pixels constituting an odd-numbered group 11Bod one by one from the leading one.

The even-number and odd-number counter 150B outputs, depending on the timing at which pieces of pixel data on the pixels belonging to the even-numbered groups 11Bev of the partial areas 11B for the correction line and the succeeding line are input to the data processor 1 in parallel, x-coordinate values of these pixels. The even-number and odd-number counter 150B outputs, depending on the timing at which pieces of pixel data of the pixels belonging to the odd-numbered groups 11Bod of the partial areas 11B for the correction line and the succeeding line are input to the data processor in parallel, x-coordinate values of these pixels.

The decision section for correction line 161B corresponding to the partial area 11B has a configuration similar to that of the decision section of correction line 161A. The decision section for correction line 161B includes a read pointer for correction line rpB1 corresponding to the partial area 11B. The decision section for correction line 161B reads x-coordinate data from the memory area having a buffer address indicated by the read pointer rpB1 in the buffer 30 that stores the defective data on the partial area 11B of the correction line. Further, the decision section for correction line 161B reads x-coordinate data from the memory area having a buffer address one larger than the value indicated by the read pointer rpB1 in the buffer 30 that stores the defective data on the partial area 11B of the correction line. When the x-coordinate data read from the memory area having the buffer address indicated by the read pointer rpB1 matches the even-numbered count value cntBev indicating an x-coordinate value of the even-numbered group 11Bev in the partial area 11B of the correction line, the decision section for correction line 161B outputs an even-numbered hit signal hitBev1. When the x-coordinate data read from the memory area having the buffer address indicated by the read pointer rpB1 matches the odd-numbered count value cntBod indicating the x-coordinate value of the odd-numbered group 11Bod in the partial area 11B of the correction line, the decision section for correction line 161B outputs an odd-numbered hit signal hitBod1. When the x-coordinate data read from the memory area having the buffer address indicated by the read pointer rpB1 matches an even-numbered count value cntBev and when the x-coordinate data read from the memory area having the buffer address one larger than the value indicated by the read pointer rpB1 matches the odd-numbered count value cntBod, the decision section for correction line 161B outputs an even-number and odd-numbered hit signal hitBeo1.

The decision section for succeeding line 162A corresponding to the partial area 11A has a configuration similar to those of the decision sections for correction line 161A and 161B. The decision section for succeeding line 162A includes a read pointer for the succeeding line rpA2 corresponding to the partial area 11A. The decision section for succeeding line 162A reads x-coordinate data from the memory area having a buffer address indicated by the read pointer rpA2 in the buffer 30 that stores the defective data on the partial area 11A of the succeeding line. Further, the decision section for succeeding line 162A reads x-coordinate data from the memory area having a buffer address one larger than the value indicated by the read pointer rpA2 in the buffer 30 that stores the defective data on the partial area 11A of the succeeding line. Then, when the x-coordinate data read from the memory area having the buffer address indicated by the read pointer rpA2 matches the even-numbered count value cntAev indicating the x-coordinate value of the even-numbered group 11Aev in the partial area 11A of the succeeding line, the decision section for succeeding line 162A outputs an even-numbered hit signal hitAev2. When the x-coordinate data read from the memory area having the buffer address indicated by the read pointer rpA2 matches the odd-numbered count value cntAod indicating the x-coordinate value of the odd-numbered group 11Aod in the partial area 11A of the succeeding line, the decision section for succeeding line 162A outputs an odd-numbered hit signal hitAod2. When the x-coordinate data read from the memory area having the buffer address indicated by the read pointer rpA2 matches the even-numbered count value cntAev and when the x-coordinate data read from the memory area having the buffer address one larger than the value indicated by the read pointer rpA2 matches the odd-numbered count value cntAod, the decision section for succeeding line 162A outputs an even-number and odd-numbered hit signal hitAeo2.

The decision section for succeeding line 162B corresponding to the partial area 11B has a configuration similar to those of the decision sections for correction line 161A and 161B and the decision section for succeeding line 162A. The decision section for succeeding line 162B includes a read pointer for the succeeding line rpB2 corresponding to the partial area 11B. The decision section for succeeding line 162B reads x-coordinate data from a memory area having a buffer address indicated by the read pointer rpB2 in the buffer 30 that stores defective data on the partial area 11B of the succeeding line. Further, the decision section for succeeding line 162B reads x-coordinate data from a memory area having a buffer address one larger than the value indicated by the read pointer rpB2 in the buffer 30 that stores the defective data on the partial area 11B of the succeeding line. Then, when the x-coordinate data read from the memory area having the buffer address indicated by the read pointer rpB2 matches the even-numbered count value cntBev indicating the x-coordinate value of the even-numbered group 11Bev in the partial area 11B of the succeeding line, the decision section for succeeding line 162B outputs an even-numbered hit signal hitBev2. When the x-coordinate data read from the memory area having the buffer address indicated by the read pointer rpB2 matches the odd-numbered count value cntBod indicating the x-coordinate value of the odd-numbered group 11Bod in the partial area 11B of the succeeding line, the decision section for succeeding line 162B outputs an odd-numbered hit signal hitBod2. When the x-coordinate data read from the memory area having the buffer address indicated by the read pointer rpB2 matches the even-numbered count value cntBev and when the x-coordinate data read from the memory area having the buffer address one larger than the value indicated by the read pointer rpB2 matches the odd-numbered count value cntBod, the decision section for succeeding line 162B outputs an even-number and odd-numbered hit signal hitBeo2.

Hereinafter, signals indicating values one larger than the values indicated by the read pointers rpA1, rpA2, rpB1, and rpB2 are referred to as the succeeding read pointers rpA1$n$, rpA2$n$, rpB1$n$, and rpB2$n$, respectively.

<Configuration of Output Circuit According to this Modification>

Figure 20:
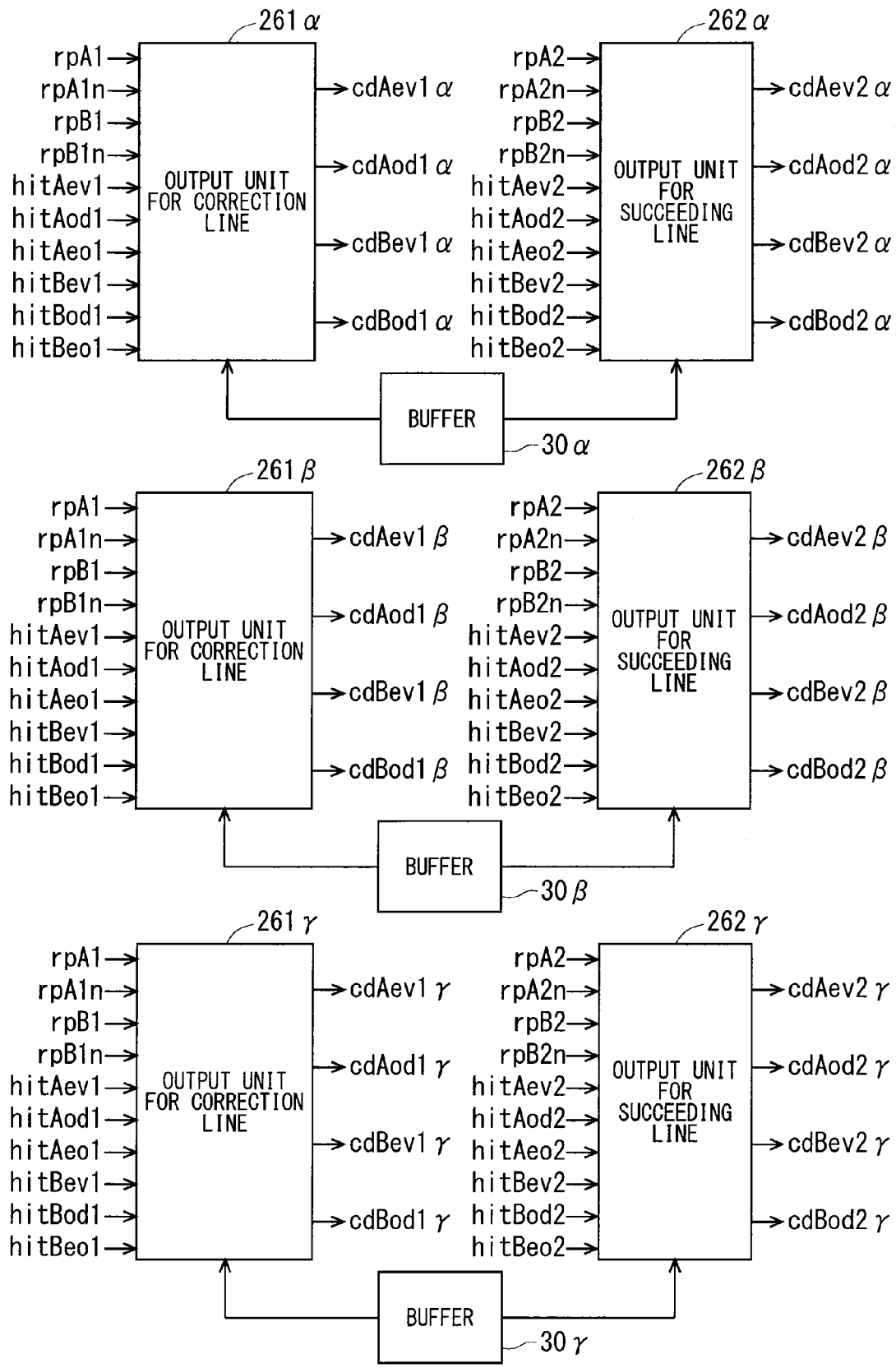
FIG. 20 shows a partial configuration of an output circuit according to the other modification.

FIGS. 20 and 21 show the configuration of the output circuit 6. As shown in FIGS. 20 and 21, the output circuit 6 includes output units for correction line 261α, 261β, and 261γ (FIG. 20), output units of the succeeding line 262α, 262β, and 262γ (FIG. 20), selection circuits for correction line 271Aev, 271Aod, 271Bev, and 271Bod (FIG. 21), and selection circuits for succeeding line 272Aev, 272Aod, 272Bev, and 272Bod (FIG. 21).

The output unit for correction line 261α and the output unit for succeeding line 262α form a circuit that processes correction method identifying data in the buffer 30α. The output unit for correction line 261β and the output unit for succeeding line 262β form a circuit that processes corrected description identifying data in the buffer 30β. The output unit for correction line 261γ and the output unit for succeeding line 262γ form a circuit that processes correction method identifying data in the buffer 30γ.

Figure 22:
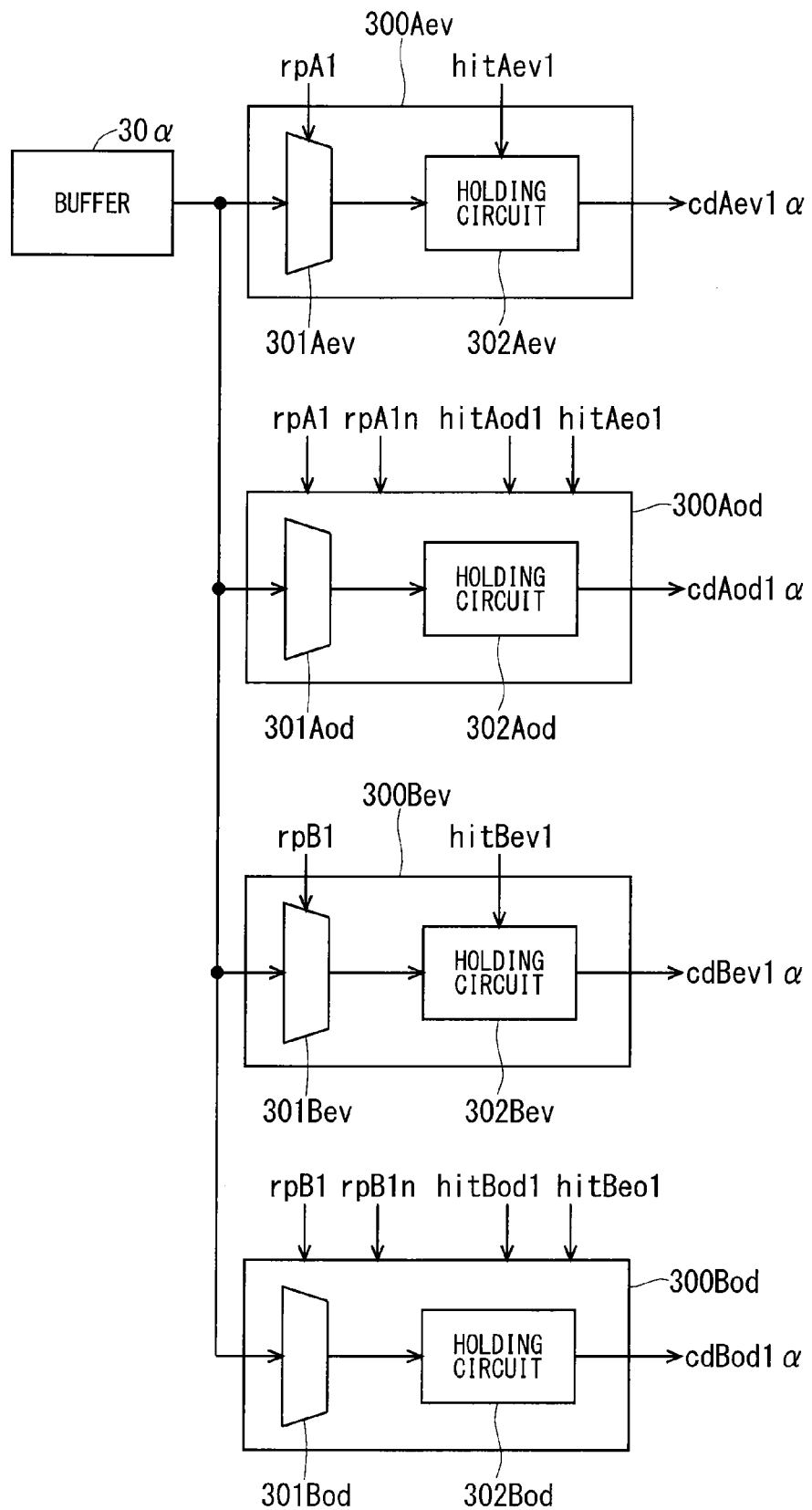
FIG. 22 shows the configuration of an output unit for correction line according to the other modification.

FIG. 22 shows the configuration of the output unit for correction line 261α. The output units for correction line 261α, 261β, and 261γ and the output units of the succeeding line 262α, 262β, and 262γ have the same configuration, and thus, the configuration of the output unit for correction line 261α will be specifically described as a typical example.

The output unit for correction line 261α includes output sections 300Aev, 300Aod, 300Bev, and 300Bod. The output section 300Aev includes a selection circuit 301Aev and a holding circuit 302Aev. The selection circuit 301Aev selects a memory area having a buffer address indicated by the read pointer rpA1 in the decision section of correction line 161A from a plurality of memory areas included in the buffer 30α. The selection circuit 301Aev outputs correction method identifying data included in the defective data (the defective data on the defective pixel in the partial area 11A of the correction line) stored in the selected memory area. Upon receipt of an even-numbered hit signal hitAev1 from the decision section of correction line 161A, the holding circuit 302Aev holds and outputs the correction method identifying data output from the selection circuit 301Aev. The correction method identifying data output from the holding circuit 302Aev is referred to as "correction method identifying data cdAev1α." When the buffer 30α stores defective data on a correction line, the correction method identifying data cdAev1α is the data indicating the correction method for a defective pixel in the even-numbered group 11Aev of the partial area 11A of the correction line.

The output section 300Aod includes a selection circuit 301Aod and a holding circuit 302Aod. Upon receipt of an odd-numbered hit signal hitAod1 from the decision section of correction line 161A, the selection circuit 301Aod selects a memory area having a buffer address indicated by the read pointer rpA1 in the decision section of correction line 161A from a plurality of memory areas included in the buffer 30α. Then, the selection circuit 301Aod outputs correction method identifying data included in the defective data stored in the selected memory area. Meanwhile, upon receipt of an even-number and odd-numbered hit signal hitAeo1 from the decision section of correction line 161A, the selection circuit 301Aod selects a memory area having a buffer address indicated by the succeeding read pointer rpA1$n$ in the decision section of correction line 161A, from a plurality of memory areas included in the buffer 30α. Then, the selection circuit 301Aod outputs correction method identifying data included in the defective data stored in the selected memory area. Upon receipt of any one of an odd-numbered hit signal hitAod1 and an even-number and odd-numbered hit signal hitAeo1 from the decision section of correction line 161A, the holding circuit 302Aod holds and outputs correction method identifying data output from the selection circuit 301Aod. The correction method identifying data output from the holding circuit 302Aod is referred to as "correction method identifying data cdAod1α." When the buffer 30α stores the defective data on a correction line, the correction method identifying data cdAod1α is the data indicating the correction method for a defective pixel in the odd-numbered group 11Aod of the partial area 11A of the correction line.

The output section 300Bev includes a selection circuit 301Bev and a holding circuit 302Bev. The selection circuit 301Bev selects a memory area having a buffer address indicated by the read pointer rpB1 in the decision section for correction line 161B from a plurality of memory areas included in the buffer 30α. Then, the selection circuit 301Bev outputs correction method identifying data included in the defective data (the defective data on a defective pixel in the partial area 11B of the correction line) stored in the selected memory area. Upon receipt of an even-numbered hit signal hitBev1 from the decision section for correction line 161B, the holding circuit 302Bev holds and outputs correction method identifying data output from the selection circuit 301Bev. The correction method identifying data output from the holding circuit 302Bev is referred to as "correction method identifying data cdBev1α." When the buffer 30α stores defective data on a correction line, the correction method identifying data cdBev1α is the data indicating the correction method for a defective pixel in an even-numbered group 11Bev of the partial area 11B of the correction line.

The output section 300Bod includes a selection circuit 301Bod and a holding circuit 302Bod. Upon receipt of an odd-numbered hit signal hitBod1 from the decision section for correction line 161B, the selection circuit 301Bod selects a memory area having a buffer address indicated by the read pointer rpB1 in the decision section for correction line 161B from a plurality of memory areas included in the buffer 30α. Then, the selection circuit 301Bod outputs correction method identifying data included in the defective data stored in the selected memory area. Meanwhile, upon receipt of an even-number and odd-numbered hit signal hitBeo1 from the decision section for correction line 161B, the selection circuit 301Bod selects a memory area having a buffer address indicated by the succeeding read pointer rpB1$n$ in the decision section for correction line 161B from a plurality of memory areas included in the buffer 30α. Then, the selection circuit 301Bod outputs correction method identifying data included in the defective data stored in the selected memory area. Upon receipt of any one of the odd-numbered hit signal hitBod1 and the even-number and odd-numbered hit signal hitBeo1 from the decision section for correction line 161B, the holding circuit 302Bod holds and outputs correction method identifying data output from the selection circuit 301Bod. The correction method identifying data output from the holding circuit 302Bod is referred to as "correction method identifying data cdBod1α." When the buffer 30α stores defective data on the correction line, the correction method identifying data cdBod1α is the data indicating the correction method for a defective pixel in the odd-numbered group 11Bod of the partial area 11B of the correction line.

As described above, upon receipt of an even-numbered hit signal hitAev1, the output unit for correction line 261α outputs the correction method identifying data in the memory area having a buffer address indicated by the read pointer rpA1, which is included in the buffer 30α, as correction method identifying data cdAev1α. Upon receipt of an odd-numbered hit signal hitAod1, the output unit for correction line 261α outputs the correction method identifying data in the memory area having a buffer address indicated by the read pointer rpA1, which is included in the buffer 30α, as correction method identifying data cdAod1α. Upon receipt of an even-number and odd-numbered hit signal hitAeo1, the output unit for correction line 261α outputs the correction method identifying data in the memory area having a buffer address indicated by the succeeding read pointer rpA1n, which is included in the buffer 30α, as correction method identifying data cdAod1α. Upon receipt of an even-numbered hit signal hitBev1, the output unit for correction line 261α outputs the correction method identifying data in the memory area having a buffer address indicated by the read pointer rpB1, which is included in the buffer 30α, as correction method identifying data cdBev1α. Then, upon receipt of an odd-numbered hit signal hitBod1, the output unit for correction line 261α outputs the correction method identifying data in the memory area having a buffer address indicated by the read pointer rpB1, which is included in the buffer 30α, as correction method identifying data cdBod1α. Upon receipt of an even-number and odd-numbered hit signal hitBeo1, the output unit for correction line 261α outputs the correction method identifying data in a memory area having a buffer address indicated by the succeeding read pointer rpB1n, which is included in the buffer 30α, as correction method identifying data cdBod1α.

The output units for correction line 261β and 261γ operate similarly to the output unit for correction line 261α. Upon receipt of an even-numbered hit signal hitAev1, the output unit for correction line 261β outputs the correction method identifying data in the memory area having a buffer address indicated by the read pointer rpA1, which is included in the buffer 30β, as correction method identifying data cdAev1β. Upon receipt of an odd-numbered hit signal hitAod1, the output unit for correction line 261β outputs the correction method identifying data in the memory area having a buffer address indicated by the read pointer rpA1, which is included in the buffer 30β, as correction method identifying data cdAod1β. Upon receipt of an even-number and odd-numbered hit signal hitAeo1, the output unit for correction line 261β outputs the correction method identifying data in a memory area having a buffer address indicated by the succeeding read pointer rpA1n, which is included in the buffer 30β, as correction method identifying data cdAod1β. Upon receipt of an even-numbered hit signal hitBev1, the output unit for correction line 261β outputs the correction method identifying data in a memory area having a buffer address indicated by the read pointer rpB1, which is included in the buffer 30β, as correction method identifying data cdBev1β. Then, upon receipt of an odd-numbered hit signal hitBod1, the output unit for correction line 261β outputs the correction method identifying data in the memory area having a buffer address indicated by the read pointer rpB1, which is included in the buffer 30β, as correction method identifying data cdBod1β. Upon receipt of an even-number and odd-numbered hit signal hitBeo1, the output unit for correction line 261β outputs the correction method identifying data in the memory area having a buffer address indicated by the succeeding read pointer rpB1n, which is included in the buffer 30β, as correction method identifying data cdBod1β.

Upon receipt of an even-numbered hit signal hitAev1, the output unit for correction line 261γ outputs the correction method identifying data in the memory area having a buffer address indicated by the read pointer rpA1, which is included in the buffer 30γ, as correction method identifying data cdAev1γ. Upon receipt of an odd-numbered hit signal hitAod1, the output unit for correction line 261γ outputs the correction method identifying data in the memory area having a buffer address indicated by the read pointer rpA1, which is included in the buffer 30γ, as correction method identifying data cdAod1γ. Upon receipt of an even-number and odd-numbered hit signal hitAeo1, the output unit for correction line 261γ outputs the correction method identifying data in the memory area having a buffer address indicated by the succeeding read pointer rpA1n, which is included in the buffer 30γ, as correction method identifying data cdAod1γ. Upon receipt of an even-numbered hit signal hitBev1, the output unit for correction line 261γ outputs the correction method identifying data in the memory area having a buffer address indicated by the read pointer rpB1, which is included in the buffer 30γ, as correction method identifying data cdBev1γ. Then, upon receipt of an odd-numbered hit signal hitBod1, the output unit for correction line 261γ outputs the correction method identifying data in the memory area having a buffer address indicated by the read pointer rpB1, which is included in the buffer 30γ, as correction method identifying data cdBod1γ. Upon receipt of an even-number and odd-numbered hit signal hitBeo1, the output unit for correction line 261γ outputs the correction method identifying data in the memory area having a buffer address indicated by the succeeding read pointer rpB1n, which is included in the buffer 30γ, as correction method identifying data cdBod1γ.

The output units of the succeeding line 262α, 262β, and 262γ operate similarly to the output units for correction line 261α, 261β, and 261γ. Upon receipt of an even-numbered hit signal hitAev2, the output unit for succeeding line 262α outputs the correction method identifying data in the memory area having a buffer address indicated by the read pointer rpA2, which is included in the buffer 30α, as correction method identifying data cdAev2α. Upon receipt of an odd-numbered hit signal hitAod2, the output unit for succeeding line 262α outputs the correction method identifying data in the memory area having a buffer address indicated by the read pointer rpA2, which is included in the buffer 30α, as correction method identifying data cdAod2α. Upon receipt of an even-number and odd-numbered hit signal hitAeo2, the output unit for succeeding line 262α outputs the correction method identifying data in the memory area having a buffer address indicated by the succeeding read pointer rpA2n, which is included in the buffer 30α, as correction method identifying data cdAod2α.

Upon receipt of an even-numbered hit signal hitBev2, the output unit for succeeding line 262α outputs the correction method identifying data in the memory area having a buffer address indicated by the read pointer rpB2, which is included in the buffer 30α, as correction method identifying data cdBev2α. Then, upon receipt of an odd-numbered hit signal hitBod2, the output unit for succeeding line 262α outputs the correction method identifying data in the memory area having a buffer address indicated by the read pointer rpB2, which is included in the buffer 30α, as correction method identifying data cdBod2α. Upon receipt of an even-number and odd-numbered hit signal hitBeo2, the output unit for succeeding line 262α outputs the correction method identifying data in the memory area having a buffer address indicated by the succeeding read pointer rpB2n, which is included in the buffer 30α, as correction method identifying data cdBod2α.

Upon receipt of an even-numbered hit signal hitAev2, the output unit for succeeding line 262β outputs the correction method identifying data in the memory area having a buffer address indicated by the read pointer rpA2, which is included in the buffer 30β, as correction method identifying data cdAev2β. Upon receipt of an odd-numbered hit signal hitAod2, the output unit for succeeding line 262β outputs the correction method identifying data in the memory area having a buffer address indicated by the read pointer rpA2, which is included in the buffer 30β, as correction method identifying data cdAod2β. Upon receipt of an even-number and odd-numbered hit signal hitAeo2, the output unit for succeeding line 262β outputs the correction method identifying data in the memory area having a buffer address indicated by the succeeding read pointer rpA2n, which is included in the buffer 30β, as correction method identifying data cdAod2β. Upon receipt of an even-numbered hit signal hitBev2, the output unit for succeeding line 262β outputs the correction method identifying data in the memory area having a buffer address indicated by the read pointer rpB2, which is included in the buffer 30β, as correction method identifying data cdBev2β. Then, upon receipt of an odd-numbered hit signal hitBod2, the output unit for succeeding line 262β outputs the correction method identifying data in the memory area having a buffer address indicated by the read pointer rpB2n, which is included in the buffer 30β, as correction method identifying data cdBod2β. Upon receipt of an even-number and odd-numbered hit signal hitBeo2, the output unit for succeeding line 262P outputs the correction method identifying data in the memory area having a buffer address indicated by the succeeding read pointer rpB2n, which is included in the buffer 30β, as correction method identifying data cdBod2β.

Upon receipt of an even-numbered hit signal hitAev2, the output unit for succeeding line 262γ outputs the correction method identifying data in the memory area having a buffer address indicated by the read pointer rpA2, which is included in the buffer 30γ, as correction method identifying data cdAev2γ. Upon receipt of an odd-numbered hit signal hitAod2, the output unit for succeeding line 262γ outputs the correction method identifying data in the memory area having a buffer address indicated by the read pointer rpA2, which is included in the buffer 30γ, as correction method identifying data cdAod2γ. Upon receipt of an even-number and odd-numbered hit signal hitAeo2, the output unit for succeeding line 262γ outputs the correction method identifying data in the memory area having a buffer address indicated by the succeeding read pointer rpA2n, which is included in the buffer 30γ, as correction method identifying data cdAod2γ. Upon receipt of an even-numbered hit signal hitBev2, the output unit for succeeding line 262γ outputs the correction method identifying data in the memory area having a buffer address indicated by the read pointer rpB2, which is included in the buffer 30γ, as correction method identifying data cdBev2γ. Then, upon receipt of an odd-numbered hit signal hitBod2, the output unit for succeeding line 262γ outputs the correction method identifying data in the memory area having a buffer address indicated by the read pointer rpB2, which is included in the buffer 30γ, as correction method identifying data cdBod2γ. Upon receipt of an even-number and odd-numbered hit signal hitBeo2, the output unit for succeeding line 262γ outputs the correction method identifying data in the memory area having a buffer address indicated by the succeeding read pointer rpB2n, which is included in the buffer 30γ, as correction method identifying data cdBod2γ.

As shown in FIG. 21, the selection circuit for correction line 271Aev selects and outputs any one of the correction method identifying data cdAev1α, correction method identifying data cdAev1β, and correction method identifying data cdAev1γ, on the basis of a read selection signal for correction line RS1 output from the buffer selecting unit 7.

Specifically, the selection circuit for correction line 271Aev outputs the correction method identifying data cdAev1α when the read selection signal for correction line RS1 indicates "0," that is, when the read buffer for correction line 30 is the buffer 30α. The selection circuit for correction line 271Aev outputs the correction method identifying data cdAev1β when the read selection signal for correction line RS1 indicates "1," that is, when the read buffer for correction line 30 is the buffer 30β. The selection circuit for correction line 271Aev outputs the correction method identifying data cdAev1γ when the read selection signal for correction line RS1 indicates "2," that is, when the read buffer for correction line 30 is the buffer 30γ. Letting the data output from the selection circuit for correction line 271Aev be "correction method identifying data cdAev10," the correction method identifying data cdAev10 is the data indicating a correction method for a defective pixel in the even-numbered group 11Aev of the partial area 11A of the correction line. At the timing at which the pixel data on a defective pixel in the even-numbered group 11Aev of the partial area 11A of the correction line is input to the data processor 1, the output circuit 6 outputs the correction method identifying data cdAev10 indicating the correction method for the defective pixel.

The selection circuits for correction line 271Aod, 271Bev, and 271Bod operate similarly to the selection circuit for correction line 271Aev. The selection circuit for correction line 271Aod outputs the correction method identifying data cdAod1α for the read selection signal for correction line RS1 indicating "0," outputs the correction method identifying data cdAod1β for the signal indicating "1," and outputs the correction method identifying data cdAod1γ for the signal indicating "2." Letting the data output from the selection circuit for correction line 271Aod be "correction method identifying data cdAod10," the correction method identifying data cdAod10 is the data indicating the correction method for a defective pixel in the odd-numbered group 11Aod of the partial area 11A of the correction line. At the timing at which the pixel data on a defective pixel in the odd-numbered group 11Aod of the partial area 11A of the correction line is input to the data processor 1, the output circuit 6 outputs the correction method identifying data cdAod10 indicating the method for the defective pixel.

The selection circuit for correction line 271Bev outputs the correction method identifying data cdBev1α for the read selection signal for correction line RS1 indicating "0," outputs the correction method identifying data cdBev1β for the signal indicating "1," and outputs the correction method identifying data cdBev1γ for the signal indicating "2." Letting the data output from the selection circuit for correction line 271Bev be "correction method identifying data cdBev10," the correction method identifying data cdBev10 is the data indicating the correction method for a defective pixel in the even-numbered group 11Bev of the partial area 11B of the correction line. At the timing at which the pixel data on a defective pixel in the even-numbered group 11Bev of the partial area 11B of the correction line is input to the data processor 1, the output circuit 6 outputs the correction method identifying data cdBev10 indicating the method for the defective pixel.

The selection circuit for correction line 271Bod outputs the correction method identifying data cdBod1α for the read selection signal for correction line RS1 indicating "0," outputs the correction method identifying data cdBod1β for the signal indicating "1," and outputs the correction method identifying data cdBod1γ for the signal indicating "2." Letting the data output from the selection circuit for correction line 271Bod be "correction method identifying data cdBod10," the correction method identifying data cdBod10 is the data indicating the correction method for a defective pixel in the odd-numbered group 11Bod of the partial area 11B of the correction line. At the timing at which pixel data on a defective pixel in the odd-numbered group 11Bod of the partial area 11B of the correction line is input to the data processor 1, the output circuit 6 outputs the correction method identifying data cdBod10 indicating the method for the defective pixel.

The selection circuit for succeeding line 272Aev selects and outputs any one of the correction method identifying data cdAev2α, the correction method identifying data cdAev2β, and the correction method identifying data cdAev2γ, on the basis of the read selection signal for succeeding line RS2 output from the buffer selecting unit 7.

Here, the read selection signal for succeeding line RS2 is a signal indicating which buffer 30 of the buffers 30α, 30β, and 30γ stores the defective data on the succeeding line. The read selection signal for succeeding line RS2 indicating "0" means that the buffer 30 that stores defective data on the succeeding line (hereinafter, also referred to as "read buffer for succeeding line 30") is the buffer 30α, the signal indicating "1" means the buffer 30β, and the signal indicating "2" means the buffer 30γ.

The selection circuit for succeeding line 272Aev outputs the correction method identifying data cdAev2α for the read selection signal for succeeding line RS2 indicating "0," outputs the correction method identifying data cdAev2β for the signal indicating "1," and outputs the correction method identifying data cdAev2γ for the signal indicating "2." Letting the data output from the selection circuit for succeeding line 272Aev be "correction method identifying data cdAev20," the correction method identifying data cdAev20 is the data indicating the correction method for a defective pixel in the even-numbered group 11Aev of the partial area 11A of the succeeding line. At the timing at which pixel data on a defective pixel in the even-numbered group 11Aev of the partial area 11A of the succeeding line is input to the data processor 1, the output circuit 6 outputs correction method identifying data cdAev20 indicating the method for the defective pixel.

The selection circuit for succeeding line 272Aod outputs the correction method identifying data cdAod2α for the read selection signal for succeeding line RS2 indicating "0," outputs the correction method identifying data cdAod2β for the signal indicating "1," and outputs the correction method identifying data cdAod2γ for the signal indicating "2." Letting the data output from the selection circuit for succeeding line 272Aod be "correction method identifying data cdAod20," the correction method identifying data cdAod20 is the data indicating the correction method for a defective pixel in the odd-numbered group 11Aod of the partial area 11A of the succeeding line. At the timing at which pixel data on a defective pixel in the odd-numbered group 11Aod of the partial area 11A of the succeeding line is input to the data processor 1, the output circuit 6 outputs correction method identifying data cdAod20 indicating the method for the defective pixel.

The selection circuit for succeeding line 272Bev outputs the correction method identifying data cdBev2α for the read selection signal for succeeding line RS2 indicating "0," outputs the correction method identifying data cdBev2β for the signal indicating "1," and outputs the correction method identifying data cdBev2γ for the signal indicating "2." Letting the data output from the selection circuit for succeeding line 272Bev be "correction method identifying data cdBev20," the correction method identifying data cdBev20 is the data indicating the correction method for a defective pixel in the even-numbered group 11Bev of the partial area 11B of the succeeding line. At the timing at which pixel data on a defective pixel in the even-numbered group 11Bev of the partial area 11B of the succeeding line is input to the data processor 1, the output circuit 6 outputs the correction method identifying data cdBev20 indicating the method for the defective pixel.

The selection circuit for succeeding line 272Bod outputs the correction method identifying data cdBod2α for the read selection signal for succeeding line RS2 indicating "0," outputs the correction method identifying data cdBod2β for the signal indicating "1," and outputs the correction method identifying data cdBod2γ for the signal indicating "2." Letting the data output from the selection circuit for succeeding line 272Bod be "correction method identifying data cdBod20," the correction method identifying data cdBod20 is the data indicating the correction method for a defective pixel in the odd-numbered group 11Bod of the partial area 11B of the succeeding line. At the timing at which pixel data on a defective pixel in the odd-numbered group 11Bod of the partial area 11B of the succeeding line is input to the data processor 1, the output circuit 6 outputs correction method identifying data cdBod20 indicating the method for the defective pixel.

<Operation of Write Unit According to this Modification>

The write unit 4 according to this modification operates as in the embodiment described above (see FIG. 6). The write unit 4 includes a write pointer wpA corresponding to the partial area 11A and a write pointer wpB corresponding to the partial area 11B. The write unit 4 initializes the values of the write pointers wpA and wpB to "0" at the timing at which the first defective data on a target line is input thereto.

Upon receipt of the defective data on a target line, the write unit 4 compares x-coordinate data included in the defective data and a leading x-coordinate value xBst in the partial area 11B and, if the x-coordinate data is smaller than the x-coordinate value xBst, increments the value of the write pointer wpB by one at the timing of writing the defective data into the write buffer 30. Contrastingly, if the x-coordinate data is equal to or larger than the x-coordinate value xBst, the write unit 4 keeps the current value of the write pointer wpB.

When the write unit 4 writes the final defective data on the target line into the write buffer 30 and writing of all the pieces of defective data on the target line into the write buffer 30 is complete, the value of the write pointer wpA at that time is set as the initial value of the read pointer rpA1 used when the target line is a correction line and is also set as the initial value of the read pointer rpA2 used when the target line is the succeeding line. The value of the write pointer wpB at that time is set as the initial value of the read pointer rpB1 used when the target line is a correction line and is also set as the initial value of the read pointer rpB2 used when the target line is the succeeding line. In the example of FIG. 6, the initial values of the read pointers rpA1 and rpB1 when the target line is the correction line are "0" and "p," respectively, and the initial values of the read pointers rpA2 and rpB2 when the target line is the succeeding line are "0" and "p," respectively.

The initial value ("0") of the read pointer for correction line rpA1 indicates a buffer address of a memory area into which the defective data on a defective pixel having the smallest x-coordinate value among pieces of defective pixel included in the partial area 11A of the correction line, that is, the defective data on a leading defective pixel in the partial area 11A of the correction line has been written. The initial value ("0") of the read pointer for the succeeding line rpA2 indicates a buffer address of a memory area into which defective data on the defective pixel having the smallest x-coordinate value among pieces of defective pixel included in the partial area 11A of the succeeding line has been written. The initial value of the read pointer for the correction line rpB1 indicates a buffer address of the memory area into which defective data on a defective pixel having the smallest x-coordinate value among pieces of defective pixel included in the partial area 11B of the correction line has been written. The initial value of the read pointer for the succeeding line rpB2 indicates a buffer address of a memory area into which defective data on a defective pixel having the smallest x-coordinate value among pieces of defective pixel included in the partial area 11B of the succeeding line has been written.

<Operations of Decision Circuit and Output Circuit According to this Modification>

FIG. 23 is a timing chart showing the operation of the decision circuit 5 according to this modification. FIG. 23 shows the operations of the even-number and odd-number counters 150A and 150B and the decision circuit for correction line 161. The decision circuit for succeeding line 162 operates similarly to the decision circuit for correction line 161, and thus, the operation of the decision circuit for correction line 161 will be specifically described below as a typical example.

FIG. 23 shows the operation of the decision circuit for correction line 161 when the defective data is read from a read buffer for correction line 30, which is the buffer 30 into which the defective data on a target line has been written as in the example of FIG. 6 described above. In FIG. 23, "read data (rpA1)" indicates x-coordinate data read by the decision section of correction line 161A from the memory area having a buffer address indicated by the read pointer rpA1 in the read buffer for correction line 30, "read data (rpA1$n$)" indicates the x-coordinate data read by the decision section for correction line 161A from the memory area having a buffer address indicated by the read pointer rpA1$n$ in the read buffer for correction line 30, "read data (rpB1)" indicates the x-coordinate data read by the decision section for correction line 161B from the memory area having a buffer address indicated by the read pointer rpB1 in the read buffer for correction line 30, and "read data (rpB1$n$)" indicates the x-coordinate data read by the decision section for correction line 161B from the memory area having a buffer address indicated by the read pointer rpB1$n$ in the read buffer for correction line 30.

As shown in FIG. 23, when a horizontal synchronization signal is input to the data processor 1, the counters 151 of the even-number and odd-number counters 150A and 150B are initialized at the rising edge of the horizontal synchronization signal. As a result, the even-numbered count value cntAev is initialized to "0," the odd-numbered count value cntAod is initialized to "1," the even-numbered count value cntBev is initialized to "xBst," and the odd-numbered count value cntBod is initialized to "xBst+1."

After being initialized, the even-numbered count values cntAev and cntBev and the odd-numbered count values cntAod and cntBod are counted up by two at every predetermined timing (at every riding edge of an operation clock signal). In this case, the even-numbered count value cntAev is counted up depending on the timing at which pixel data on a pixel belonging to the even-numbered group 11Aev in the partial area 11A of the correction line is input to the data processor 1. The even-numbered count value cntAev accordingly indicates, depending on the timing at which the pixel data on a pixel belonging to the even-numbered group 11Aev of the partial area 11A of the correction line is input to the data processor 1, the x-coordinate value of the pixel. Similarly, the odd-numbered count value cntAod indicates, depending on the timing at which the pixel data on a pixel belonging to the odd-numbered group 11Aod of the partial area 11A of the correction line is input to the data processor 1, the x-coordinate value of the pixel. The even-numbered count value cntBev indicates, depending on the timing at which the pixel data on a pixel belonging to the even-numbered group 11Bev of the partial area 11B of the correction line is input to the data processor 1, the x-coordinate value of the pixel. The odd-numbered count value cntBod indicates, depending on the timing at which the pixel data on a pixel belonging to the odd-numbered group 11Bod of the partial area 11B of the correction line is input to the data processor 1, the x-coordinate value of the pixel.

When a horizontal synchronization signal is input to the data processor 1, the decision section of correction line 161A reads x-coordinate data from the memory area of the read buffer for correction line 30, which has a buffer address currently indicated by the read pointer rpA1. The decision section of correction line 161A further reads x-coordinate data from the memory area of the read buffer for correction line 30, which has a buffer address currently indicated by the succeeding read pointer rpA1$n$ (a buffer address one larger than the value indicated by the read pointer rpA1). Then, the decision section of correction line 161A compares the x-coordinate data (hereinafter, referred to as "x-coordinate data (rpA1)") read from the memory area having the buffer address indicated by the read pointer rpA1 with the current value of the even-numbered count value cntAev and the current value of the odd-numbered count value cntAod. The decision section of correction line 161A further compares the x-coordinate data (hereinafter, referred to as "x-coordinate data (rpA1$n$)") read from the memory area having the buffer address indicated by the succeeding read pointer rpA1$n$ with the current value of the odd-numbered count value cntAod. When the x-coordinate data (rpA1) matches the even-numbered count value cntAev, the decision section of correction line 161A outputs an even-numbered hit signal hitAev1. When the x-coordinate data (rpA1) matches the odd-numbered count value cntAod, the decision section of correction line 161A outputs an odd-numbered hit signal hitAod1. Then, when the x-coordinate data (rpA1) matches the even-numbered count value cntAev and when the x-coordinate data (rpA1n) matches the odd-numbered count value cntAod, the decision section of correction line 161A outputs an even-number and odd-numbered hit signal hitAeo1.

In outputting an even-number and odd-numbered hit signal hitAeo1, the decision section of correction line 161A increments the value of the read pointer rpA1 by two at its rising edge. Contrastingly, in outputting no even-number and odd-numbered hit signal hitAeo1 and outputting an even-numbered hit signal hitAev1, the decision section of correction line 161A increments the value of the read pointer rpA1 by one at the rising edge of the even-numbered hit signal hitAev1. In outputting no even-number and odd-numbered hit signal hitAeo1 and outputting an odd-numbered hit signal hitAod1, the decision section of correction line 161A increments the value of the read pointer rpA1 by one at the rising edge of the odd-numbered hit signal hitAod1.

When the even-numbered count value cntAev and the odd-numbered count value cntAod are incremented by two thereafter, the decision section of correction line 161A reads x-coordinate data from the memory area of the read buffer for correction line 30, which has a buffer address currently indicated by the read pointer rpA1, and reads x-coordinate data from the memory area of the read buffer for correction line 30, which has a buffer address currently indicated by the succeeding read pointer rpA1n. Thereafter, the decision section of correction line 161A operates similarly. The decision section of correction line 161A operates similarly every time the even-numbered count value cntAev and the odd-numbered count value cntAod are incremented by two.

In the example of FIG. 23, for the even-numbered count value cntAev of "2," the x-coordinate data (rpA1) (rd[0]) matches the even-numbered count value cntAev, generating an even-numbered hit signal hitAev1. For the odd-numbered count value cntAod of "7," the x-coordinate data (rpA1) (rd[1]) matches the odd-numbered count value cntAod, generating an odd-numbered hit signal hitAod1. For the even-numbered count value cntAev of "34" and the odd-numbered count value cntAod of "35," the x-coordinate data (rpA1) (rd[2]) matches the even-numbered count value cntAev and the x-coordinate data (rpA1n) (rd[3]) matches the odd-numbered count value cntAod, generating an even-number and odd-numbered hit signal hitAeo1.

As described above, the decision section of correction line 161A compares the x-coordinate data (rpA1) read from the read buffer for correction line 30 with the even-numbered count value cntAev and the odd-numbered count value cntAod input from the even-number and odd-number counter 150A. When the read x-coordinate data (rpA1) does not match each of the even-numbered count value cntAev and the odd-numbered count value cntAod, the decision section of correction line 161A compares the x-coordinate data with an even-numbered count value cntAev and an odd-numbered count value cntAod to be input next from the even-number and odd-number counter 150A. When the read x-coordinate data (rpA1) matches one of the even-numbered count value cntAev and the odd-numbered count value cntAod, the decision section of correction line 161A compares the x-coordinate data (rpA1) read next from the read buffer for correction line 30 with an even-numbered count value cntAev and an odd-numbered count value cntAod to be input next from the even-number and odd-number counter 150A.

The decision section for correction line 161B corresponding to the partial area 11B operates similarly to the decision section of correction line 161A. The operation of the decision section for correction line 161B will be described by replacing, in the above description on the operation of the decision section of correction line 161A, the even-numbered count value cntAev, odd-numbered count value cntAod, read pointer rpA1, succeeding read pointer rpA1n, even-numbered hit signal hitAev1, odd-numbered hit signal hitAod1, and even-number and odd-numbered hit signal hitAeo1 with the even-numbered count value cntBev, odd-numbered count value cntBod, read pointer rpB1, succeeding read pointer rpB1n, even-numbered hit signal hitBev1, odd-numbered hit signal hitBod1, and even-number and odd-numbered hit signal hitBeo1, respectively.

In the example of FIG. 23, for the even-numbered count value cntBev of "xBst+32," the x-coordinate data (rd[p]) read from the memory area of the read pointer rpB1 matches the even-numbered count value cntBev, generating an even-numbered hit signal hitBev1. For the odd-numbered count value cntBod of "xBst+35," the x-coordinate data (rd[p+1]) read from the memory area of the read pointer rpB1 matches the odd-numbered count value cntBod, generating an odd-numbered hit signal hitBod1. For the even-numbered count value cntBev of "xBst+62" and the odd-numbered count value cntBod of "xBst+63," the x-coordinate data (rd[p+2]) read from the memory area of the read pointer rpB1 matches the even-numbered count value cntBev and the x-coordinate data (rd[p+3]) read from the memory area of the succeeding read pointer rpB1n matches the odd-numbered count value cntBod, generating an even-number and odd-numbered hit signal hitBeo1.

The decision sections for succeeding line 162A and 162B operate similarly to the decision section of correction line 161A. The operation of the decision section for succeeding line 162A will be described by replacing, in the above description on the operation of the decision section of correction line 161A, the read buffer for correction line 30, read pointer rpA1, succeeding read pointer rpA1n, even-numbered hit signal hitAev1, odd-numbered hit signal hitAod1, and even-number and odd-numbered hit signal hitAeo1 with the read buffer for succeeding line 30, read pointer rpA2, succeeding read pointer rpA2n, even-numbered hit signal hitAev2, odd-numbered hit signal hitAod2, and even-number and odd-numbered hit signal hitAeo2, respectively. The operation of the decision section for succeeding line 162B will be described by, in the above description on the operation of the decision section of correction line 161A, replacing the read buffer for correction line 30, even-numbered count value cntAev, odd-numbered count value cntAod, read pointer rpA1, succeeding read pointer rpA1n, even-numbered hit signal hitAev1, odd-numbered hit signal hitAod1, and even-number and odd-numbered hit signal hitAeo1 with the read buffer for succeeding line 30, even-numbered count value cntBev, odd-numbered count value cntBod, read pointer rpB2, succeeding read pointer rpB2n, even-numbered hit signal hitBev2, odd-numbered hit signal hitBod2, and even-number and odd-numbered hit signal hitBeo2, respectively.

Although the counters 151 of the even-number and odd-number counters 150A and 150B are initialized at the rising edge of a horizontal synchronization signal in the example above, the counters 151 may be initialized at other timing. Alternatively, the counters 151 of the even-number and odd-number counters 150A and 150B may be initialized at different timings.

<Operation of Pixel Defect Correcting Unit According to this Modification>

In this modification, the pixel defect correcting unit 2 receives defective pixel data on an even-numbered group 11Aev included in the partial area 11A of the correction line and correction method identifying data cdAev10 indicating the correction method for the defective pixel data in parallel. The pixel defect correcting unit 2 corrects the defective pixel data by a correction method indicated by the correction method identifying data cdAev10. Further, the pixel defect correcting unit 2 receives defective pixel data on the odd-numbered group 11Aod included in the partial area 11A of the correction line and correction method identifying data cdAod10 indicating the correction method for the defective pixel data in parallel. The pixel defect correcting unit 2 corrects the pieces of defective pixel data by the correction method indicated by the correction method identifying data cdAod10.

Further, the pixel defect correcting unit 2 receives defective pixel data on the even-numbered group 11Bev included in the partial area 11B of the correction line and correction method identifying data cdBev10 indicating the correction method for the defective pixel data in parallel. The pixel defect correcting unit 2 corrects the defective pixel data by the correction method indicated by the correction method identifying data cdBev10. The pixel defect correcting unit 2 further receives defective pixel data on the odd-numbered group 11Bod included in the partial area 11B of the correction line and correction method identifying data cdBod10 indicating the correction method for the defective pixel data in parallel. The pixel defect correcting unit 2 corrects the defective pixel data by the correction method indicated by the correction method identifying data cdBod10.

The pixel defect correcting unit 2 receives the pixel data on the even-numbered group 11Aev included in the partial area 11A of the correction line, the pixel data on the odd-numbered group 11Aod included in the partial area 11A of the correction line, the pixel data on the even-numbered group 11Bev included in the partial area 11B of the correction line, and the pixel data on the odd-numbered group 11Bod included in the partial area 11B of the correction line in parallel. Thus, the pixel defect correcting unit 2 corrects a pixel defect for the even-numbered group 11Aev, corrects a pixel defect for the odd-numbered group 11Aod, corrects a pixel defect for the even-numbered group 11Bev, and corrects a pixel defect for the odd-numbered group 11Bod in parallel.

The pixel defect correcting unit 2 according to this modification performs pixel defect correction on the correction line, and identifies and stores the pixel data required in pixel defect correction for the succeeding line among pieces of pixel data on the correction line, using the correction method identifying data on the succeeding line. This eliminates the need for the pixel defect correcting unit 2 to store all the pieces of pixel data on a correction line for performing pixel defect correction on the succeeding line, simplifying the configuration of the pixel defect correcting unit 2.

Specifically, upon receipt of defective pixel data on the even-numbered group 11Aev included in the partial area 11A of the succeeding line and correction method identifying data cdAev20 indicating the correction method for the defective pixel data, the pixel defect correcting unit 2 identifies pixel data on a correction line, which is required in correcting the defective pixel data, on the basis of the x-coordinate value of the pixel corresponding to the defective pixel data and on the basis of the correction method indicated by the correction method identifying data cdAev20, and then stores the pixel data input thereto.

Similarly, upon receipt of defective pixel data on the odd-numbered group 11Aod included in the partial area 11A of the succeeding line and correction method identifying data cdAod20 indicating the correction method for the defective pixel data, the pixel defect correcting unit 2 identifies pixel data on the correction line, which is required in correcting the defective pixel data, on the basis of the x-coordinate value of the pixel corresponding to the defective pixel data and on the basis of the correction method indicated by the correction method identifying data cdAod20, and then stores the pixel data input thereto.

Upon receipt of defective pixel data on the even-numbered group 11Bev included in the partial area 11B of the succeeding line and correction method identifying data cdBev20 indicating the correction method for the defective pixel data, the pixel defect correcting unit 2 identifies pixel data on a correction line, which is required in correcting the defective pixel data, on the basis of the x-coordinate value on a pixel corresponding to the defective pixel data and on the basis of the correction method indicated by the correction method identifying data cdBev20, and then stores the pixel data input thereto.

Upon receipt of defective pixel data on the odd-numbered group 11Bod included in the partial area 11B of the succeeding line and correction method identifying data cdBod20 indicating the correction method for the defective pixel data, the pixel defect correcting unit 2 identifies pixel data on a correction line, which is required in correcting the defective pixel data, on the basis of the x-coordinate value of a pixel corresponding to the defective pixel data and on the basis of the correction method indicated by the correction method identifying data cdBod20, and then stores the pixel data input thereto.

As described above, the pixel defect correcting unit 2 receives the pixel data on the correction line, the pixel data on the succeeding line, and the correction method identifying data on the succeeding line in parallel, and thus can identify and store the pixel data required in the pixel defect correction for the succeeding line among pieces of pixel data on a correction line. This eliminates the need for the pixel defect correcting unit 2 to store all the pieces of pixel data on the correction line for the pixel defect correction of the succeeding line, simplifying the configuration of the pixel defect correcting unit 2.

As described above, in this modification, the even-number and odd-number counter 150A inputs, to the decision section of correction line 161A, x-coordinate values for a plurality of pixels constituting the partial area 11A in ascending order per data group, where the data group is composed of two x-coordinate values. The buffer 30 stores, among x-coordinate values for a plurality of pixels constituting the partial area 11A, an x-coordinate value (x-coordinate data) of at least one defective pixel included in the plurality of pixels. In other words, the buffer 30 stores a plurality of pieces of input data matching at least part of a plurality of pieces of input data input to the decision section of correction line 161A. Then, the decision section of correction line 161A reads the x-coordinate values from the buffer 30 in ascending order. In other words, the decision section of correction line 161A reads pieces of data from the buffer 30 in the order based on the same rule as the rule when input data is input. The decision section of correction line 161A compares the x-coordinate data (x-coordinate value) read from the buffer 30 with the even-numbered count value and odd-numbered count value input from the even-number and odd-number counter 150A and, when the x-coordinate data does not match each of the even-numbered count value and the odd-numbered count value, compares the x-coordinate data with an even-numbered count value and an odd-numbered count value to be input next from the even-number and odd-number counter 150A. Meanwhile, when the x-coordinate data matches one of the even-numbered count value and the odd-numbered count value, the decision section of correction line 161A compares the succeeding x-coordinate data read from the buffer 30 with an even-numbered count value and an odd-numbered count value input next from the even-number and odd-number counter 150A.

In this modification, pieces of x-coordinate data are read from the buffer 30 in the order based on the same rule as the rule when the even-number and odd-number counter 150A inputs data to the decision section of correction line 161A (in the example above, in ascending order). Thus, merely comparing the even-numbered count value and odd-numbered count value from the even-number and odd-number counter 150A with one piece of x-coordinate data read from the buffer 30 allows the decision as to whether the even-numbered count value and the odd-numbered count value match the x-coordinate data in the buffer 30. In this modification, when each of an even-numbered count value and an odd-numbered count value does not match one piece of x-coordinate data read from the buffer 30, the even-numbered count value and the odd-numbered count value do not match the x-coordinate data in the buffer 30. Contrastingly, when one of an even-numbered count value and an odd-numbered count value matches one piece of x-coordinate data read from the buffer 30, this one value matches the x-coordinate data in the buffer 30. Therefore, without the need for comparing an even-numbered count value and an odd-numbered count value with all the pieces of x-coordinate data in the buffer 30, whether the even-numbered count value and the odd-numbered count value match the x-coordinate data in the buffer 30 can be decided readily. This reduces processing time or simplifies circuitry.

The same holds true for the decision section for correction line 161B, the decision section for succeeding line 162A, and the decision section for succeeding line 162B.

<Other Modifications>

Although pieces of pixel data of a plurality of pixels constituting a line are input to the data processor 1 in ascending order of x-coordinate value in the example above, they may be input in descending order of x-coordinate value. In this case, count values are output from the counter 50 in descending order, and the decision section 51 reads the pieces of x-coordinate data from the buffer 30 in descending order. The even-number and odd-number counters 150A and 150B output even-numbered count values and odd-numbered count values in descending order, and the decision sections for correction line 161A and 161B and the decision sections for succeeding line 162A and 162B read pieces of x-coordinate data from the buffer 30 in descending order.

Although pieces of pixel data in the partial areas 11A and 11B are both input in ascending order of x-coordinate value in the example above, the pieces of pixel data in one of the partial areas 11A and 11B may be input in ascending order of x-coordinate value and the pieces of pixel data in the other of the partial areas 11A and 11B may be input in the descending order of x-coordinate value.

Although the decision circuit 5 processes x-coordinate values of pixels in the example above, it may process other pixel-related data.

While the data processor 1 has been shown and described in detail, the foregoing description is in all aspects illustrative and not restrictive. The modifications above can be applied in combination as long as they are consistent with each other. It is therefore understood that numerous modifications and variations can be devised without departing from the scope of the invention.

What is claimed is:

1. A data processor comprising:
a memory that stores data; and
a first decision circuit that decides whether data to be input matches data in the memory, wherein
a plurality of pieces of first input data on pixels are input to the first decision circuit in an order based on a first rule,
the memory has a plurality of first memory areas that respectively store a plurality of pieces of first data that match at least part of the plurality of pieces of first input data,
the first decision circuit reads the plurality of pieces of first data from the memory in an order based on a second rule identical to the first rule,
when addresses of the plurality of first memory areas are viewed in ascending order, the plurality of pieces of first data respectively stored in the plurality of first memory areas are arranged in an order to be read by the first decision circuit,
the data processor further comprises a first read pointer that indicates an address of a first memory area being a read target among the plurality of first memory areas,
the first decision circuit compares one of the pieces of first data read from the memory on the basis of the first read pointer with one of the pieces of first input data to be input,
when the one piece of first data does not match the one piece of first input data, the first decision circuit compares the one piece of first data with another of the pieces of first input data to be input next,
when the one piece of first data matches the one piece of first input data, the first decision circuit increments the first read pointer to a succeeding value and compares another of the pieces of first data read next from the memory on the basis of the first read pointer incremented with another of the pieces of first input data to be input next,
the memory further comprising a plurality of second memory areas that respectively store a plurality of pieces of second data, and
the data processor further comprising a second decision circuit that operates in parallel with the first decision circuit and decides whether second input data matches one of the pieces of second data.

2. The data processor according to claim 1, wherein
the memory stores a plurality of pieces of second data respectively related to the plurality of pieces of first data, and
the data processor further comprises an output circuit that outputs, when the first decision circuit decides that one of the pieces of first data read from the memory matches one of the pieces of first input data, one of the pieces of second data related to the one piece of first data.

3. The data processor according to claim 2, wherein
the first and second rules are in ascending order or descending order, and
the data processor further comprises a counter that outputs the plurality of pieces of first input data in ascending order or descending order.

4. The data processor according to claim 1, wherein
a plurality of pieces of the second input data on pixels are input to the second decision circuit in an order based on a third rule,
the plurality of pieces of second data match at least part of the plurality of pieces of second input data,
the second decision circuit reads the plurality of pieces of second data from the memory in an order based on a fourth rule identical to the third rule,
when addresses of the plurality of second memory areas are viewed in ascending order, the plurality of pieces of second data respectively stored in the plurality of second memory areas are arranged in an order to be read by the second decision circuit,
the data processor further comprises a second read pointer that indicates an address of a second memory area being a read target among the plurality of second memory areas,
the second decision circuit compares one of the pieces of second data read from the memory on the basis of the second read pointer with one of the pieces of second input data to be input,
when the one piece of second data does not match the one piece of second input data, the second decision circuit compares the one piece of second data with another of the pieces of second input data to be input next,
when the one piece of second data matches the one piece of second input data, the second decision circuit increments the second read pointer and compares another of the pieces of second data read next from the memory on the basis of the second read pointer incremented with another of the pieces of second input data to be input next, and
the plurality of pieces of first input data and the plurality of pieces of second input data are input to the first decision circuit and the second decision circuit in parallel.

5. The data processor according to claim 4, wherein
the memory stores a plurality of pieces of third data respectively related to the plurality of pieces of first data and a plurality of pieces of fourth data respectively related to the plurality of pieces of second data,
the data processor further comprises:
a first output circuit that outputs, when the first decision circuit decides that one of the pieces of first data read from the memory matches one of the pieces of first input data, one of the pieces of third data related to the one piece of first data; and
a second output circuit that outputs, when the second decision circuit decides that one of the pieces of second data read from the memory matches one of the pieces of second input data, one of the pieces of fourth data related to the one piece of second data.

6. The data processor according to claim 1, wherein
the plurality of pieces of first input data are input to the first decision circuit in groups,
a plurality of pieces of data forming the group are input to the first decision circuit in parallel, and
the first decision circuit compares one of the pieces of first data read from the memory on the basis of the first read pointer with one of the groups to be input,
when the one piece of first data read from the memory does not match each of the plurality of pieces of data forming the one of the groups to be input, the first decision circuit compares the one piece of first data with another of the groups to be input next, and when the one piece of first data read from the memory matches one of the plurality of pieces of data forming one of the groups to be input, the first decision circuit increments the first read pointer and compares another of the pieces of first data read next from the memory on the basis of the first read pointer incremented with another of the groups to be input next.

7. A data processor comprising:
a memory that stores data; and
a first decision circuit that decides whether data to be input matches data in the memory, wherein
a plurality of pieces of first input data on pixels are input to the first decision circuit in an order based on a first rule,
the memory has a plurality of first memory areas that respectively store a plurality of pieces of first data that match at least part of the plurality of pieces of first input data,
the first decision circuit reads the plurality of pieces of first data from the memory in an order based on a second rule identical to the first rule,
when addresses of the plurality of first memory areas are viewed in ascending order, the plurality of pieces of first data respectively stored in the plurality of first memory areas are arranged in an order to be read by the first decision circuit,
the data processor further comprises a first read pointer that indicates an address of a first memory area being a read target among the plurality of first memory areas,
the first decision circuit compares one of the pieces of first data read from the memory on the basis of the first read pointer with one of the pieces of first input data to be input,
when the one piece of first data does not match the one piece of first input data, the first decision circuit compares the one piece of first data with another of the pieces of first input data to be input next,
when the one piece of first data matches the one piece of first input data, the first decision circuit increments the first read pointer to a succeeding value and compares another of the pieces of first data read next from the memory on the basis of the first read pointer incremented with another of the pieces of first input data to be input next,
the memory stores a plurality of pieces of second data respectively related to the plurality of pieces of first data,
the data processor further comprises an output circuit that outputs, when the first decision circuit decides that one of the pieces of first data read from the memory matches one of the pieces of first input data, one of the pieces of second data related to the one piece of first data,
the data processor further comprising
a processing circuit that performs a predetermined process using one of the plurality of pieces of second data output from the output circuit; and
a controller that controls an operation of the processing circuit,
wherein upon the first decision circuit reading a succeeding piece of the pieces of first data in a case where one of the pieces of first data read from the memory matches one of the plurality of pieces of first input data, the controller determines whether to stop the operation of the processing circuit on the basis of the succeeding piece of first data.

8. A data processing method, comprising:
inputting a plurality of pieces of first input data on pixels in an order based on a first rule; and
reading a plurality of pieces of first data in an order based on a second rule identical to the first rule from a memory having a plurality of memory areas that respectively store the plurality of pieces of first data that match at least part of the plurality of pieces of first input data, wherein
when addresses of the plurality of memory areas are viewed in ascending order, the plurality of pieces of first data respectively stored in the plurality of memory areas are arranged in an order to be read in the reading;
the reading includes
  comparing one of the pieces of first input data to be input with one of the pieces of first data read from the memory on the basis of a read pointer indicating an address of a memory area being a read target among the plurality of memory areas,
  when the one piece of first data does not match the one piece of first input data, comparing the one piece of first data with another of the pieces of first input data to be input next, and
  when the one piece of first data matches the one piece of first input data, incrementing the read pointer to a succeeding value and comparing another of the pieces of first data read next from the memory on the basis of the read pointer incremented with another of the pieces of first input data to be input next; and the data processing method further comprising
respectively storing a plurality of pieces of second data in a plurality of second memory areas, and
in parallel with the reading, deciding whether second input data matches one of the pieces of second data.

* * * * *